(12) United States Patent
Matsunaga et al.

(10) Patent No.: US 7,561,991 B2
(45) Date of Patent: Jul. 14, 2009

(54) DETECTION OF ABNORMAL BEHAVIOR USING PROBABILISTIC DISTRIBUTION ESTIMATION

(75) Inventors: Yuko Matsunaga, Tokyo (JP); Kenji Yamanishi, Tokyo (JP)

(73) Assignee: NEC Corporation, Tokyo (JP)

( * ) Notice: Subject to any disclaimer, the term of this patent is extended or adjusted under 35 U.S.C. 154(b) by 523 days.

(21) Appl. No.: 10/778,178

(22) Filed: Feb. 17, 2004

(65) Prior Publication Data

US 2004/0167893 A1    Aug. 26, 2004

(30) Foreign Application Priority Data

Feb. 18, 2003  (JP)  ............................. 2003-040347
Jun. 17, 2003  (JP)  ............................. 2003-171481

(51) Int. Cl.
*G06F 7/60* (2006.01)

(52) U.S. Cl. ........................................................ 703/2
(58) Field of Classification Search ...................... 703/2
See application file for complete search history.

(56) References Cited

U.S. PATENT DOCUMENTS 5,465,321 A * 11/1995 Smyth .......................... 706/20
6,212,510 B1    4/2001 Brand

FOREIGN PATENT DOCUMENTS

| GB | 2 358 253 A | 7/2001 |
|---|---|---|
| GB | 2 361 336 A | 10/2001 |
| JP | 10-111862 | 4/1998 |
| JP | 2001-101154 | 4/2001 |
| WO | WO 00/70310 | 11/2000 |

OTHER PUBLICATIONS

L.E. Baum et al., "A Maximization Technique Occurring in the Statistical Analysis of Probabilistic Functions of Markov Chains," The Annals of Math. Statistics, 41:1, 1970, pp. 164-171.
I.G. Cadez et al., "Model Based Population Tracking and Automatic Detection of Distribution Changes," Proceedings of the Neural Information Processing Systems, 2001, pp. 1345-1352.
A.P. Dempster, et al., "Maximum Likelihood from Incomplete Data Via the EM Algorithm," Journal of the Royal Statistical Society, Series B, 39:1, 1977, pp. 1-38.

(Continued)

*Primary Examiner*—Kamini S Shah
*Assistant Examiner*—Saif A Alhija
(74) *Attorney, Agent, or Firm*—Foley & Lardner LLP

(57) ABSTRACT

Supplied with a string of vector data as input data, a probabilistic distribution estimation apparatus estimates, by using a stochastic model having hidden variables, a probabilistic distribution in which each data occurs by successively reading the train of vector data. Specifically, the probabilistic distribution estimation apparatus reads values of parameters of the stochastic model having the hidden variables for a value of the input data, calculates, by using the stochastic model, a certainty in which the input data occurs, renews the parameters in response to new read data with past data forgotten, and produce several parameter's values. By using the parameter's values received from the probabilistic distribution estimation apparatus, an abnormality detection unit calculates an information amount of data as an abnormal behavior degree to produce the abnormal behavior degree.

33 Claims, 15 Drawing Sheets

OTHER PUBLICATIONS

S. Forrest et al, "A Sense of Self for Unix Processes," Proceedings of the 1996 IEEE Symposium on Security and Privacy, 1996, pp. 120-128.

S. Gaffney et al., "Trajectory Clustering with Mixtures of Regression Models," Proceedings of KDD 1999, pp. 63-72.

X. Ge et al., "Deformable Markov Model Templates for Time-Series Pattern Matching," Proceeding of KDD 2000, pp. 81-90.

R.A. Maxion et al., "Masquerade Detection Using Truncated Command Lines," Proceedings of the International Conference on Dependable Systems & Networks, 2002, pp. 219-228.

C. Warrender et al., "Detecting Intrusions Using System Calls: Alternative Data Models," Proceedings of the 1999 IEEE Symposium on Security and Privacy, 1999, pp. 133-145.

A.J. Viterbi, "Error Bounds for Convolutional Codes and an Asymptotically Optimum Decoding Algorithm," IEEE Tractions on Information Theory, 1967, pp. 260-267.

K. Yamanishi et al., "A Unifying Framework for Detecting Outliers and Change Points from Non-Stationary Time Series Data," Proceedings of KDD 2002, pp. 41-46.

Speech Recognition by a Stochastic Model, Institute of Electronics, Information and Communication Engineers, 1988, pp. 74-78.

* cited by examiner

DETECTION OF ABNORMAL BEHAVIOR USING PROBABILISTIC DISTRIBUTION ESTIMATION

This application claims priority to prior applications JP 2003-40347 and JP 2003-171481, the disclosure of which is incorporated herein by reference.

BACKGROUND OF THE INVENTION

This invention relates to a probabilistic distribution estimation apparatus, an abnormal behavior detection apparatus, a probabilistic distribution estimation method, and an abnormal behavior detection method and, in particular, to a probabilistic distribution estimation apparatus and an abnormal behavior detection apparatus for detecting abnormal behavior which is largely off whole behavior patterns and a probabilistic distribution estimation method thereof and an abnormal behavior detection method thereof.

In prior art, proposal has been made several abnormal behavior detection apparatuses in fields of statistics, data mining, masquerade or disguise detection, invasion detection, or the like.

At first, an apparatus for detecting abnormality on multi-dimensional data one-point by one-point is disclosed in UK Patent Application No. GB 2361336 A under the title of "Degree of outlier calculation device, and probability density estimation device and histogram calculation device for use therein." According to GB 2361336 A, the apparatus represents the multidimensional data having discrete values or continuous values of one-point by one-point using a histogram or a probability density function to carry out detection of statistical outlier values.

Other several abnormal behavior detection apparatuses using behavior data represented by vector data having a discrete vector value have been proposed in fields of disguise detection, invasion detection, or the like as follows.

Invasion detection methods using system call data are described by S. Forrest, S. A. Hofmeyr, A. Somayaji, and T. A. Longstaff in Proceedings of the 1996 IEEE Symposium on Security and Privacy, pages 120-128, 1996, under the title of "A sense of self for UNIX Processes," and by C. Warrender, S. Forrest, and B. Pearlmutter in Proceedings of the 1999 IEEE symposium on Security and Privacy, pages 133-145, 1999, under the title of "Detecting Intrusions Using System Calls: Alternative Date Models." A method according to S. Forrest, S. A. Hofmeys, A. Somayaji, and T. A. Longstaff comprises the steps of storing a partial string of patterns in system calls where a particular program internally uses on normality, of matching a string of system calls in a running program with the partial string to determine whether or not the program is normal. In addition, a method according to C. Warrender, S. Forrest, and B. Pearlmutter comprises the steps of leaning a string of past system calls using a hidden Markov model (HMM) and of determining whether or not a running program is normal.

Furthermore, a masquerade detection method is described by R. A. Maxion and T. N. Townsend in Proceedings of the International Conference on Dependable Systems & Networks, pages 219-228, 2002, under the title of "Masquerade Detection Using Truncated Command Lines." This method comprises the steps of leaning past records or history for commands of a specific user using a Naive Bayes model and of determining whether or not current behavior of the user is normal using obtained parameters.

An abnormal behavior detection method using an accessed log of Web is described by I. V. Cadez and P. S. Bradley in Proceedings of the Neural Information Processing Systems, pages 1345-1352, 2001, under the title of "Model Based Population Tracking and Automatic Detection of Distribution Changes." This method detects a variation of whole behavior using accessed log data of a plurality of users.

In addition, a human abnormal behavior detection system through the image of a video camera is known in U.S. Pat. No. 6,212,510 issued to Matthew E. brand. This system estimates a behavior model using an entropic prior and a hidden Markov model.

On the other hand, abnormal behavior detection apparatuses using behavior data represented by continuous vector data are as follows.

A method for detecting change-points in time series data is described by K. Yamanishi and J. Takeuchi in Proceedings of KDD2002, pages 41-46, 2002, under the title of "A unifying Framework for Detecting outliers and change-points from non-stationary time series data." This method comprises the steps of leaning time series data using an autoregression model or the line online and of detecting, as change-points, points where the model largely changes.

A method of finding a characteristic point in continuous time series data is described by X. Ge and P. Smyth in Proceeding of KDD2000, pages 81-90, 2000, under the title of "Deformable Markov Model Templates for Time-Series Pattern Matching." This method comprises the steps of representing continuous time series data using a distribution model of a continuous time and a hidden Markov model having a regression model corresponding to each state and of detecting, as a characteristic point, the continuous time series data corresponding to a particular state.

In addition, a system for carrying out state estimation of trajectory data (continuous behavior data) is described by S. Gaffney and P. Smyth in Proceedings of KDD1999, pages 63-72, 1999, under the title of "Trajectory Clustering with Mixtures of Regression Models." This system comprises state estimation means which leans trajectory data using a finite mixed distribution of regression models and calculates a certainty where the trajectory data arises from each regression model in the finite mixed distribution.

However, there are problems in the above-mentioned prior arts as follows.

A first problem is no adaptability for a variation of an information source for generating data in the prior arts. This is because all methods except for UK Patent Application No. GB 2361336 A and the method according to K. Yamanishi and J. Takeuchi cannot cope with when the pattern changes because all past data are equally dealt with.

A second problem is no sufficient scalability. This is because the method according to S. Forrest, S. A. Hofmeyr, A. Somayaji, and T. A. Longstaff requires a large scale of memory capacity to carry out detection at a high precision because using a matching. All methods except for UK Patent Application No. GB 2361336 A and the method according to K. Yamanishi and J. Takeuchi are inefficient on calculation as well as necessary of the large scale of memory capacity because a leaning algorithm uses all past data in there methods.

A third problem is no robustness for noises. This is because the method according to S. Forrest, S. A. Hofmeyr, A. Somayaji, and T. A. Longstaff determines abnormal for ones which are different from the stored partial string a little due to use of matching.

A fourth problem is that abnormal behavior enable to detect is restricted. This is because all of the method according to S. Forrest, S. A. Hofmeyr, A. Somayaji, and T. A. Longstaff, the method according to C. Warrender, S. Forrest, and B. Pearlmutter, and the method according to R. A. Maxion and T. N. Townsend which deal with the discrete data are methods specialized to problems, respectively, and cannot deal with problems such as occurrence of burst abnormal behavior, a plurality of programs, and a plurality of users although they can detect abnormal behavior in a sense of outlier which is largely off from past behavior in a single program or a single user. Similarly, the system according to U.S. Pat. No. 6,212,510 can only detect behavior in a sense of outlier from a learned model. The method according to I. Cadez and P. S. Bradley cannot detect a variation of individual behavior although the method can detect a variation of whole behavior in the problem for analyzing the accessed log in a plurality of users. The method according to X. Ge and P. Smyth dealing with the continuous data cannot detect an abnormal trajectory although the method can detect a characteristic point in the continuous time series data where it is understood that it should preliminarily be paid attention. The method according to S. Gaffney and P. Smyth cannot detect an abnormal trajectory although the method comprises trajectory state estimation means.

A fifth problem is that precision of detection is bad in a case of few data. The method according to S. Forrest, S. A. Hofmeyr, A. Somayaji, and T. A. Longstaff, the method according to C. Warrender, S. Forrest, and B. Pearlmutter, and the method according to R. A. Maxion and T. N. Townsend cannot detect abnormal behavior in the single program or the single user at a high precision when there is no sufficient amount of past data.

A sixth problem is that data of analysis target is restricted. The system according to UK Patent Application No. GB 2361336 A cannot detect abnormal behavior although the system can detect the discrete data or the continuous data one-point by one-point in a sense of outlier from the learned model. Likewise, the system according to K. Yamanishi and J. Takeuchi cannot detect abnormality in a pattern of behavior data although the system can detect outlier or a variation point in the discrete data or the continuous data one-point by one-point.

SUMMARY OF THE INVENTION

It is a first object of this invention to provide a probabilistic distribution estimation apparatus and method which is capable of adaptively estimating a probabilistic distribution in which each data occurs at robust for noises by successively reading a number of vector data representing behavior using an oblivious type algorithm and to an abnormal behavior detection apparatus and method for detecting abnormal behavior using the estimated probabilistic distribution.

It is a second object of this invention to provide a probabilistic distribution estimation apparatus and method and an abnormal behavior detection apparatus and method which are capable of detecting a variation of behavior meaning burst abnormal behavior using an abnormal behavior degree with distinction of abnormal behavior in a sense of outlier of a pattern.

It is a third object of this invention to provide a probabilistic distribution estimation apparatus and method and an abnormal behavior detection apparatus and method which are capable, in a problem dealing with behavior data into which a plurality of programs or data of a plurality of users are mixed, not only of detecting a variation of individual behavior but also of detecting abnormal behavior data at a high precision when the behavior data is few.

It is a fourth object of this invention to provide a probabilistic distribution estimation apparatus and method and an abnormal behavior detection apparatus and method which are capable of detecting a variation of structure of whole behavior models.

Other objects of this invention will become clear as the description proceeds.

According to a first aspect of this invention, a probabilistic distribution estimation apparatus is for responding to, as input data, a string of vector data to estimate, using a stochastic model having hidden variables, a probabilistic distribution occurred in each data by successively reading the string of the vector data. The probabilistic distribution estimation apparatus comprises a parameter storage unit for storing all of parameters for the stochastic model having the hidden variables, a certainty calculation arrangement for calculating, in response to input data, a certainty where the input data occurs using the stochastic model by reading the parameters of the stochastic model from the parameter storage unit, a parameter renewal arrangement renewing contents of the parameter storage unit in accordance with new read data with past data forgotten by reading the certainty from the certainty calculation means and by reading each parameter of the stochastic model from the parameter storage unit, and an outputting arrangement for outputting several parameters of the stochastic model stored in the parameter storage unit.

In the first aspect of this invention, the probabilistic distribution estimation apparatus preferably may further comprise a session arrangement for processing the input data into the string of vector data.

According to a second aspect of this invention, a probabilistic distribution estimation apparatus is for responding to, as input data, a string of vector data to estimate, using a time series model having a continuous time distribution and hidden variables, a probabilistic distribution occurred in each data by successively reading the string of the vector data. The probabilistic distribution estimation apparatus comprises a parameter storage unit for storing all of parameters for the time series model having the continuous time distribution and the hidden variables, a certainty calculation arrangement for calculating, in response to the input data, a certainty where the input data occurs using the time series model by reading the parameters of the time series model from the parameter storage unit, a parameter renewal arrangement for renewing contents of the parameter storage unit in accordance with new read data with past data forgotten by reading the certainty from the certainty calculation arrangement and by reading each parameter of the time series model from the parameter storage unit, and an outputting arrangement for outputting several parameters of the time series model stored in the parameter storage unit.

In the second aspect of this invention, the probabilistic distribution estimation apparatus preferably may further comprise a session arrangement for processing the input data into the string of vector data.

According to a third aspect of this invention, a probabilistic distribution estimation apparatus is for responding to, as input data, a string of vector data to estimate, using a finite mixed distribution of hidden Macrov models each having a continuous time distribution, a probabilistic distribution occurred in each data by successively reading the string of the vector data. The probabilistic distribution estimation apparatus comprises a parameter storage unit for storing all of parameters for the finite mixed distribution of said hidden Marcov models each having the continuous distribution, a certainty calculation arrangement for calculating, in response to the input data, a certainty where the input data occurs using the finite mixed distribution of the hidden Macrov models by reading the parameters of the finite mixed distribution of the hidden Marcov models from said parameter storage unit, a parameter renewal arrangement for renewing contents of the parameter storage unit in accordance with new read data with past data forgotten by reading the certainty from the certainty calculation arrangement and by reading each parameter of the finite mixed distribution of the hidden Marcov models from the parameter storage unit, and an outputting arrangement for outputting several parameters of the finite mixed distribution of the hidden Marcov models stored in the parameter storage unit.

In the third aspect of this invention, the probabilistic distribution estimation apparatus preferably may further comprise a session arrangement for processing the input data into the string of vector data.

According to a fourth aspect of this invention, an abnormal behavior detection apparatus comprises a probabilistic distribution estimation apparatus for responding to, as input data, a string of vector data to estimate, using a stochastic model, a probabilistic distribution occurred in each data by successively reading the string of the vector data. The probabilistic distribution estimation apparatus comprises a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation means and by reading each parameter of the stochastic model from the parameter storage unit. A state estimation arrangement uses the parameters of the probabilistic distribution estimated by the probabilistic distribution estimation apparatus to produce, as a score, the certainty where the new read data has a state corresponding to each hidden variable of the stochastic model.

According to a fifth aspect of this invention, an abnormal behavior detection apparatus comprises a probabilistic distribution estimation apparatus for responding to, as input data, a string of vector data to estimate, using a stochastic model, a probabilistic distribution occurred in each data by successively reading the string of the vector data. The probabilistic distribution estimation apparatus comprises a session arrangement for processing the input data into the string of vector data, a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation arrangement and by reading each parameter of the stochastic model from the parameter storage unit. A state estimation arrangement uses the parameters of the probabilistic distribution estimated by the probabilistic distribution estimation apparatus to produce, as a score, the certainty where the new read data has a state corresponding to each hidden variable of the stochastic model.

According to a sixth aspect of this invention, an abnormal behavior detection apparatus comprises a probabilistic distribution estimation apparatus for responding to, as input data, a string of vector data to estimate, using a stochastic model, a probabilistic distribution occurred in each data by successively reading the string of the vector data. The probabilistic distribution estimation apparatus comprises a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation arrangement and by reading each parameter of the stochastic model from the parameter storage unit. An abnormality detection arrangement calculates information amount of the new read data by using the parameters of the probabilistic distribution estimated by the probabilistic distribution estimation apparatus to produce an abnormal behavior degree of the new read data.

In the sixth aspect of this invention, the abnormal behavior detection apparatus may further comprise a behavior model variation degree calculation unit for calculating, by using the parameters of the probabilistic distribution estimated by the probabilistic distribution estimation unit, a variation degree of a behavior mode as a time-average of the abnormal behavior degrees for a predetermined width by reading a plurality of new data.

According to a seventh aspect of this invention, an abnormal behavior detection apparatus comprises a probabilistic distribution estimation apparatus for responding to, as input data, a string of vector data to estimate, using a stochastic model, a probabilistic distribution occurred in each data by successively reading the string of the vector data. The probabilistic distribution estimation apparatus comprises a session arrangement for processing the input data into the string of vector data, a parameter storage unit for storing all of parameters for the stochastic model having hidden variables, a certainty calculation arrangement for calculating, in response to input data, a certainty where the input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation arrangement and by reading each parameter of the stochastic model from said parameter storage unit. An abnormality detection arrangement calculates information amount of the new read data by using the parameters of the probabilistic distribution estimated by the probabilistic distribution estimation apparatus to produce an abnormal behavior degree of the new read data.

In the seventh aspect of this invention, the abnormal behavior detection apparatus may further comprise a behavior model variation degree calculation unit for calculating, by using the parameters of the probabilistic distribution estimated by the probabilistic distribution estimation unit, a variation degree of a behavior mode as a time-average of the abnormal behavior degrees for a predetermined width by reading a plurality of new data.

According to an eighth aspect of this invention, an abnormal behavior detection apparatus comprises a probabilistic distribution estimation apparatus for responding to, as input data, a string of vector data to estimate, using a stochastic model, a probabilistic distribution occurred in each data by successively reading the string of the vector data. The probabilistic distribution estimation apparatus comprises a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and a parameter renewal means for renewing contents of the parameter storage unit in accordance with new read data with past data forgotten by reading the certainty from the certainty calculation arrangement and by reading each parameter of the stochastic model having the respective hidden variables from the parameter storage unit. A posteriori probability calculation arrangement calculates a posteriori probability of the state corresponding to the hidden variables by using the parameters of the probabilistic distribution estimated by the probabilistic distribution estimation apparatus. A reference data input unit inputs data different from the input data. A posteriori probability variation degree calculation arrangement calculates a variation of the posteriori distribution and outputting it by using the posteriori distribution of the state corresponding to the hidden variables calculated by the posteriori distribution calculation arrangement on the basis of the data read out of the reference data input unit and by using the posteriori distribution of the state corresponding to the hidden variables calculated by the posteriori distribution calculation arrangement on the basis of the new read data.

According to a ninth aspect of this invention, an abnormal behavior detection apparatus comprises a probabilistic distribution estimation apparatus for responding to, as input data, a string of vector data to estimate, using a stochastic model, a probabilistic distribution occurred in each data by successively reading the string of the vector data. The probabilistic distribution estimation apparatus comprises a session arrangement for processing the input data into the string of vector data, a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation arrangement and by reading each parameter of the stochastic model having the respective hidden variables from the parameter storage unit, a posteriori probability calculation arrangement for calculating a posteriori probability of the state corresponding to the hidden variables by using the parameters of the probabilistic distribution estimated by the probabilistic distribution estimation apparatus, a reference data input unit for inputting data different from the input data, and a posteriori probability variation degree calculation arrangement for calculating a variation of the posteriori distribution and outputting it by using the posteriori distribution of the state corresponding to the hidden variables calculated by the posteriori distribution calculation means on the basis of the data read out of the reference data input unit and by using the posteriori distribution of the state corresponding to the hidden variables calculated by the posteriori distribution calculation arrangement on the basis of the new read data.

According to a tenth aspect of this invention, an abnormal behavior detection apparatus comprises a plurality of probabilistic distribution estimation apparatuses each of which responds to, as input data, a string of vector data to estimate, using a stochastic model, a probabilistic distribution occurred in each data by successively reading the string of the vector data. Each of the probabilistic distribution estimation apparatuses comprises a parameter storage unit for storing all of parameters for the stochastic model having hidden variables, a certainty calculation arrangement for calculating, in response to the input data, a certainty where said input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation arrangement and by reading each parameter of the stochastic model from the parameter storage unit. An information amount standard calculation arrangement calculates, by using, in parallel, the plurality of probabilistic distribution estimation apparatuses for the stochastic models having different number of the states where the hidden variables can take, standard values of information amount from the parameters of the probabilistic distributions estimated by the respective probabilistic distribution estimation apparatuses and the input data to produce, as an optimum value, the number of states where the hidden variables can take when the standard value of the information amount is the least.

According to an eleventh aspect of this invention, an abnormal behavior detection apparatus comprises a plurality of probabilistic distribution estimation apparatuses each of which responds to, as input data, a string of vector data to estimate, using a stochastic model, a probabilistic distribution occurred in each data by successively reading the string of the vector data. Each of the probabilistic distribution estimation apparatuses comprises a session arrangement for processing the input data into the string of vector data, a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation arrangement and by reading each parameter of the stochastic model from the parameter storage unit. An information amount standard calculation arrangement calculates, by using, in parallel, the plurality of probabilistic distribution estimation apparatuses for the stochastic models having different number of the states where the hidden variables can take, standard values of information amount from the parameters of the probabilistic distributions estimated by the respective probabilistic distribution estimation apparatuses and the input data to produce, as an optimum value, the number of states where the hidden variables can take when the standard value of the information amount is the least.

According to a twelfth aspect of this invention, an abnormal behavior detection apparatus comprises a probabilistic distribution estimation apparatus for responding to, as input data, a string of vector data to estimate, using a time series model, a probabilistic distribution occurred in each data by successively reading the string of the vector data. The probabilistic distribution estimation apparatus comprises a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation means and by reading the parameters of the time series model from the parameter storage unit. A state estimation arrangement uses the parameters of the probabilistic distribution estimated by the probabilistic distribution estimation apparatus to produce, as a score, the certainty where the new read data has a state corresponding to each hidden variable of the time series model.

According to a thirteenth aspect of this invention, an abnormal behavior detection apparatus comprises a probabilistic distribution estimation apparatus for responding to, as input data, a string of vector data to estimate, using a time series model, a probabilistic distribution occurred in each data by successively reading the string of the vector data. The probabilistic distribution estimation apparatus comprises a session arrangement for processing the input data into the string of vector data, a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit. A state estimation arrangement uses the parameters of the probabilistic distribution estimated by the probabilistic distribution estimation apparatus to produce, as a score, the certainty where the new read data has a state corresponding to each hidden variable of the time series model.

According to a fourteenth aspect of this invention, an abnormal behavior detection apparatus comprises a probabilistic distribution estimation apparatus for responding to, as input data, a string of vector data to estimate, using a time series model, a probabilistic distribution occurred in each data by successively reading the string of the vector data. The probabilistic distribution estimation apparatus comprises a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit. An abnormality detection arrangement calculates information amount of the new read data by using the parameters of the probabilistic distribution estimated by the probabilistic distribution estimation apparatus to produce an abnormal behavior degree of the new read data.

In the fourteenth aspect of this invention, an abnormal behavior detection apparatus may further comprise a behavior model variation degree calculation unit for calculating, by using the parameters of the probabilistic distribution estimated by the probabilistic distribution estimation unit, a variation degree of a behavior mode as a time-average of the abnormal behavior degrees for a predetermined width by reading a plurality of new data.

According to a fifteenth aspect of this invention, an abnormal behavior detection apparatus comprises a probabilistic distribution estimation apparatus for responding to, as input data, a string of vector data to estimate, using a time series model, a probabilistic distribution occurred in each data by successively reading the string of the vector data. The probabilistic distribution estimation apparatus comprises a session arrangement for processing the input data into the string of vector data, a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit. An abnormality detection arrangement calculates information amount of the new read data by using the parameters of the probabilistic distribution estimated by the probabilistic distribution estimation apparatus to produce an abnormal behavior degree of the new read data.

According to the fifteenth aspect of this invention, an abnormal behavior detection apparatus may further comprise a behavior model variation degree calculation unit for calculating, by using the parameters of the probabilistic distribution estimated by the probabilistic distribution estimation unit, a variation degree of a behavior mode as a time-average of the abnormal behavior degrees for a predetermined width by reading a plurality of new data.

According to a sixteenth aspect of this invention, an abnormal behavior detection apparatus comprises a probabilistic distribution estimation apparatus for responding to, as input data, a string of vector data to estimate, using a time series model, a probabilistic distribution occurred in each data by successively reading the string of the vector data. The probabilistic distribution estimation apparatus comprises a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit. A posteriori probability calculation arrangement calculates a posteriori probability of the state corresponding to the hidden variables by using the parameters of the probabilistic distribution estimated by the probabilistic distribution estimation apparatus. A reference data input unit inputs data different from the input data. A posteriori probability variation degree calculation arrangement calculates a variation of the posteriori distribution and outputting it by using the posteriori distribution of the state corresponding to the hidden variables calculated by the posteriori distribution calculation arrangement on the basis of the data read out of the reference data input unit and by using the posteriori distribution of the state corresponding to the hidden variables calculated by the posteriori distribution calculation mean on the basis of the new read data.

According to a seventeenth aspect of this invention, an abnormal behavior detection apparatus comprises a probabilistic distribution estimation apparatus for responding to, as input data, a string of vector data to estimate, using a time series model, a probabilistic distribution occurred in each data by successively reading the string of the vector data. The probabilistic distribution estimation apparatus comprises a session arrangement for processing the input data into the string of vector data, a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit. A posteriori probability calculation arrangement calculates a posteriori probability of the state corresponding to the hidden variables by using the parameters of the probabilistic distribution estimated by the probabilistic distribution estimation apparatus. A reference data input unit inputs data different from the input data. A posteriori probability variation degree calculation arrangement calculates a variation of the posteriori distribution and outputting it by using the posteriori distribution of the state corresponding to the hidden variables calculated by the posteriori distribution calculation means on the basis of the data read out of the reference data input unit and by using the posteriori distribution of the state corresponding to the hidden variables calculated by the posteriori distribution calculation arrangement on the basis of the new read data.

According to an eighteenth aspect of this invention, an abnormal behavior detection apparatus comprises a plurality of probabilistic distribution estimation apparatuses each of which responds to, as input data, a string of vector data to estimate, using a time series model, a probabilistic distribution occurred in each data by successively reading the string of the vector data. Each of the probabilistic distribution estimation apparatuses comprises a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit. An information amount standard calculation arrangement calculates, by using, in parallel, the plurality of probabilistic distribution estimation apparatuses for the time series models having different number of the states where the hidden variables can take, standard values of information amount from the parameters of the probabilistic distributions estimated by the respective probabilistic distribution estimation apparatuses and the input data to produce, as an optimum value, the number of states where the hidden variables can take when the standard value of the information amount is the least.

According to a nineteenth aspect of this invention, an abnormal behavior detection apparatus comprises a plurality of probabilistic distribution estimation apparatuses each of which responds to, as input data, a string of vector data to estimate, using a time series model, a probabilistic distribution occurred in each data by successively reading the string of the vector data. Each of the probabilistic distribution estimation apparatuses comprises a session arrangement for processing the input data into the string of vector data, a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit. An information amount standard calculation arrangement calculates, by using, in parallel, the plurality of probabilistic distribution estimation apparatuses for the time series models having different number of the states where the hidden variables can take, standard values of information amount from the parameters of the probabilistic distributions estimated by the respective probabilistic distribution estimation apparatuses and the input data to produce, as an optimum value, the number of states where the hidden variables can take when the standard value of the information amount is the least.

According to a twentieth aspect of this invention, an abnormal behavior detection apparatus comprises a probabilistic distribution estimation apparatus for responding to, as input data, a string of vector data to estimate, using a finite mixed distribution of hidden Marcov models, a probabilistic distribution occurred in each data by successively reading the string of the vector data. The probabilistic distribution estimation apparatus comprises a parameter storage unit for storing all of parameters for the finite mixed distribution of the hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation means and by reading the parameters of the finite mixed distribution of the hidden Marcov models from said parameter storage unit. A state estimation arrangement uses the parameters of the probabilistic distribution estimated by the probabilistic distribution estimation apparatus to produce, as a score, the certainty where the new read data has a state corresponding to each hidden variable of the finite mixed distribution of the hidden Marcov models.

According to a twenty-first aspect of this invention, an abnormal behavior detection apparatus comprises a probabilistic distribution estimation apparatus for responding to, as input data, a string of vector data to estimate, using a finite mixed distribution of hidden Marcov models, a probabilistic distribution occurred in each data by successively reading the string of the vector data. The probabilistic distribution estimation apparatus comprises a session arrangement for processing the input data into the string of vector data, a parameter storage unit for storing all of parameters for the finite mixed distribution of the hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation arrangement and by reading the parameters of the finite mixed distribution of the hidden Marcov models from the parameter storage unit. A state estimation arrangement uses the parameters of the probabilistic distribution estimated by the probabilistic distribution estimation apparatus to produce, as a score, the certainty where the new read data has a state corresponding to each hidden variable of the finite mixed distribution of the hidden Marcov models.

According to a twenty-second aspect of this invention, an abnormal behavior detection apparatus comprises a probabilistic distribution estimation apparatus for responding to, as input data, a string of vector data to estimate, using a finite mixed distribution of hidden Marcov models, a probabilistic distribution occurred in each data by successively reading the string of the vector data. The probabilistic distribution estimation apparatus comprises a parameter storage unit for storing all of parameters for the finite mixed distribution of the hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation arrangement and by reading the parameters of the finite mixed distribution of the hidden Marcov models from the parameter storage unit. An abnormality detection arrangement calculates an information amount of the new read data by using the parameters of the probabilistic distribution estimated by the probabilistic distribution estimation apparatus to produce an abnormal behavior degree of the new read data.

In the twenty-second aspect of this invention, an abnormal behavior detection apparatus may further comprise a behavior model variation degree calculation unit for calculating, by using the parameters of the probabilistic distribution estimated by the probabilistic distribution estimation unit, a variation degree of a behavior mode as a time-average of the abnormal behavior degrees for a predetermined width by reading a plurality of new data.

According to a twenty-third aspect of this invention, an abnormal behavior detection apparatus comprises a probabilistic distribution estimation apparatus for responding to, as input data, a string of vector data to estimate, using a finite mixed distribution of hidden Marcov models, a probabilistic distribution occurred in each data by successively reading the string of the vector data. The probabilistic distribution estimation apparatus comprises a session arrangement for processing the input data into the string of vector data, a parameter storage unit for storing all of parameters for the finite mixed distribution of the hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation arrangement and by reading the parameters of the finite mixed distribution of the hidden Marcov models from the parameter storage unit. An abnormality detection arrangement calculates an information amount of the new read data by using the parameters of the probabilistic distribution estimated by the probabilistic distribution estimation apparatus to produce an abnormal behavior degree of the new read data.

In the twenty-third aspect of this invention, the abnormal behavior detection apparatus may further comprise a behavior model variation degree calculation unit for calculating, by using the parameters of the probabilistic distribution estimated by the probabilistic distribution estimation apparatus, a variation degree of a behavior mode as a time-average of the abnormal behavior degrees for a predetermined width by reading a plurality of new data.

According to a twenty-fourth aspect of this invention, an abnormal behavior detection apparatus comprises a probabilistic distribution estimation apparatus for responding to, as input data, a string of vector data to estimate, using a finite mixed distribution of hidden Marcov models, a probabilistic distribution occurred in each data by successively reading the string of the vector data. The probabilistic distribution estimation apparatus comprises a parameter storage unit for storing all of parameters for the finite mixed distribution of the hidden Marcov models each having a continuous time distribution, a certainty calculation arrangement for calculating, in response to the input data, a certainty where said input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation arrangement and by reading the parameters of the finite mixed distribution of the hidden Marcov models from the parameter storage unit. A posteriori probability calculation arrangement calculates a posteriori probability of the state corresponding to the hidden variables by using the parameters of the probabilistic distribution estimated by the probabilistic distribution estimation apparatus. A reference data input unit inputs data different from said input data. A posteriori probability variation degree calculation arrangement calculates a variation of the posteriori distribution and outputting it by using the posteriori distribution of the state corresponding to the hidden variables calculated by the posteriori distribution calculation arrangement on the basis of the data read out of the reference data input unit and by using the posteriori distribution of the state corresponding to the hidden variables calculated by the posteriori distribution calculation arrangement on the basis of the new read data.

According to a twenty-fifth aspect of this invention, an abnormal behavior detection apparatus comprises a probabilistic distribution estimation apparatus for responding to, as input data, a string of vector data to estimate, using a finite mixed distribution of hidden Marcov models, a probabilistic distribution occurred in each data by successively reading the string of the vector data. The probabilistic distribution estimation apparatus comprises a session arrangement for processing the input data into the string of vector data, a parameter storage unit for storing all of parameters for the finite mixed distribution of the hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation means and by reading the parameters of the finite mixed distribution of the hidden Marcov models from the parameter storage unit. A posteriori probability calculation arrangement calculates a posteriori probability of the state corresponding to the hidden variables by using the parameters of the probabilistic distribution estimated by the probabilistic distribution estimation apparatus. A reference data input unit inputs data different from the input data. A posteriori probability variation degree calculation arrangement calculates a variation of the posteriori distribution and outputting it by using the posteriori distribution of the state corresponding to the hidden variables calculated by the posteriori distribution calculation arrangement on the basis of the data read out of the reference data input unit and by using the posteriori distribution of the state corresponding to the hidden variables calculated by the posteriori distribution calculation mean on the basis of the new read data.

According to a twenty-sixth aspect of this invention, an abnormal behavior detection apparatus comprises a plurality of probabilistic distribution estimation apparatuses each of which responds to, as input data, a string of vector data to estimate, using a finite mixed distribution of hidden Marcov models, a probabilistic distribution occurred in each data by successively reading the string of the vector data. Each of the probabilistic distribution estimation apparatuses comprises a parameter storage unit for storing all of parameters for the finite mixed distribution of the hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation arrangement and by reading the parameters of the finite mixed distribution of the hidden Marcov models from the parameter storage unit. An information amount standard calculation arrangement calculates, by using, in parallel, the plurality of probabilistic distribution estimation apparatuses for the finite mixed distributions of the hidden Marcov models having different number of the states where the hidden variables can take, standard values of information amounts from the parameters of the probabilistic distributions estimated by the respective probabilistic distribution estimation apparatuses and the input data to produce, as an optimum value, the number of states where the hidden variables can take when the standard value of the information amount is the least.

According to a twenty-seventh aspect of this invention, an abnormal behavior detection apparatus comprises a plurality of probabilistic distribution estimation apparatuses each of which responds to, as input data, a string of vector data to estimate, using a finite mixed distribution of hidden Marcov models, a probabilistic distribution occurred in each data by successively reading the string of the vector data. Each of the probabilistic distribution estimation apparatuses comprises a session arrangement for processing the input data into the string of vector data, a parameter storage unit for storing all of parameters for the finite mixed distribution of the hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation arrangement and by reading the parameters of the finite mixed distribution of the hidden Marcov models from the parameter storage unit. An information amount standard calculation arrangement calculates, by using, in parallel, the plurality of probabilistic distribution estimation apparatuses for the finite mixed distributions of the hidden Marcov models having different number of the states where the hidden variables can take, standard values of information amounts from the parameters of the probabilistic distributions estimated by the respective probabilistic distribution estimation apparatuses and the input data to produce, as an optimum value, the number of states where the hidden variables can take when the standard value of the information amount is the least.

According to a twenty-eighth aspect of this invention, a probabilistic distribution estimation method comprises the steps of inputting a string of vector data as input data, of calculating, using a stochastic model having hidden variables as a probabilistic distribution in which each data occurs by successively reading the string of vector data, a certainty for a value of the input data in which the input data occurs on the basis of parameters of the stochastic model, of renewing, by using the certainty and the parameters of the stochastic model, the parameters in response to new read data with past data forgotten, and of outputting several values of the calculated parameters.

In the twenty-eighth aspect of this invention, the probabilistic distribution estimation method may further comprise the step of carrying out session for converting the input data into the vector data when the input data has no structure of vector data.

According to a twenty-ninth aspect of this invention, a probabilistic distribution estimation method comprises the steps of inputting a string of vector data as input data, of calculating, using a time series model having a continuous time distribution and hidden variables as a probabilistic distribution in which each data occurs by successively reading the string of vector data, a certainty for value of the input data in which the input data occurs on the basis of parameters of the time series model, of renewing, by using the certainty and the parameters of the time series model, the parameters in response to new read data with past data forgotten, and of outputting several values of the calculated parameters.

In the twenty-ninth aspect of this invention, the probabilistic distribution estimation method may further comprise the step of carrying out session for converting said input data into the vector data when the input data has no structure of vector data.

According to a thirty aspect of this invention, a probabilistic distribution estimation method comprises the steps of inputting a string of vector data as input data, of calculating, using a finite mixed distribution of hidden Marcov models each having a continuous time distribution as a probabilistic distribution in which each data occurs by successively reading the string of vector data, a certainty for a value of the input data in which the input data occurs on the basis of parameters of the finite mixed distribution of the hidden Marcov models, of renewing, by using the certainty and the parameters of the finite mixed distribution of the hidden Marcov models, the parameters in response to new read data with past data forgotten, and of outputting several values of the calculated parameters.

In the thirty aspect of this invention, the probabilistic distribution estimation method may further comprise the step of carrying out session for converting the input data into the vector data when the input data has no structure of vector data.

According to a thirty aspect of this invention, an abnormal behavior detection method comprises the steps of inputting a string of vector data as input data, of calculating, using a stochastic model having hidden variables as a probabilistic distribution in which each data occurs by successively reading the string of vector data, a certainty for a value of the input data in which the input data occurs on the basis of parameters of the stochastic model, of renewing, by using the certainty and the parameters of the stochastic model, the parameters in response to new read data with past data forgotten, and of outputting, by using parameters of an estimated probabilistic distribution, as a score, the certainty where new read data has a state corresponding to each hidden variable.

According to a thirty-first aspect of this invention, an abnormal behavior detection method comprises the steps of inputting input data, of carrying out session for converting the input data into a string of vector data when the input data have no structure of vector data, of calculating, using a stochastic model having hidden variables as a probabilistic distribution in which each data occurs by successively reading the string of vector data, a certainty for a value of the input data in which the input data occurs on the basis of parameters of the stochastic model, of renewing, by using the certainty and the parameters of the stochastic model, the parameters in response to new read data with past data forgotten, and of outputting, by using parameters of an estimated probabilistic distribution, as a score, the certainty where new read data has a state corresponding to each hidden variable.

According to a thirty-second aspect of this invention, an abnormal behavior detection method comprises the steps of inputting a string of vector data as input data, of calculating, using a stochastic model having hidden variables as a probabilistic distribution in which each data occurs by successively reading the string of vector data, a certainty for a value of the input data in which the input data occurs on the basis of parameters of the stochastic model, of renewing, by using the certainty and the parameters of the stochastic model, the parameters in response to new read data with past data forgotten, and of calculating, by using parameters of an estimated probabilistic distribution, an abnormal behavior degree of new read data using information amount of the new read data to produce the abnormal behavior degree.

In the thirty-second aspect of this invention, the abnormal behavior detection method may further comprise the step of calculating, by using the parameters of the estimated probabilistic distribution, a variation degree of a behavior model as a time-average of the abnormal behavior degrees for a predetermined width by reading a plurality of data.

According to a thirty-third aspect of this invention, an abnormal behavior detection method comprises the steps of inputting input data, of carrying out session for converting the input data into a string of vector data when the input data have no structure of vector data, of calculating, using a stochastic model having hidden variables as a probabilistic distribution in which each data occurs by successively reading the string of vector data, a certainty for a value of the input data in which the input data occurs on the basis of parameters of the stochastic model, of renewing, by using the certainty and the parameters of the stochastic model, the parameters in response to new read data with past data forgotten, and of calculating, by using parameters of an estimated probabilistic distribution, an abnormal behavior degree of new read data using information amount of the new read data to produce the abnormal behavior degree.

In the thirty-third aspect of this invention, the abnormal behavior detection method may further comprise the step of calculating, by using the parameters of the estimated probabilistic distribution, a variation degree of a behavior model as a time-average of the abnormal behavior degrees for a predetermined width by reading a plurality of data.

According to a thirty-fourth aspect of this invention, an abnormal behavior detection method comprises the steps of inputting a string of vector data as input data, calculating, using a stochastic model having hidden variables as a probabilistic distribution in which each data occurs by successively reading the string of vector data, a certainty for a value of the input data in which the input data occurs on the basis of parameters of the stochastic model, renewing, by using the certainty and the parameters of the stochastic model, the parameters in response to new read data with past data forgotten, of calculating, by using parameters of an estimated probabilistic distribution, a first posteriori probability of a state corresponding to the hidden variables by reading reference data different from the input data, of calculating, by using the parameters of the estimated probabilistic distribution, a second posteriori probability of a state corresponding to the hidden variables by reading new read data as the input data, and of calculating, as a variation of a posteriori probability, a difference between the first and the second posteriori probabilities to produce the variation of the posteriori probability.

According to a thirty-fifth aspect of this invention, an abnormal behavior detection method comprises the steps of inputting input data, of carrying out session for converting the input data into a string of vector data when the input data have no structure of vector data, of calculating, using a stochastic model having hidden variables as a probabilistic distribution in which each data occurs by successively reading the string of vector data, a certainty for a value of the input data in which the input data occurs on the basis of parameters of the stochastic model, of renewing, by using the certainty and the parameters of the stochastic model, the parameters in response to new read data with past data forgotten, of calculating, by using parameters of an estimated probabilistic distribution, a first posteriori probability of a state corresponding to the hidden variables by reading reference data different from the input data, of calculating, by using the parameters of the estimated probabilistic distribution, a second posteriori probability of a state corresponding to the hidden variables by reading new read data as the input data, and of calculating, as a variation of a posteriori probability, a difference between the first and the second posteriori probabilities to produce the variation of the posteriori probability.

According to a thirty-sixth aspect of this invention, an abnormal behavior detection method comprises the steps of inputting a string of vector data as input data, of estimating, in parallel, parameters for stochastic models having hidden variables of different number of states by using a plurality of probabilistic distribution estimation apparatuses, and of calculating, by using the parameters and the input data, standard values of information amounts for the respective stochastic models to produce, as an optimum value, the number of the states where the hidden variables can take when the standard value of the information amount is the least.

In the abnormal behavior detection method according to the thirty-sixth aspect of this invention, the above-mentioned estimating step in each probabilistic distribution estimation apparatus may comprise the steps of calculating, using the stochastic model having hidden variables as a probabilistic distribution in which each data occurs by successively reading the string of vector data, a certainty for a value of the input data in which the input data occurs on the basis of parameters of the stochastic model, of renewing, by using the certainty and the parameters of the stochastic model, the parameters in response to new read data with past data forgotten, and of outputting several values of the calculated parameters.

In the abnormal behavior detection method according to the thirty-sixth aspect of this invention, the above-mentioned estimating step in each probabilistic distribution estimation apparatus may comprise the steps of carrying out session for converting the input data into the string of vector data when the input data have no structure of vector data, of calculating, using the stochastic model having hidden variables as a probabilistic distribution in which each data occurs by successively reading the string of vector data, a certainty for a value of the input data in which the input data occurs on the basis of parameters of the stochastic model, of renewing, by using the certainty and the parameters of the stochastic model, the parameters in response to new read data with past data forgotten, and of outputting several values of the calculated parameters.

According to a thirty-seventh aspect of this invention, an abnormal behavior detection method comprises the steps of inputting a string of vector data as input data, of calculating, using a time series model having a continuous time distribution and hidden variables as a probabilistic distribution in which each data occurs by successively reading the string of vector data, a certainty for a value of the input data in which the input data occurs on the basis of parameters of the time series model, of renewing, by using the certainty and the parameters of the time series model, the parameters in response to new read data with past data forgotten, and of outputting, by using parameters of an estimated probabilistic distribution, as a score, the certainty where new read data has a state corresponding to each hidden variable of the time series model.

According to a thirty-eighth aspect of this invention, an abnormal behavior detection method comprises the steps of inputting input data, of carrying out session for converting the input data into a string of vector data when the input data have no structure of vector data, of calculating, using a time series model having a continuous time distribution and hidden variables as a probabilistic distribution in which each data occurs by successively reading the string of vector data, a certainty for a value of the input data in which the input data occurs on the basis of parameters of the time series model, of renewing, by using the certainty and the parameters of the time series model, the parameters in response to new read data with past data forgotten, and of outputting, by using parameters of an estimated probabilistic distribution, as a score, the certainty where new read data has a state corresponding to each hidden variable of the time series model.

According to a thirty-ninth aspect of this invention, an abnormal behavior detection method comprises the steps of inputting a string of vector data as input data, of calculating, using a time series model having a continuous time distribution and hidden variables as a probabilistic distribution in which each data occurs by successively reading the string of vector data, a certainty for a value of the input data in which the input data occurs on the basis of parameters of the time series model, of renewing, by using the certainty and the parameters of the time series model, the parameters in response to new read data with past data forgotten, and of calculating, by using parameters of an estimated probabilistic distribution, an abnormal behavior degree of new read data using information amount of the new read data to produce the abnormal behavior degree.

In the thirty-ninth aspect of this invention, the abnormal behavior detection method may further comprise the step of calculating, by using the parameters of the estimated probabilistic distribution, a variation degree of a behavior model as a time-average of the abnormal behavior degrees for a predetermined width by reading a plurality of data.

According to a forty aspect of this invention, an abnormal behavior detection method comprises the steps of inputting input data, of carrying out session for converting the input data into a string of vector data when the input data have no structure of vector data, of calculating, using a time series model having a continuous time distribution and hidden variables as a probabilistic distribution in which each data occurs by successively reading the string of vector data, a certainty for a value of the input data in which the input data occurs on the basis of parameters of the time series model, of renewing, by using the certainty and the parameters of the time series model, the parameters in response to new read data with past data forgotten, and of calculating, by using parameters of an estimated probabilistic distribution, an abnormal behavior degree of new read data using information amount of the new read data to produce the abnormal behavior degree.

In the forty aspect of this invention, the abnormal behavior detection method may the step of calculating, by using the parameters of the estimated probabilistic distribution, a variation degree of a behavior model as a time-average of the abnormal behavior degrees for a predetermined width by reading a plurality of data.

According to a forty-first aspect of this invention, an abnormal behavior detection method comprises the steps of inputting a string of vector data as input data, of calculating, using a time series model having a continuous time distribution and hidden variables as a probabilistic distribution in which each data occurs by successively reading the string of vector data, a certainty for a value of the input data in which the input data occurs on the basis of parameters of the time series model, of renewing, by using the certainty and the parameters of the time series model, the parameters in response to new read data with past data forgotten, of calculating, by using parameters of an estimated probabilistic distribution, a first posteriori probability of a state corresponding to the hidden variables by reading reference data different from the input data, of calculating, by using the parameters of the estimated probabilistic distribution, a second posteriori probability of a state corresponding to the hidden variables by reading new read data as the input data, and of calculating, as a variation of a posteriori probability, a difference between the first and the second posteriori probabilities to produce the variation of the posteriori probability.

According to a forty-second aspect of this invention, an abnormal behavior detection method comprises the steps of inputting input data, of carrying out session for converting the input data into a string of vector data when the input data have no structure of vector data, of calculating, using a time series model having a continues time distribution and hidden variables as a probabilistic distribution in which each data occurs by successively reading the string of vector data, a certainty for a value of the input data in which the input data occurs on the basis of parameters of the time series model, of renewing, by using the certainty and the parameters of the time series model, the parameters in response to new read data with past data forgotten, of calculating, by using parameters of an estimated probabilistic distribution, a first posteriori probability of a state corresponding to the hidden variables by reading reference data different from the input data, of calculating, by using the parameters of the estimated probabilistic distribution, a second posteriori probability of a state corresponding to the hidden variables by reading new read data as the input data, and of calculating, as a variation of a posteriori probability, a difference between the first and the second posteriori probabilities to produce the variation of the posteriori probability.

According to a forty-third aspect of this invention, an abnormal behavior detection method comprises the steps of inputting a string of vector data as input data, of estimating, in parallel, parameters for time series models having continues time distributions and hidden variables of different number of states by using a plurality of probabilistic distribution estimation apparatuses, and of calculating, by using the parameters and the input data, standard values of information amount for the respective stochastic models to produce, as an optimum value, the number of the states where the hidden variables can take when the standard value of the information amount is the least.

In the abnormal behavior detection method according to the forty-third aspect of this invention, the above-mentioned estimating step in each probabilistic distribution estimation apparatus may comprise the steps of calculating, using the time series model having the continuous time distribution and the hidden variables as a probabilistic distribution in which each data occurs by successively reading the string of vector data, a certainty for a value of the input data in which said input data occurs on the basis of parameters of the stochastic model, of renewing, by using the certainty and the parameters of said time series model, the parameters in response to new read data with past data forgotten, and of outputting several values of the calculated parameters.

In the abnormal behavior detection method according to the forty-third aspect of this invention, the above-mentioned estimating step in each probabilistic distribution estimation apparatus may comprise the steps of carrying out session for converting the input data into the string of vector data when the input data have no structure of vector data, of calculating, using the time series model having the continuous time distribution and the hidden variables as a probabilistic distribution in which each data occurs by successively reading the string of vector data, a certainty for a value of the input data in which the input data occurs on the basis of parameters of the stochastic model, of renewing, by using the certainty and the parameters of the time series model, the parameters in response to new read data with past data forgotten, and of outputting several values of the calculated parameters.

According to a forty-fourth aspect of this invention, an abnormal behavior detection method comprises the steps of inputting a string of vector data as input data, of calculating, using a finite mixed distribution of hidden Marcov models each having a continuous time distribution as a probabilistic distribution in which each data occurs by successively reading the string of vector data, a certainty for a value of the input data in which the input data occurs on the basis of parameters of the finite mixed distribution of the hidden Marcov models, of renewing, by using the certainty and the parameters of the finite mixed distribution of the hidden Marcov models, the parameters in response to new read data with past data forgotten, and of outputting, by using parameters of an estimated probabilistic distribution, as a score, the certainty where new read data has a state corresponding to each hidden variable of the finite mixed distribution of the hidden Marcov models.

According to a forty-fifth aspect of this invention, an abnormal behavior detection method comprises the steps of inputting input data, of carrying out session for converting the input data into a string of vector data when the input data have no structure of vector data, of calculating, using a finite mixed distribution of hidden Marcov models each having a continuous time distribution as a probabilistic distribution in which each data occurs by successively reading the string of vector data, a certainty for a value of the input data in which the input data occurs on the basis of parameters of the finite mixed distribution of the hidden Marcov models, of renewing, by using the certainty and the parameters of the finite mixed distribution of the hidden Marcov models, the parameters in response to new read data with past data forgotten, and of outputting, by using parameters of an estimated probabilistic distribution, as a score, the certainty where new read data has a state corresponding to each hidden variable of the finite mixed distribution of the hidden Marcov models.

According to a forty-sixth aspect of this invention, an abnormal behavior detection method comprises the steps of inputting a string of vector data as input data, of calculating, using a finite mixed distribution of hidden Marcov models each having a continuous time distribution as a probabilistic distribution in which each data occurs by successively reading the string of vector data, a certainty for a value of the input data in which the input data occurs on the basis of parameters of the finite mixed distribution of the hidden Marcov models, of renewing, by using the certainty and the parameters of the finite mixed distribution of the hidden Marcov models, the parameters in response to new read data with past data forgotten, and of calculating, by using parameters of an estimated probabilistic distribution, an abnormal behavior degree of new read data using information amount of the new read data to produce the abnormal behavior degree.

In the forty-sixth aspect of this invention, the abnormal behavior detection method may further comprise the step of calculating, by using the parameters of the estimated probabilistic distribution, a variation degree of a behavior model as a time-average of the abnormal behavior degrees for a predetermined width by reading a plurality of data.

According to a forty-seventh aspect of this invention, an abnormal behavior detection method comprises the steps of inputting input data, of carrying out session for converting the input data into a string of vector data when the input data have no structure of vector data, of calculating, using a finite mixed distribution of hidden Marcov models each having a continuous time distribution as a probabilistic distribution in which each data occurs by successively reading the string of vector data, a certainty for a value of the input data in which the input data occurs on the basis of parameters of the finite mixed distribution of the hidden Marcov models, of renewing, by using the certainty and the parameters of the finite mixed distribution of the hidden Marcov models, the parameters in response to new read data with past data forgotten, and of calculating, by using parameters of an estimated probabilistic distribution, an abnormal behavior degree of new read data using information amount of the new read data to produce the abnormal behavior degree.

In the forty-seventh aspect of this invention, the abnormal behavior detection method may further comprise the step of calculating, by using the parameters of the estimated probabilistic distribution, a variation degree of a behavior model as a time-average of the abnormal behavior degrees for a predetermined width by reading a plurality of data.

According to a forty-eighth aspect of this invention, an abnormal behavior detection method comprises the steps of inputting a string of vector data as input data, of calculating, using a finite mixed distribution of hidden Marcov models each having a continuous time distribution as a probabilistic distribution in which each data occurs by successively reading the string of vector data, a certainty for a value of the input data in which the input data occurs on the basis of parameters of the finite mixed distribution of the hidden Marcov models, of renewing, by using the certainty and the parameters of the finite mixed distribution of the hidden Marcov models, the parameters in response to new read data with past data forgotten, of calculating, by using parameters of an estimated probabilistic distribution, a first posteriori probability of a state corresponding to the hidden variables by reading reference data different from the input data, of calculating, by using the parameters of the estimated probabilistic distribution, a second posteriori probability of a state corresponding to the hidden variables by reading new read data as the input data, and of calculating, as a variation of a posteriori probability, a difference between the first and the second posteriori probabilities to produce the variation of the posteriori probability.

According to a forty-ninth aspect of this invention, an abnormal behavior detection method comprises the steps of inputting input data, of carrying out session for converting the input data into a string of vector data when the input data have no structure of vector data, of calculating, using a finite mixed distribution of hidden Marcov models each having a continuos time distribution as a probabilistic distribution in which each data occurs by successively reading the string of vector data, a certainty for a value of the input data in which the input data occurs on the basis of parameters of the finite mixed distribution of the hidden Marcov models, of renewing, by using said certainty and the parameters of the finite mixed distribution of the hidden Marcov models, the parameters in response to new read data with past data forgotten, of calculating, by using parameters of an estimated probabilistic distribution, a first posteriori probability of a state corresponding to the hidden variables by reading reference data different from the input data, of calculating, by using the parameters of the estimated probabilistic distribution, a second posteriori probability of a state corresponding to the hidden variables by reading new read data as the input data, and of calculating, as a variation of a posteriori probability, a difference between the first and the second posteriori probabilities to produce the variation of the posteriori probability.

According to a fifty aspect of this invention, an abnormal behavior detection method comprises the steps of inputting a string of vector data as input data, of estimating, in parallel, parameters for finite mixed distributions of hidden Marcov models each having a continues time distribution of different number of states by using a plurality of probabilistic distribution estimation apparatuses, and of calculating, by using the parameters and the input data, standard values of information amount for the respective stochastic models to produce, as an optimum value, the number of the states where the hidden variables can take when the standard value of the information amount is the least.

In the abnormal behavior detection method according to the fifty aspect of this invention, the above-mentioned estimating step in each probabilistic distribution estimation apparatus may comprise the steps of calculating, using the finite mixed distribution of the hidden Marcov models each having the continuous time distribution as a probabilistic distribution in which each data occurs by successively reading the string of vector data, a certainty for a value of the input data in which said input data occurs on the basis of parameters of the finite mixed distribution of the hidden Marcov models, of renewing, by using the certainty and the parameters of the finite mixed distribution of the hidden Marcov models, the parameters in response to new read data with past data forgotten, and of outputting several values of said calculated parameters.

In the abnormal behavior detection method according to the fifty aspect of this invention, the above-mentioned estimating step in each probabilistic distribution estimation apparatus may comprise the steps of carrying out session for converting the input data into a string of vector data when the input data have no structure of vector data, of calculating, using the finite mixed distribution of the hidden Marcov models each having the continuous time distribution as a probabilistic distribution in which each data occurs by successively reading the string of vector data, a certainty for a value of the input data in which the input data occurs on the basis of parameters of the finite mixed distribution of the hidden Marcov models, of renewing, by using the certainty and the parameters of the finite mixed distribution of the hidden Marcov models, the parameters in response to new read data with past data forgotten, and of outputting several values of said calculated parameters.

According to a fifty-first aspect of this invention, a probabilistic distribution estimation program if for making a computer respond to, as input data, a string of vector data to estimate, using a stochastic model having hidden variables, a probabilistic distribution occurred in each data by successively reading the string of the vector data. The probabilistic distribution estimation program makes the computer operate as a parameter storage unit for storing all of parameters for the stochastic model having the hidden variables, as a certainty calculation arrangement for calculating, in response to the input data, a certainty where the input data occurs using the stochastic model by reading the parameters of the stochastic model from the parameter storage unit, as a parameter renewal arrangement for renewing contents of the parameter storage unit in accordance with new read data with past data forgotten by reading the certainty from the certainty calculation arrangement and by reading each parameter of the stochastic model from the parameter storage unit, and as an outputting arrangement for outputting several parameters of the stochastic model stored in the parameter storage unit.

In the fifty-first aspect of this invention, the probabilistic distribution estimation program may further make the program operate as a session arrangement for processing the input data into the string of vector data.

According to a fifty-second aspect of this invention, a probabilistic distribution estimation program is for making a computer respond to, as input data, a string of vector data to estimate, using a time series model having a continuous time distribution and hidden variables, a probabilistic distribution occurred in each data by successively reading the string of the vector data. The probabilistic distribution estimation program makes the computer operate as a parameter storage unit for storing all of parameters for the time series model having the continuous time distribution and the hidden variables, as a certainty calculation arrangement for calculating, in response to the input data, a certainty where the input data occurs using the time series model by reading the parameters of the time series model from the parameter storage unit, as a parameter renewal arrangement for renewing contents of the parameter storage unit in accordance with new read data with past data forgotten by reading the certainty from the certainty calculation means and by reading each parameter of the time series model from the parameter storage unit, and as an outputting arrangement for outputting several parameters of the time series model stored in the parameter storage unit.

In the fifty-second aspect of this invention, the probabilistic distribution estimation program may further make the program operate as a session arrangement for processing the input data into the string of vector data.

According to a fifty-third aspect of this invention, a probabilistic distribution estimation program is for making a computer respond to, as input data, a string of vector data to estimate, using a finite mixed distribution of hidden Macrov models each having a continuous time distribution, a probabilistic distribution occurred in each data by successively reading the string of the vector data. The probabilistic distribution estimation program makes the computer operate as a parameter storage unit for storing all of parameters for the finite mixed distribution of the hidden Marcov models each having the continuous distribution, as a certainty calculation arrangement for calculating, in response to the input data, a certainty where the input data occurs using the finite mixed distribution of the hidden Macrov models by reading the parameters of the finite mixed distribution of the hidden Marcov models from the parameter storage unit, as a parameter renewal arrangement for renewing contents of the parameter storage unit in accordance with new read data with past data forgotten by reading the certainty from the certainty calculation arrangement and by reading each parameter of the finite mixed distribution of said hidden Marcov models from the parameter storage unit, and as an outputting arrangement for outputting several parameters of the finite mixed distribution of the hidden Marcov models stored in the parameter storage unit.

In the fifty-third aspect of this invention, the probabilistic distribution estimation program may further make the program operate as a session arrangement for processing the input data into the string of vector data.

According to a fifty-fourth aspect of this invention, an abnormal behavior detection program is for making a computer operate as a probabilistic distribution estimation apparatus for responding to, as input data, a string of vector data to estimate, using a stochastic model, a probabilistic distribution occurred in each data by successively reading the string of the vector data and as a state estimation arrangement. The probabilistic distribution estimation apparatus comprises a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation arrangement and by reading each parameter of the stochastic model from the parameter storage unit. The state estimation arrangement uses the parameters of the probabilistic distribution estimated by the probabilistic distribution estimation apparatus to produce, as a score, the certainty where the new read data has a state corresponding to each hidden variable of the stochastic model.

According to a fifty-fifth aspect of this invention, an abnormal behavior detection program is for making a computer as a probabilistic distribution estimation apparatus for responding to, as input data, a string of vector data to estimate, using a stochastic model, a probabilistic distribution occurred in each data by successively reading the string of the vector data and as a state estimation arrangement. The probabilistic distribution estimation apparatus comprises a session arrangement for processing the input data into the string of vector data, a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation arrangement and by reading each parameter of the stochastic model from the parameter storage unit. The state estimation arrangement uses the parameters of the probabilistic distribution estimated by the probabilistic distribution estimation apparatus to produce, as a score, the certainty where the new read data has a state corresponding to each hidden variable of the stochastic model.

According to a fifty-sixth aspect of this invention, an abnormal behavior detection program is for making a computer operate as a probabilistic distribution estimation apparatus for responding to, as input data, a string of vector data to estimate, using a stochastic model, a probabilistic distribution occurred in each data by successively reading the string of the vector data and as an abnormality detection arrangement for calculating an information amount of new read data by using parameters of the probabilistic distribution estimated by the probabilistic distribution estimation apparatus to produce an abnormal behavior degree of the new read data. The probabilistic distribution estimation apparatus comprises a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation arrangement and by reading each parameter of the stochastic model from the parameter storage unit.

In the fifty-sixth aspect of this invention, the abnormal behavior detection program may further make the computer as operate as a behavior model variation degree calculation unit for calculating, by using the parameters of the probabilistic distribution estimated by the probabilistic distribution estimation unit, a variation degree of a behavior mode as a time-average of the abnormal behavior degrees for a predetermined width by reading a plurality of new data.

According to a fifty-seventh aspect of this invention, an abnormal behavior detection program is for making a computer operate as a probabilistic distribution estimation apparatus for responding to, as input data, a string of vector data to estimate, using a stochastic model, a probabilistic distribution occurred in each data by successively reading the string of the vector data and as an abnormality detection arrangement for calculating an information amount of new read data by using parameters of the probabilistic distribution estimated by the probabilistic distribution estimation apparatus to produce an abnormal behavior degree of the new read data. The probabilistic distribution estimation apparatus comprises a session arrangement for processing the input data into the string of vector data, a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation arrangement and by reading each parameter of the stochastic model from the parameter storage unit.

In the fifty-seventh aspect of this invention, the abnormal behavior detection program may further make the computer as operate as a behavior model variation degree calculation unit for calculating, by using the parameters of the probabilistic distribution estimated by the probabilistic distribution estimation apparatus, a variation degree of a behavior mode as a time-average of the abnormal behavior degrees for a predetermined width by reading a plurality of new data.

According to a fifty-eighth aspect of this invention, an abnormal behavior detection program is for making a computer operate as a probabilistic distribution estimation apparatus for responding to, as input data, a string of vector data to estimate, using a stochastic model, a probabilistic distribution occurred in each data by successively reading the string of the vector data, as a posteriori probability calculation arrangement for calculating a posteriori probability of a state corresponding to the hidden variables by using parameters of the probabilistic distribution estimated by the probabilistic distribution estimation apparatus, as a reference data input unit for inputting data different from the input data, and as a posteriori probability variation degree calculation arrangement for calculating a variation of the posteriori distribution and outputting it by using the posteriori distribution of the state corresponding to the hidden variables calculated by the posteriori distribution calculation arrangement on the basis of the data read out of the reference data input unit and by using the posteriori distribution of a state corresponding to the hidden variables calculated by the posteriori distribution calculation arrangement on the basis of the new read data. The probabilistic distribution estimation apparatus comprises a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and as a parameter renewal arrangement for renewing contents of the parameter storage unit in accordance with new read data with past data forgotten by reading the certainty from the certainty calculation means and by reading each parameter of the stochastic model having the respective hidden variables from the parameter storage unit;

According to a fifty-ninth aspect of this invention, an abnormal behavior detection apparatus is for making a computer operate as a probabilistic distribution estimation apparatus for responding to, as input data, a string of vector data to estimate, using a stochastic model, a probabilistic distribution occurred in each data by successively reading the string of the vector data, as a posteriori probability calculation arrangement for calculating a posteriori probability of a state corresponding to the hidden variables by using parameters of the probabilistic distribution estimated by the probabilistic distribution estimation apparatus, as a reference data input unit for inputting data different from the input data, and as a posteriori probability variation degree calculation arrangement for calculating a variation of the posteriori distribution and outputting it by using the posteriori distribution of the state corresponding to the hidden variables calculated by the posteriori distribution calculation arrangement on the basis of the data read out of the reference data input unit and by using the posteriori distribution of the state corresponding to the hidden variables calculated by the posteriori distribution calculation mean on the basis of the new read data. The probabilistic distribution estimation apparatus comprises a session arrangement for processing the input data into the string of vector data, a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation arrangement and by reading each parameter of the stochastic model having the respective hidden variables from the parameter storage unit;

According to a sixtieth aspect of this invention, an abnormal behavior detection program is for making a computer operate as a plurality of probabilistic distribution estimation apparatuses each of which responds to, as input data, a string of vector data to estimate, using a stochastic model, a probabilistic distribution occurred in each data by successively reading the string of the vector data and as an information amount standard calculation arrangement for calculating, by using, in parallel, the plurality of probabilistic distribution estimation apparatuses for the stochastic models having different number of the states where the hidden variables can take, standard values of information amount from parameters of the probabilistic distributions estimated by the respective probabilistic distribution estimation apparatuses and the input data to produce, as an optimum value, the number of states where the hidden variables can take when the standard value of the information amount is the least. Each of the probabilistic distribution estimation apparatuses comprises a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation arrangement and by reading each parameter of the stochastic model from the parameter storage unit.

According to a sixty-first aspect of this invention, an abnormal behavior detection program is for making a computer operate as a plurality of probabilistic distribution estimation apparatuses each of which responds to, as input data, a string of vector data to estimate, using a stochastic model, a probabilistic distribution occurred in each data by successively reading the string of the vector data an as an information amount standard calculation arrangement for calculating, by using, in parallel, the plurality of probabilistic distribution estimation apparatuses for the stochastic models having different number of states where the hidden variables can take, standard values of information amounts from parameters of the probabilistic distributions estimated by the respective probabilistic distribution estimation apparatuses and the input data to produce, as an optimum value, the number of states where the hidden variables can take when the standard value of the information amount is the least. Each of the probabilistic distribution estimation apparatuses comprises a session arrangement for processing the input data into the string of vector data, a parameter storage unit for storing all of parameters for the stochastic model having hidden variables, a certainty calculation arrangement for calculating, in response to the input data, a certainty where the input data occurs using the stochastic model by reading the parameters of the stochastic model from the parameter storage unit, and a parameter renewal arrangement for renewing contents of the parameter storage unit in accordance with new read data with past data forgotten by reading the certainty from the certainty calculation arrangement and by reading each parameter of the stochastic model from the parameter storage unit.

According to a sixty-second aspect of this invention, an abnormal behavior detection program is for making a computer operate as a probabilistic distribution estimation apparatus for responding to, as input data, a string of vector data to estimate, using a time series model, a probabilistic distribution occurred in each data by successively reading the string of the vector data and as a state estimation arrangement. The probabilistic distribution estimation apparatus comprises a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit. The state estimation arrangement uses the parameters of the probabilistic distribution estimated by the probabilistic distribution estimation apparatus to produce, as a score, the certainty where the new read data has a state corresponding to each hidden variable of the time series model.

According to a sixty-third aspect of this invention, an abnormal behavior detection program is for making a computer operate as a probabilistic distribution estimation apparatus for responding to, as input data, a string of vector data to estimate, using a time series model, a probabilistic distribution occurred in each data by successively reading the string of the vector data and as a state estimation arrangement. The probabilistic distribution estimation apparatus comprises a session arrangement for processing the input data into the string of vector data, a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit. The state estimation arrangement uses the parameters of the probabilistic distribution estimated by the probabilistic distribution estimation apparatus to produce, as a score, the certainty where the new read data has a state corresponding to each hidden variable of the time series model.

According to a sixty-third aspect of this invention, an abnormal behavior detection program is for making a computer operate as a probabilistic distribution estimation apparatus for responding to, as input data, a string of vector data to estimate, using a time series model, a probabilistic distribution occurred in each data by successively reading the string of the vector data and as an abnormality detection arrangement for calculating an information amount of new read data by using parameters of the probabilistic distribution estimated by the probabilistic distribution estimation apparatus to produce an abnormal behavior degree of the new read data. The probabilistic distribution estimation apparatus comprises a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit.

In the sixty-third aspect of this invention, the abnormal behavior detection program may further make the computer as operate as a behavior model variation degree calculation unit for calculating, by using the parameters of the probabilistic distribution estimated by the probabilistic distribution estimation unit, a variation degree of a behavior mode as a time-average of the abnormal behavior degrees for a predetermined width by reading a plurality of new data.

According to a sixty-fourth aspect of this invention, an abnormal behavior detection program is for making a computer operate as a probabilistic distribution estimation apparatus for responding to, as input data, a string of vector data to estimate, using a time series model, a probabilistic distribution occurred in each data by successively reading the string of the vector data and as an abnormality detection arrangement for calculating an information amount of new read data by using parameters of the probabilistic distribution estimated by the probabilistic distribution estimation apparatus to produce an abnormal behavior degree of the new read data. The probabilistic distribution estimation apparatus comprises a session arrangement for processing the input data into the string of vector data, a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit.

In the sixty-fourth aspect of this invention, the abnormal behavior detection program may further make the computer as operate as a behavior model variation degree calculation unit for calculating, by using the parameters of the probabilistic distribution estimated by the probabilistic distribution estimation unit, a variation degree of a behavior mode as a time-average of the abnormal behavior degrees for a predetermined width by reading a plurality of new data.

According to a sixty-fifth aspect of this invention, an abnormal behavior detection program is for making a computer operate as a probabilistic distribution estimation apparatus for responding to, as input data, a string of vector data to estimate, using a time series model, a probabilistic distribution occurred in each data by successively reading the string of the vector data, as a posteriori probability calculation arrangement for calculating a posteriori probability of a state corresponding to the hidden variables by using parameters of the probabilistic distribution estimated by the probabilistic distribution estimation apparatus, as a reference data input unit for inputting data different from the input data, and as a posteriori probability variation degree calculation arrangement for calculating a variation of the posteriori distribution and outputting it by using the posteriori distribution of the state corresponding to the hidden variables calculated by the posteriori distribution calculation arrangement on the basis of the data read out of the reference data input unit and by using the posteriori distribution of the state corresponding to the hidden variables calculated by the posteriori distribution calculation arrangement on the basis of the new read data. The probabilistic distribution estimation apparatus comprises a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit;

According to a sixty-sixth aspect of this invention, an abnormal behavior detection program is for making a computer operate as a probabilistic distribution estimation apparatus for responding to, as input data, a string of vector data to estimate, using a time series model, a probabilistic distribution occurred in each data by successively reading the string of the vector data, a posteriori probability calculation arrangement for calculating a posteriori probability of a state corresponding to the hidden variables by using parameters of the probabilistic distribution estimated by the probabilistic distribution estimation apparatus, as a reference data input unit for inputting data different from the input data, and as a posteriori probability variation degree calculation arrangement for calculating a variation of the posteriori distribution and outputting it by using the posteriori distribution of the state corresponding to the hidden variables calculated by the posteriori distribution calculation arrangement on the basis of the data read out of the reference data input unit and by using the posteriori distribution of the state corresponding to the hidden variables calculated by the posteriori distribution calculation arrangement on the basis of the new read data. The probabilistic distribution estimation apparatus comprises a session arrangement for processing the input data into the string of vector data, a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation means and by reading the parameters of the time series model from the parameter storage unit.

According to a sixty-seventh aspect of this invention, an abnormal behavior detection program is for making a computer operate as a plurality of probabilistic distribution estimation apparatuses each of which responds to, as input data, a string of vector data to estimate, using a time series model, a probabilistic distribution occurred in each data by successively reading the string of the vector data and as an information amount standard calculation arrangement for calculating, by using, in parallel, the plurality of probabilistic distribution estimation apparatuses for the time series models having different number of states where the hidden variables can take, standard values of information amounts from parameters of the probabilistic distributions estimated by the respective probabilistic distribution estimation apparatuses and the input data to produce, as an optimum value, the number of states where the hidden variables can take when the standard value of the information amount is the least. Each of the probabilistic distribution estimation apparatuses comprises a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit.

According to a sixty-eighth aspect of this invention, an abnormal behavior detection program is for making a computer operate as a plurality of probabilistic distribution estimation apparatuses each of which responds to, as input data, a string of vector data to estimate, using a time series model, a probabilistic distribution occurred in each data by successively reading the string of the vector data and as an information amount standard calculation arrangement for calculating, by using, in parallel, the plurality of probabilistic distribution estimation apparatuses for the time series models having different number of the states where the hidden variables can take, standard values of information amounts from the parameters of the probabilistic distributions estimated by the respective probabilistic distribution estimation apparatuses and the input data to produce, as an optimum value, the number of states where the hidden variables can take when the standard value of the information amount is the least. Each of the probabilistic distribution estimation apparatuses comprises a session arrangement for processing the input data into the string of vector data, a parameter storage unit for storing all of parameters for the time series model having a continuous time distribution and hidden variables, a certainty calculation arrangement for calculating, in response to the input data, a certainty where the input data occurs using the time series model by reading the parameters of the time series model from the parameter storage unit, and a parameter renewal arrangement for renewing contents of the parameter storage unit in accordance with new read data with past data forgotten by reading the certainty from the certainty calculation arrangement and by reading the parameters of the time series model from the parameter storage unit.

According to a sixty-ninth aspect of this invention, an abnormal behavior detection program is for making a computer operate as a probabilistic distribution estimation apparatus for responding to, as input data, a string of vector data to estimate, using a finite mixed distribution of hidden Marcov models, a probabilistic distribution occurred in each data by successively reading the string of the vector data and as a state estimation arrangement. The probabilistic distribution estimation apparatus comprises a parameter storage unit for storing all of parameters for the finite mixed distribution of the hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation arrangement and by reading the parameters of the finite mixed distribution of the hidden Marcov models from the parameter storage unit. The state estimation arrangement uses the parameters of the probabilistic distribution estimated by the probabilistic distribution estimation apparatus to produce, as a score, the certainty where the new read data has a state corresponding to each hidden variable of the finite mixed distribution of the hidden Marcov models.

According to a seventieth aspect of this invention, an abnormal behavior detection program is for making a computer operate as a probabilistic distribution estimation apparatus for responding to, as input data, a string of vector data to estimate, using a finite mixed distribution of hidden Marcov models, a probabilistic distribution occurred in each data by successively reading the string of the vector data and a state estimation arrangement. The probabilistic distribution estimation apparatus comprises a session arrangement for processing the input data into the string of vector data, a parameter storage unit for storing all of parameters for the finite mixed distribution of said hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of said hidden Marcov models from the parameter storage unit, and a parameter renewal arrangement for renewing contents of the parameter storage unit in accordance with new read data with past data forgotten by reading the certainty from the certainty calculation arrangement and by reading the parameters of the finite mixed distribution of the hidden Marcov models from the parameter storage unit. The state estimation arrangement uses the parameters of the probabilistic distribution estimated by the probabilistic distribution estimation apparatus to produce, as a score, the certainty where the new read data has a state corresponding to each hidden variable of the finite mixed distribution of the hidden Marcov models.

According to a seventy-first aspect of this invention, an abnormal behavior detection program is for making a computer operate as a probabilistic distribution estimation apparatus for responding to, as input data, a string of vector data to estimate, using a finite mixed distribution of hidden Marcov models, a probabilistic distribution occurred in each data by successively reading the string of the vector data and as an abnormality detection arrangement for calculating an information amount of new read data by using parameters of the probabilistic distribution estimated by the probabilistic distribution estimation apparatus to produce an abnormal behavior degree of the new read data. The probabilistic distribution estimation apparatus comprises a parameter storage unit for storing all of parameters for the finite mixed distribution of the hidden Marcov models each having a continuous time distribution, a certainty calculation means for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation arrangement and by reading the parameters of the finite mixed distribution of the hidden Marcov models from the parameter storage unit.

In the seventy-first aspect of this invention, the abnormal behavior detection program may further make the computer as operate as a behavior model variation degree calculation unit for calculating, by using the parameters of the probabilistic distribution estimated by the probabilistic distribution estimation apparatus, a variation degree of a behavior mode as a time-average of the abnormal behavior degrees for a predetermined width by reading a plurality of new data.

According to a seventy-second aspect of this invention, an abnormal behavior detection program is for making a computer operate as a probabilistic distribution estimation apparatus for responding to, as input data, a string of vector data to estimate, using a finite mixed distribution of hidden Marcov models, a probabilistic distribution occurred in each data by successively reading the string of the vector data and as an abnormality detection arrangement for calculating an information amount of new read data by using parameters of the probabilistic distribution estimated by the probabilistic distribution estimation apparatus to produce an abnormal behavior degree of the new read data. The probabilistic distribution estimation apparatus comprises a session arrangement for processing the input data into the string of vector data, a parameter storage unit for storing all of parameters for the finite mixed distribution of the hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation arrangement and by reading the parameters of the finite mixed distribution of the hidden Marcov models from the parameter storage unit.

In the seventy-second aspect of this invention, the abnormal behavior detection program may further make the computer as operate as a behavior model variation degree calculation unit for calculating, by using the parameters of the probabilistic distribution estimated by the probabilistic distribution estimation apparatus, a variation degree of a behavior mode as a time-average of the abnormal behavior degrees for a predetermined width by reading a plurality of new data.

According to a seventy-third aspect of this invention, an abnormal behavior detection program is for making a computer operate as a probabilistic distribution estimation apparatus for responding to, as input data, a string of vector data to estimate, using a finite mixed distribution of hidden Marcov models, a probabilistic distribution occurred in each data by successively reading the string of the vector data, as a posteriori probability calculation arrangement for calculating a posteriori probability of a state corresponding to the hidden variables by using parameters of the probabilistic distribution estimated by the probabilistic distribution estimation apparatus, as a reference data input unit for inputting data different from the input data, and as a posteriori probability variation degree calculation arrangement for calculating a variation of the posteriori distribution and outputting it by using the posteriori distribution of the state corresponding to the hidden variables calculated by the posteriori distribution calculation arrangement on the basis of the data read out of the reference data input unit and by using the posteriori distribution of the state corresponding to the hidden variables calculated by the posteriori distribution calculation arrangement on the basis of the new read data. The probabilistic distribution estimation apparatus comprises a parameter storage unit for storing all of parameters for the finite mixed distribution of the hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation means and by reading the parameters of the finite mixed distribution of the hidden Marcov models from the parameter storage unit.

According to a seventy-fourth aspect of this invention, an abnormal behavior detection program is for making a computer operate as a probabilistic distribution estimation apparatus for responding to, as input data, a string of vector data to estimate, using a finite mixed distribution of hidden Marcov models, a probabilistic distribution occurred in each data by successively reading the string of the vector data, as a posteriori probability calculation arrangement for calculating a posteriori probability of a state corresponding to the hidden variables by using parameters of the probabilistic distribution estimated by the probabilistic distribution estimation apparatus, as a reference data input unit for inputting data different from the input data, and as a posteriori probability variation degree calculation arrangement for calculating a variation of the posteriori distribution and outputting it by using the posteriori distribution of the state corresponding to the hidden variables calculated by the posteriori distribution calculation arrangement on the basis of the data read out of the reference data input unit and by using the posteriori distribution of the state corresponding to the hidden variables calculated by the posteriori distribution calculation mean on the basis of the new read data. The probabilistic distribution estimation apparatus comprises a session arrangement for processing the input data into the string of vector data, a parameter storage unit for storing all of parameters for the finite mixed distribution of the hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation means and by reading the parameters of the finite mixed distribution of the hidden Marcov models from the parameter storage unit.

According to a seventy-fifth aspect of this invention, an abnormal behavior detection program is for making a computer operate as a plurality of probabilistic distribution estimation apparatuses each of which responds to, as input data, a string of vector data to estimate, using a finite mixed distribution of hidden Marcov models, a probabilistic distribution occurred in each data by successively reading the string of the vector data and as an information amount standard calculation arrangement for calculating, by using, in parallel, the plurality of probabilistic distribution estimation apparatuses for the finite mixed distributions of the hidden Marcov models having different number of the states where the hidden variables can take, standard values of information amounts from the parameters of the probabilistic distributions estimated by the respective probabilistic distribution estimation apparatuses and the input data to produce, as an optimum value, the number of states where the hidden variables can take when the standard value of the information amount is the least. Each of the probabilistic distribution estimation apparatuses comprises a parameter storage unit for storing all of parameters for the finite mixed distribution of the hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation arrangement and by reading the parameters of the finite mixed distribution of the hidden Marcov models from the parameter storage unit.

According to a seventy-sixth aspect of this invention, an abnormal behavior detection program is for making a computer operate as a plurality of probabilistic distribution estimation apparatuses each of which responds to, as input data, a string of vector data to estimate, using a finite mixed distribution of hidden Marcov models, a probabilistic distribution occurred in each data by successively reading the string of the vector data and as an information amount standard calculation arrangement for calculating, by using, in parallel, the plurality of probabilistic distribution estimation apparatuses for the finite mixed distributions of the hidden Marcov models having different number of states where the hidden variables can take, standard values of information amounts from parameters of the probabilistic distributions estimated by the respective probabilistic distribution estimation apparatuses and the input data to produce, as an optimum value, the number of states where the hidden variables can take when the standard value of the information amount is the least. Each of the probabilistic distribution estimation apparatuses comprises a session arrangement for processing the input data into the string of vector data, a parameter storage unit for storing all of parameters for the finite mixed distribution of the hidden Marcov models each having a continuous time distribution, a certainty calculation arrangement for calculating, in response to the input data, a certainty where the input data occurs using the finite mixed distribution of the hidden Marcov models by reading the parameters of the finite mixed distribution of the hidden Marcov models from the parameter storage unit, and a parameter renewal arrangement for renewing contents of the parameter storage unit in accordance with new read data with past data forgotten by reading the certainty from the certainty calculation arrangement and by reading the parameters of the finite mixed distribution of the hidden Marcov models from the parameter storage unit.

DESCRIPTION OF THE PREFERRED EMBODIMENTS

Figure 1:
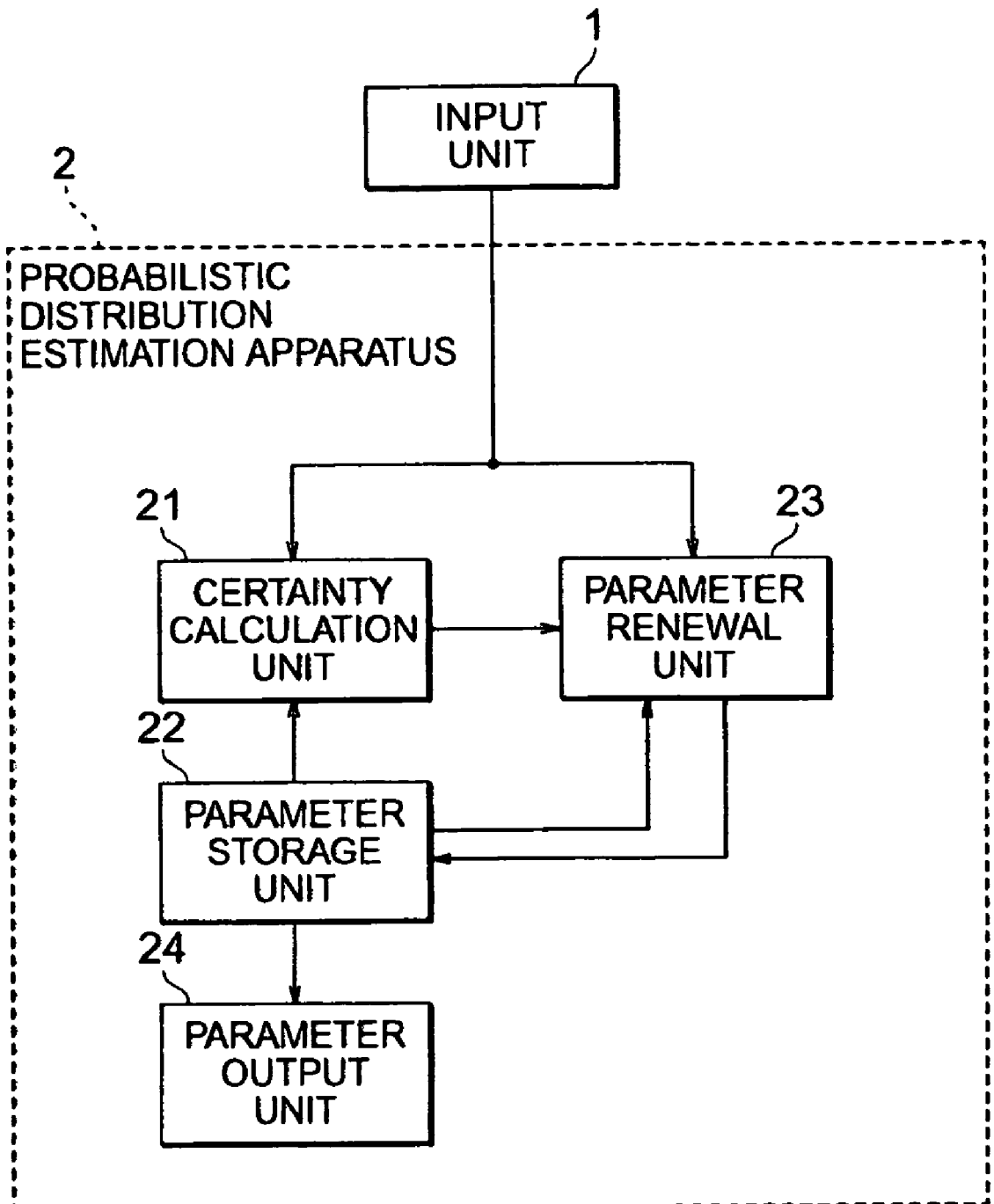
FIG. 1 shows a block diagram of a probabilistic distribution estimation apparatus according to a first embodiment of this invention.

Referring to FIG. 1, the description will proceed to a probabilistic distribution estimation apparatus 2 according to a first embodiment of this invention. The probabilistic distribution estimation apparatus 2 is connected to an input unit 1. The probabilistic distribution estimation apparatus 2 comprises a certainty calculation unit 21, a parameter storage unit 22, a parameter renewal unit 23, and a parameter output unit 24.

The probabilistic distribution estimation apparatus 2 is for responding to, as input data, a string of vector data to estimate, using a stochastic model having hidden variables, a probabilistic distribution occurred in each data by successively reading the string of vector data.

The parameter storage unit 22 is a unit for storing all of parameters of the stochastic model having the hidden variables. The certainty calculation unit 21 is a unit for calculating a certainty where the input data occurs. Specifically, the certainty calculation unit 21 calculates, in response to the input data, the certainty where the input data occurs using the stochastic model by reading the parameters of the stochastic model from the parameter storage unit 22. The parameter renewal unit 23 renews the parameters in accordance with a parameter renewal rule which will later be described. In other words, the parameter renewal unit 23 renews contents of the parameter storage unit 22 in accordance with new read data with past data forgotten by reading the certainty from the certainty calculation unit 21 and by reading each parameter of the stochastic model from the parameter storage unit 22. The parameter output unit 24 outputs the parameters stored in the parameter storage unit 22. That is, the parameter output unit 24 outputs several parameters of the stochastic model stored in the parameter storage unit 22.

Figure 2:
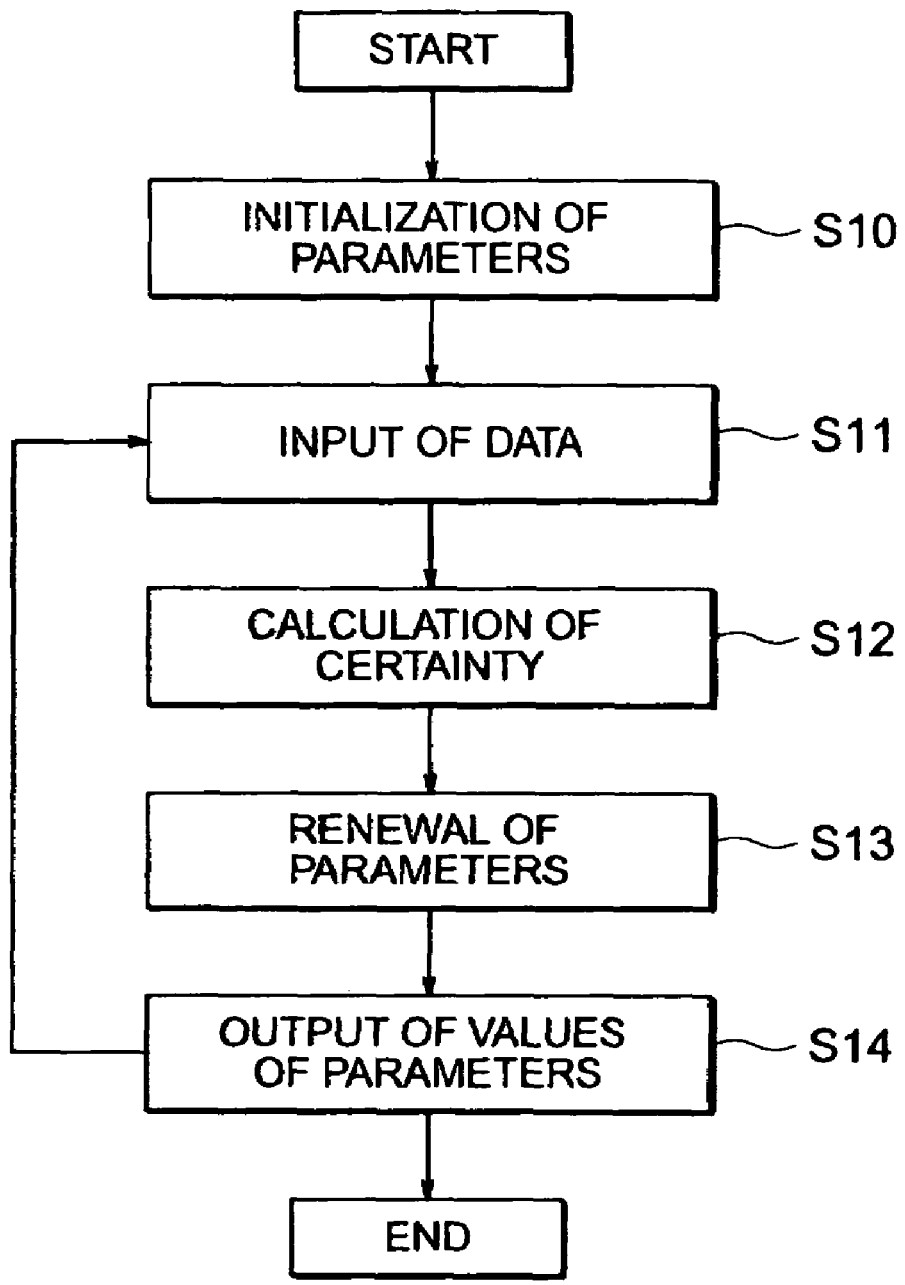
FIG. 2 is a flow chart for use in describing operation of the probabilistic distribution estimation apparatus illustrated in FIG. 1.

Referring to FIG. 2 in addition to FIG. 1, description will be made as regards operation of the probabilistic distribution estimation apparatus 2.

Prior to data reading, a value of each parameter stored in the parameter storage unit 22 is initialized at a step S10. Subsequently, the probabilistic distribution estimation apparatus 2 carries out operation every when new data y is supplied thereto in the manner which will presently be described. The new data y is delivered to the certainty calculation unit 21 and the parameter renewal unit 23 to be stored therein (step S11).

The certainty calculation unit 21 reads a value of a current parameter from the parameter storage unit 22, calculates a certainty for generating the new data y using the value of the current parameter, and sends the certainty to the parameter renewal unit 23 (step S12).

The parameter renewal unit 23 reads the value of the current parameter from the parameter storage unit 22, reads the new data y, and rewrites the value of the parameters stored in the parameter storage unit 22 (step S13).

The parameter renewal rule is a rule obtained by improving an EM algorithm for use in a normal parameter estimation so as to able to adaptively learn on on-line and at a high-speed. An example of the EM algorithm is an article contributed by Dempster et al. to "Journal of the Royal Statistical Society," Series B, Vol. 39, No. 1, 1977, pages 1-38, under the title of "Maximum likelihood from incomplete data via the EM algorithm." The EM algorithm is an algorithm which maximizes a conditional expected value of a logarithm scale using all data every repetition. On maximizing the conditional expected value of the logarithm scale, a parameter is calculated using a conditional expected value of a sufficient statistical amount. On the other hand, the parameter renewal rule becomes the algorithm for calculating the conditional expected value of the sufficient statistical amount weighted with an oblivion coefficient r with data serially read. More specifically, it is assumed that data $y^j = (y_1, \ldots, y_{Tj})$ is a j-th read data. A conditional expected value of a weighted sufficient statistical amount for all data is obtained by weighting the conditional expected value of the sufficient statistical amount of a current data $y^j$ with r, by weighting the conditional expected value of the sufficient statistical amount of past data $y^1, \ldots, y^{j-1}$ with (1−r), and by summing those. That is, this realizes estimation where previous data is oblivious for past first through (j−1)-th data. It will be assumed that the oblivion coefficient r is a constant between zero and one, both exclusive, independent of data, namely, $0 < r < 1$. In this event, when the oblivion coefficient r has a large value, estimation for being oblivious past is carried out. If $r = 1/j$, it is possible to learn with all of the first through j-th data equally weighted. In addition, it is possible to determine the oblivion coefficient r dependent from data so that, for example, data is more lightly weighted when certainty of the current data is small. By using the parameter renewal rule which is described above, it is possible to adaptively learn data whose tendency changes as time passes.

Description will be made in more detailed. At first, description will be made as regards learning of behavior data represented by discrete vector data.

It will be assumed that discrete vector values of data y=($y_1, \ldots, y_T$) has a probabilistic distribution which occurs, for example, according to an expression (1) indicating a finite mixed distribution of an n-dimensional hidden Markov model.

$$P(y|\theta) = \sum_{k=1}^{K} \pi_k P_k(y|\theta_k) \tag{1}$$

where K represents an integer indicative of an overlapped number of the finite mixed distribution, $\pi_k$ (k=1, . . . , K) represents occurrence probability of each hidden Markov model that is satisfied with an expression (2):

$$\pi_k \geq 0 \text{ and } \sum_{k=1}^{K} \pi_k = 1 \tag{2}$$

The probabilistic distribution of the data y is represented by an expression (3) indicating K n-dimensional hidden Markov models of the finite mixed distribution.

$$P_k(y|\theta_k) = \tag{3}$$

$$\sum_{(x_1,\ldots,x_T)} \left( \gamma(x_1, \ldots, x_n) \prod_{t=n+1}^{T} a(x_t|x_{t-1}, \ldots, x_{t-n}) \prod_{t=1}^{T} b(y_t|x_t) \right)$$

where $x_1, \ldots, x_T$ represent hidden variable series, $\gamma$ represents an initial probabilistic vector, and a and b represent probabilistic transition matrix.

$$\sum_{(x_1,\ldots,x_T)}$$

means a summation of all combinations of the hidden variable series $x_1, \ldots, x_T$.

When the hidden variable series $x_1, \ldots, x_T$ are equal to $y_1, \ldots, y_T$, namely, $x_1=y_1, \ldots, x_T=y_T$, the hidden Markov model becomes a Markov model. When the integer K is equal to one, namely, K=1, and when the number of a state where a hidden variable can take is equal to one, the finite mixed distribution of the hidden Markov model becomes a naive Bayes model.

It will be assumed that it is practically difficult to calculate the expression (3) because the number of the state where the hidden variable can take and a value of T are large. In this event, the expression (3) is approximated by probability of transition series in an optimum state that is calculated by using a Viterbi algorithm by Viterbi. Such a Viterbi algorithm is described in IEEE Transactions on Information Theory, 13, 1967, pages 260-267 under the title of "Error bounds for convolutional codes and an asymptotically optimum decoding algorithm." It will be assumed that the occurrence probability $\pi_k$ of a k-th hidden Markov model, an occurrence probability of each output symbol in the initial probabilistic vector y, and probability of each state transition in the probabilistic transition matrix are represented by a parameter vector $\theta_k$ (k=1, . . . , K) and $\theta=(\theta 1, \ldots, \theta_k)$.

The parameter storage unit 22 stores $c_k, \gamma_1, a_1$, and $b_1$ for the above-mentioned parameter $\theta$ and each k that are calculated by a parameter renewal rule which will be later be described. It is assumed that the number K of the hidden Markov models, the oblivion coefficient r representative of an oblivion rate of the past data ($0<r<1$; the past data is quickly oblivious when the oblivion coefficient r is large), and a parameter v are preliminarily given and all of these parameters are initialized before data is read.

The certainty calculation unit 21 calculates certainty as occurrence probability in accordance with the expressions (1) and (3).

The parameter renewal unit 23 successively calculates parameters for each k=1, . . . , K as represented by following expressions (4) through (11):

$$c_k = (1-v\tau)\frac{\pi_k P_k(y|\theta_k)}{\sum_{k'}\pi_{k'}P_{k'}(y|\theta_{k'})} + \frac{v\tau}{K} \tag{4}$$

$$\pi_k := (1-r)\pi_k + rc_k \tag{5}$$

$$\gamma_1(s_1, \ldots, s_n) := (1-r)\gamma_1(s_1, \ldots, s_n) + rc_k \sum_{s_{n+1}} T_{s_1,\ldots,s_{n+1},1} \tag{6}$$

$$\gamma(s_1, \ldots, s_n) = \gamma_1(s_1, \ldots, s_n) \Big/ \sum_{(s'_1,\ldots,s'_n)} \gamma_1(s'_1, \ldots, s'_n) \tag{7}$$

$$a_1(s_1, \ldots, s_n, s_{n+1}) := (1-r)a_1(s_1, \ldots, s_n, s_{n+1}) + \tag{8}$$

$$rc_k \sum_{t=1}^{T-n} \tau_{s_1,\ldots,s_{n+1},t}$$

$$a(s_{n+1}|s_n, \ldots, s_1) = a_1(s_1, \ldots, s_n, s_{n+1}) \Big/ \tag{9}$$

$$\sum_{s_{n+1}} a_1(s_1, \ldots, s_n, s_{n+1})$$

$$b_1(s, u) := (1-r)b_1(s, u) + rc_k \sum_{t=1 \wedge y_t=u}^{T} \tau'_{s,t} \tag{10}$$

$$b(u|s) = b_1(s, u) \Big/ \sum_{u'} b_1(s, u') \tag{11}$$

The expression (5) is calculation for renewing the conditional expected value of the weighted sufficient statistical amount having the coefficient $\pi_k$ of the finite mixed distribution. The parameters $\gamma_1, a_1$, and $b_1$ of the expressions (6), (8), and (10) are calculations for renewing the conditional expected values of the weighted sufficient statistical amounts for the parameters $\gamma$, a, and b of the n-dimensional hidden Marcov model, respectively. In all of the expressions (5), (6), (8), and (10), calculation is carried out by weighting the conditional expected value of the sufficient statistical amount of current data y with r, by weighting the conditional expected values of the sufficient statistical amounts of past data with (1−r), and by summing these values. The coefficient $\pi_k$ of the finite mixed distribution is the conditional expected value of the weighted sufficient statistical amount that is calculated in accordance with the expression (5). The parameters $\gamma$, a, and b of the n-dimensional hidden Marcov model are calculated by normalizing $\gamma_1, a_1$, and $b_1$ as expressed by the expressions (7), (9), and (11).

In the expressions (10) and (11), u represents each symbol of the input data. In the expressions (6) to (11), s, s', and $s_1, \ldots, s_{n+1}$ represent hidden variable symbols, τ represents a posteriori probability of the hidden variable from a time instant (t−n+1) to a time instant (t+1) when the input data is given, and τ' represents a posteriori probability of the hidden variable at a time instant t when the input data is given. The posteriori probabilities are calculated by using a Baum-Welch algorithm by Baum et al. that is well used in a parameter estimation of the hidden Marcov model. The Baum-Welch algorithm is described in The Annals of Mathematical Statistics, 41(1), 1970, pages 164-171 under the title of "A maximization technique occurring in the statistical analysis of probabilistic functions of Markov chains." In addition, a symbol of ":=" means to substitute a calculated result of a right-hand into a left-hand and a symbol of "Λy$_t$=u" means to sum only when a symbol of the input data at a t-th time instant is equal to u.

In the above, description is made as regards the probabilistic distribution estimation apparatus for learning the behavior data represented by discrete vector data with the finite mixed distribution of the n-dimensional hidden Marcov model exemplified a stochastic model having the hidden variables.

In the manner which is described above, the finite mixed distribution of the hidden Marcov model includes the Marcov model, the naive Bayes model, and a finite mixed distribution of them. Besides the finite mixed distribution of the hidden Marcov model, the stochastic model having the hidden variables representative of the discrete vector data may be the hidden Marcov model having a continuous time distribution, a finite-state probabilistic automaton, a Bayesian network, a neural network, or the like.

It will be assumed that the hidden variable $x_t$ at a time instant t is represented by $x_t=h_x(x_1, \ldots, x_{t-1})$ using a linear or a non-linear function $h_x$. It will be assumed that an observed time sequence $y_t$ is represented by $y_t=h_y(x_1, \ldots, x_t)$ using a linear or a non-linear function $h_y$. In this event, there is a state space model representing all of discrete vector data represented by $h_x$ and $h_y$. It is possible to apply the parameter renewal rule as regards a stochastic model having all of hidden variables which are capable of analytically calculating the conditional expected value of the sufficient statistical values.

Now, description will proceed to learning of behavior data represented by continuous vector data.

It will be assumed that data $y=(y_1, \ldots, y_T)$ having continuous vector values occurs in accordance with a probabilistic distribution, for example, represented by the expression (1) which represents the finite mixed distribution of a one-dimensional hidden Marcov model having a continuous time distribution and an autoregressive model corresponding to each state, where $y_1, \ldots, y_T$ represent multi-dimensional continuous vector values, respectively. Similar to a case of discrete vector data, K represents an integer indicative of a overlapped number of the finite mixed distribution and $\pi_k$ (k=1, ..., K) represents an occurrence probability of each one-dimensional hidden Marcov model that satisfies the expression (2). The probabilistic distribution is represented by expressions (12) through (14) which represent the one-dimensional hidden Marcov model having K continuous time distributions of the finite mixed distribution and the autoregressive model corresponding to each state.

$$P_k(y | \theta_k) = \sum_{(x1,\ldots,xT')(d1,\ldots,dT')} \gamma(x_1) \prod_{t=2}^{T'} a(x_t | x_{t-1}) \prod_{t=1}^{T'} P(d_t, y(t) | x_t) \quad (12)$$

$$P(d_t, y(t) | x_t) = P(d_t | x_t = s) \prod_{t=0}^{d_t-1} P(y_{\omega t+t} | y_{\omega t+t-L}^{\omega t+t-1}, \theta_s) \quad (13)$$

$$y_{\omega t+y-L}^{\omega t+t-1} := y_{wt-t-1}, \ldots, y_{\omega t+t-L}$$

$$P(d_t | x_t = s) = e^{-\lambda_s} \lambda_s^{d_t}/d_t! \quad (14)$$

where $x_1, \ldots, x_T$ represent hidden variable sequences, γ represents an initial probabilistic vector, and a and b represent probabilistic transition matrixes. It is assumed that successive hidden variables $x_T$, $X_{T+1}$ indicate different states and T'□T. $P(d_t|x_t=s)$ in the expression (13) is a probability of the continuous time distribution when the hidden variable $x_T$ is put into the state s. The continuous time distribution may be, for instance, a Poisson distribution, a geometrical distribution, an exponential distribution, a gamma distribution, or the like. The hidden Marcov model having the continuous time distribution has inclusion relation to a normal hidden Marcov model. When the continuous time distribution is the geometrical distribution, the hidden Marcov mode having the continuous time distribution is the normal Marcov model. Now, description will be exemplified with a case of the Poisson distribution expressed by the expression (14).

An expression (15) represents a formula of an L-dimensional autoregressive model.

$$P(y_{\omega t+t} | y_{\omega t+t-L}^{\omega t+t-i}, \theta_s) = \frac{1}{(2\pi)^{L/2} |\Sigma_s|^{1/2}} \times \quad (15)$$

$$\exp\left\{-\frac{1}{2}(y_{\omega t+t} - \mu_s - (\beta_{s,1}(y_{wt+t-1} - \mu_s) + \ldots + \beta_{s,L}(y_{\omega t+t-L} - \mu_s)))^T \times \right.$$

$$\sum_s^{-1} y_{\omega t+t} - \mu_s - (\beta_{s,1}(y_{\omega t+t-1} - \mu_s) + \ldots +$$

$$\left. \beta_{s,L}(y_{\omega t+t-L} - \mu_s)))\right\}$$

An average $\mu_s$ of the autoregressive model corresponding to a state where each hidden variable can take, coefficients $\beta_1, \ldots, \beta_L$, and a variance covariance matrix $\Sigma_s$ are represented by a parameter vector $\theta_s$. An occurrence probability $\pi_k$ of a k-th hidden Marcov model, an occurrence probability of each output symbol in the initial probabilistic vector γ, each state transition probability in the probabilistic transition matrix a and b, an parameter $\lambda_s$ of the continuous time distribution corresponding to each state of the hidden variable, and the above-mentioned parameter vector $\theta_s$ are represented by a parameter vector $\theta_k$ (k=1, ..., K) and $\theta=(\theta_1, \ldots, \theta_k)$.

It will be assumed that it is practically difficult to calculate the expression (12) because the number of state in which the hidden variable can take and the value of T are large in the similar manner as a case of an example of the discrete vector data. In this event, the expression (12) is approximated by a probability of the state transition sequence of the optimum state which is calculated by using an algorithm where the Viterbi algorithm by Viterbi is expanded to a case having the continuous time distribution. Such an algorithm is described in a book "Speech recognition by a Stochastic model" edited by the institute of electronics, information and communication engineers, 1988, pages 74-78.

The parameter storage unit 22 stores parameters $c_k$, $\gamma_1$, $a_1$, $b_1$, $d_s$, $\lambda_{s,1}$, $\mu_{s,1}$, $C_{s,l,1}$, and $\Sigma_{s,1}$ for the above-mentioned parameter θ and each k that are calculated in accordance with a parameter renewal rule which will later be described. In the similar manner as a case of an example of the discrete vector data, it will be assumed that the number K of the hidden Marcov models, the oblivion coefficient r indicative of the oblivion rate of the past data (0<r<1; the past data is quickly oblivious when r is large), and a parameter v are preliminarily given and all of the parameters are initialized before date is read.

The certainty calculation unit 21 calculates certainty in accordance with the expressions (1), (12) through (15). The parameter renewal unit 23 successively calculates the parameters for each k=1, ..., K in accordance with the expressions (4) and (5) and following expressions (16) through (29):

$$\gamma_1(s) := (1-r)\gamma_1(s) + rc_k \tau'_{s,1} \tag{16}$$

$$\gamma(s) = \gamma_1(s) \Big/ \sum_{s''} \gamma_1(s'') \tag{17}$$

$$a_1(s, s') := (1-r)a_1(s, s') + rc_k \sum_{t=1}^{T-1} \sum_d \tau_{s,s',d,t} \tag{18}$$

$$a(s' \mid s) = a_1(s, s') \Big/ \sum_{s''} a_1(s, s'') \tag{19}$$

$$d_s := (1-r)d_s + rc_k \sum_t \sum_d \tau''_{s,d,t} d \tag{20}$$

$$\lambda_{s,1} := (1-r)\lambda_{s,1} + rc_k \sum_t \sum_d \tau''_{s,d,t} \tag{21}$$

$$\lambda_s = d_s / \lambda_{s,1} \tag{22}$$

$$\mu_{s,1} := (1-r)\mu_{s,1} + rc_k \sum_t \sum_d \tau''_{s,d,t} \sum_{d'=0}^{d-1} y_{t+d'} \tag{23}$$

$$\mu_s = \mu_{s,1}/d_s \tag{24}$$

$$C_{s,l,1} := (1-r)C_{s,l,1} + \tag{25}$$
$$rc_k \sum_t \sum_d \tau''_{s,d,t} \sum_{d'=0}^{d-1} (y_{t+d'} - \mu_s)(y_{t+d'-l} - \mu_s)^T$$

$$C_{s,l} = C_{s,l,1}/d_s \tag{26}$$

$$C_{s,l} = \sum_{l'=1}^{L} \beta_{s,l'} C_{s,l-l'} \tag{27}$$

$$\Sigma_{s,1} = (1-r)\Sigma_{s,1} + \tag{28}$$
$$rc_k \sum_t \sum_d \tau''_{s,d,t} \sum_{d'=0}^{d-1} (y_{t+d'} + \hat{y}_{t+d'})(y_{t+d'} - \hat{y}_{t+d'})^T$$

$$\Sigma_s = \Sigma_{s,1}/d_s \tag{29}$$

where τ represents a posteriori probability where the state is put into a state s from a time instant t to a time instant (t+d−1) and is put into a state s' at a time instant (t+d) when the input date is given, τ" represents a posteriori probability where the state is put into the state s from the time instant t to the time instant (t+d−1) when the input data is given, and τ' represents a posteriori probability where the state is put into the state s from the time instant t. These posteriori probabilities τ, τ", and τ' are calculated by using an algorithm where the Baum-Welch algorithm by Baum et al. is expanded to a case having the continuous time distribution. Such an algorithm is described, for instance, in a book "Speech recognition by a Stochastic model" edited by the institute of electronics, information and communication engineers, 1988, pages 74-78. In the expressions (20) and (21), ds and λs,1 are the conditional expected values of the weighted sufficient statistical amounts of the Poisson distribution which is the continuous time distribution, respectively. $\mu_{s,1}$ in the expression (23), $C_{s,l,1}$ in the expression (25), and $\Sigma_{s,1}$ are the conditional expected values of the weighted sufficient statistical amounts of the autoregressive model, respectively. In particular, $C_{s,l,1}$ (l=1, ..., L) in the expression (25) calculates the conditional expected value of the weighted sufficient statistical amount of an auto-correlation coefficient in the L-dimensional autoregressive model. In addition, coefficient matrixes $\beta_1, \ldots, \beta_L$ of the autoregressive model are obtained by solving an L-dimensional simultaneous equations of the expression (27), where $C_{s,-l} = C_{s,l}$.

Predicted values of the respective $y_{t+d'}$ in the expression (28) is calculated in accordance with a following expression (30) by using $\beta_1, \ldots, \beta_L$ obtained by the expression (27).

$$\hat{y}_{t+d'} = \mu_s + \beta_{s,1}(y_{t+d'-1} - \mu_s) + \ldots + \beta_{s,L}(y_{t+d'-L} - \mu_s) \tag{30}$$

In the above, description is exemplified, as the stochastic model having the hidden variable, with the finite mixed distribution of the one-dimensional hidden Marcov model having the continuous time distribution and the autoregressive mode corresponding to each state in the probabilistic distribution estimation apparatus for learning the behavior data represented by the continuous vector data. This example is easily expanded to the finite mixed distribution of an n-dimensional hidden Marcov model having the continuous time distribution and the autoregressive model corresponding to each state. Alternatively, the model corresponding to each state may be a regressive model, a moving-average model, an autoregressive moving-average model, or a normal distribution. In addition, the model corresponding to each state may be a finite mixed distribution of the autoregressive model or a polynomial regressive model, or a factor analysis model.

It will be assumed that the hidden variable $x_t$ at a time instant t is represented by $x_t = h_x(x_1, \ldots, x_{t-1})$ by using a linear or a nonlinear function $h_x$. In addition, it will be assumed that an observed time sequence $y_t$ is represented by $y_t = h_y(x_1, \ldots, x_t)$ by using a linear or a nonlinear function $h_y$. In this event, there is a state space model indicative of all of the continuous vector data represented by $h_x$ and $h_y$. It is possible to apply the above-mentioned parameter renewal rule as regards the stochastic model having all of the hidden variables which can analytically calculate the conditional expected value of the sufficient statistical amount.

According to the first embodiment of this invention, it is possible to estimate, by using the stochastic model, the probabilistic distribution in which each data generates at robust for noises at a high speed by applying an on-line algorithm and by adaptively learning a lot of behavior data by using an oblivion-type algorithm.

Second Embodiment

Figure 3:
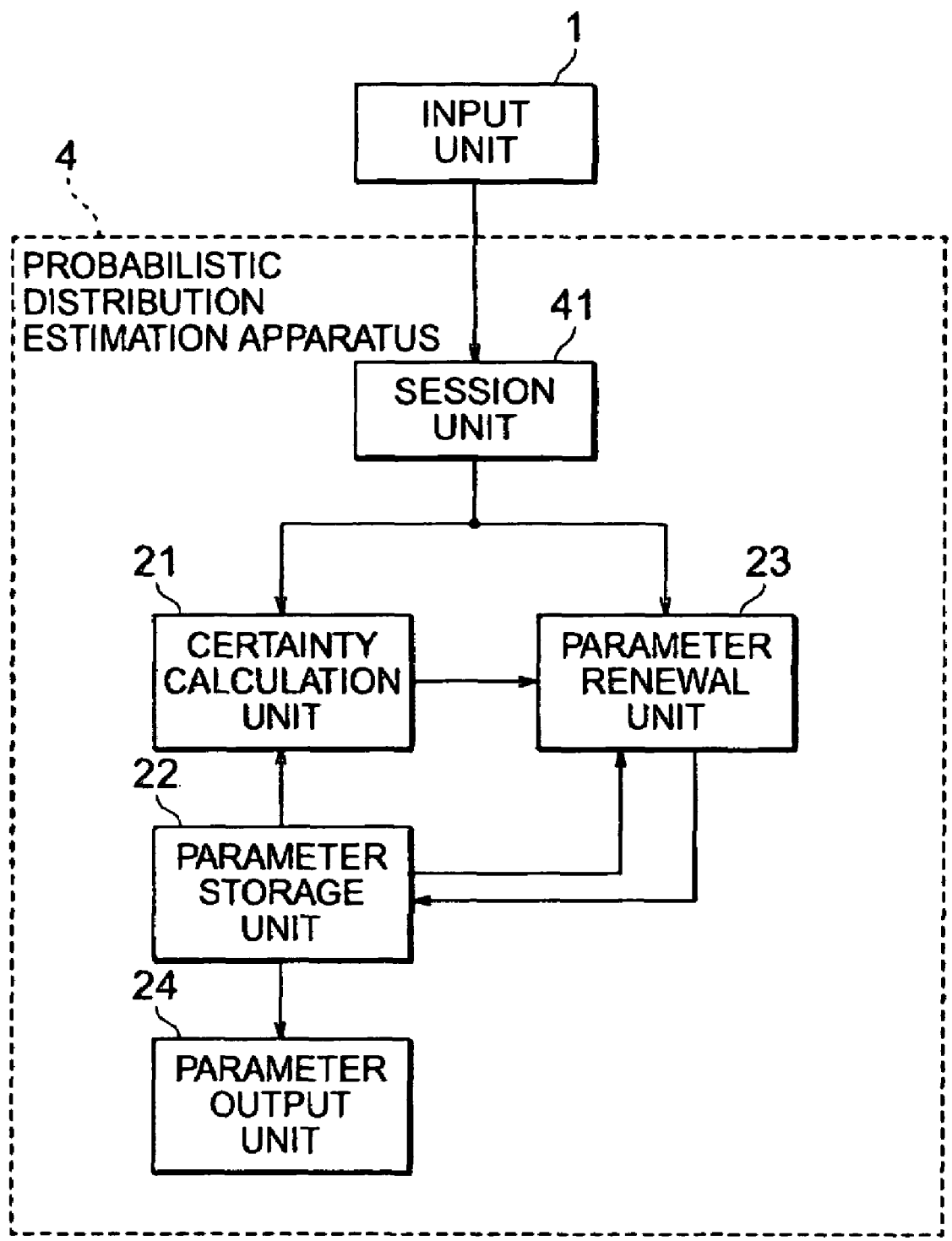
FIG. 3 shows a block diagram of a probabilistic distribution estimation apparatus according to a second embodiment of this invention.

Referring to FIG. 3, the description will proceed to a probabilistic distribution estimation apparatus 4 according to a second embodiment of this invention. The probabilistic distribution estimation apparatus 4 is similar in structure and operation to the probabilistic distribution estimation apparatus 2 illustrated in FIG. 1 except that the probabilistic distribution estimation apparatus 4 further comprises a session unit 41. Inasmuch as operations of the certainty calculation unit 21, the parameter storage unit 22, the parameter renewal unit 23, and the parameter output unit 24 are similar to those of the units 21-24 in the probabilistic distribution estimation apparatus 2, the operations thereof are omitted.

When date obtained from the input unit 1 has no vector format indicative of behavior, the session unit 41 carries out session for converting the data into vector data. In other words, the session unit 41 processes or converts the input data into the string of vector data when the input data has no structure of vector data.

Input data in a case where the probabilistic distribution estimation apparatus does not comprises the session unit 41 and date after carrying out session in a case where the probabilistic distribution estimation apparatus comprises the session unit 41 are described as input data hereinunder.

Figure 4:
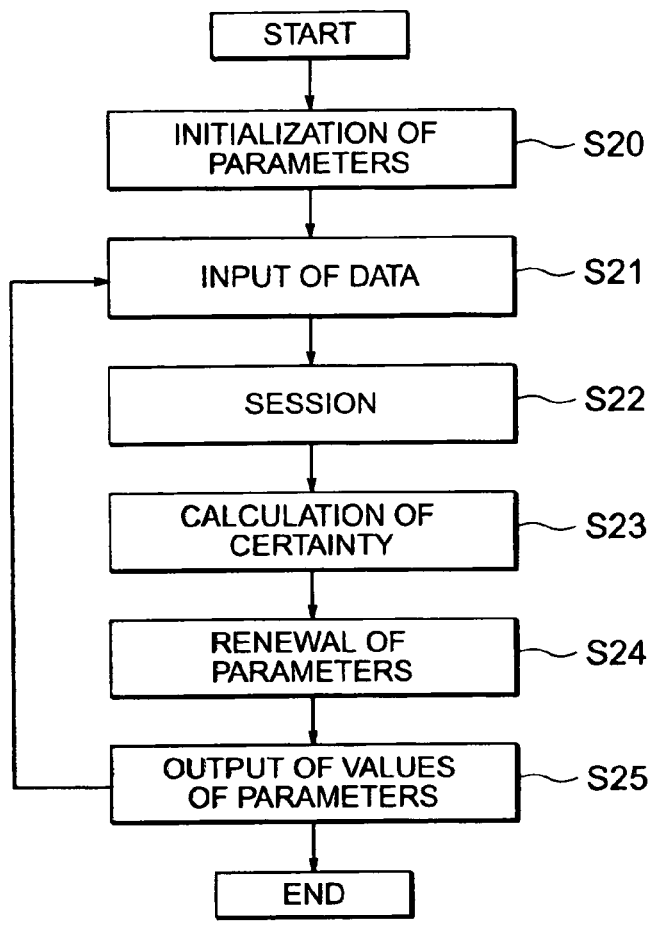
FIG. 4 is a flow chart for use in describing operation of the probabilistic distribution estimation apparatus illustrated in FIG. 3.

FIG. 4 is a flow chart for use in describing schematic operation of the probabilistic distribution estimation apparatus 4 illustrated in FIG. 3. At session of a step S22, the session unit 41 carries out session for converting the input data into vector data when the input data has no vector format indicative of behavior. Inasmuch as operations in steps S20, S21, S23 to S25 are similar to those in the steps S10 to S14 illustrated in FIG. 2, description of the operations thereof is omitted.

According to the second embodiment of this invention, it is possible to estimate a probabilistic distribution in which each data generates by adaptively learning a large amount of behavior data at robust for noises and at a high speed although the data has no vector format indicative of be behavior.

Third Embodiment

To express the stochastic model having the above-mentioned hidden variable is sufficient to appoint values of the parameters calculated by the probabilistic distribution estimation apparatus 2 or the probabilistic distribution estimation apparatus 4. Accordingly, an abnormal behavior detection apparatus receives the values of the parameters from the parameter output unit 24 of the above-mentioned probabilistic distribution estimation apparatus 2 or the above-mentioned probabilistic distribution estimation apparatus 4 to calculate an abnormal behavior-like of the input data using the values of the parameters.

Figure 5:
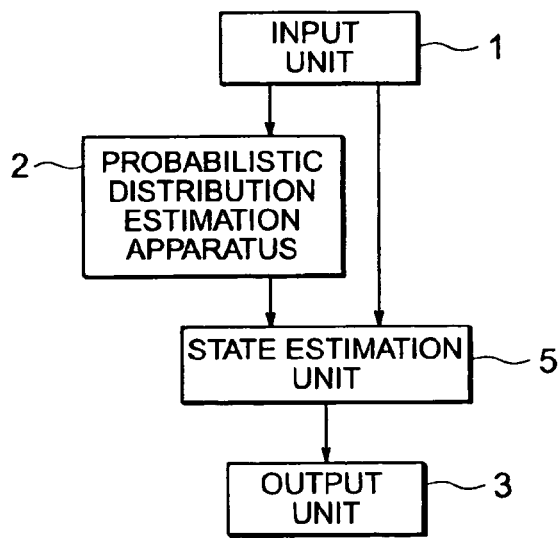
FIG. 5 shows a block diagram of an abnormal behavior detection apparatus according to a third embodiment of this invention.

FIG. 5 is a block diagram showing an abnormal behavior detection apparatus according to a third embodiment of this invention. The abnormal behavior detection apparatus comprises the input unit 1 for inputting data, the output unit 3 for outputting a state estimated score, either the probabilistic distribution estimation apparatus 2 illustrated in FIG. 1 or the probabilistic distribution estimation apparatus 4 illustrated in FIG. 3, and a state estimation unit 5 for calculating a certainty where the input data has a state corresponding to each hidden variable. In other words, the state estimation unit 5 uses the parameters of the probabilistic distribution estimated by the probabilistic distribution estimation apparatus 2 or 4 to produce, as a score, the certainty where the new read data has a state corresponding to each hidden variable of the stochastic model.

Figure 6:
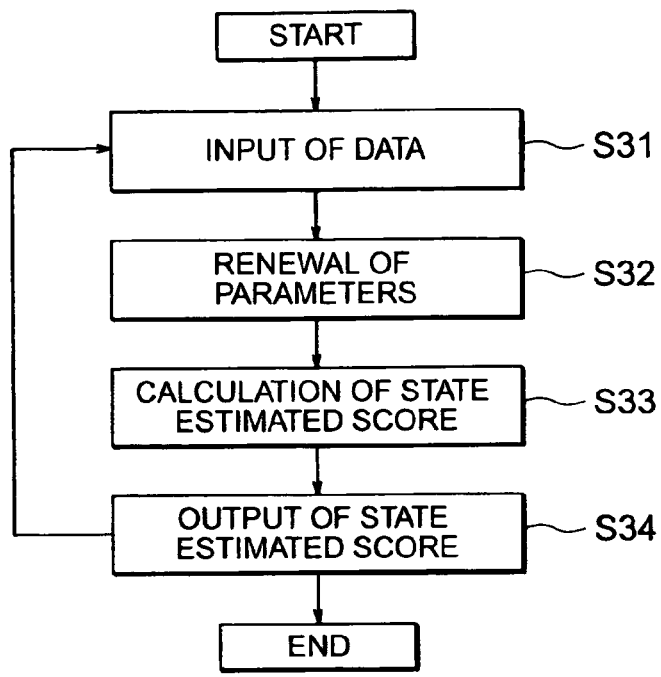
FIG. 6 is a flow chart for use in describing operation of the abnormal behavior detection apparatus illustrated in FIG. 5.

FIG. 6 is a flow chart for use in describing operation of the abnormal behavior detection apparatus according to the third embodiment of this invention. In the abnormal behavior detection apparatus according to the third embodiment of this invention, the input unit 1 inputs the data (step S31), the probabilistic distribution estimation apparatus 2 or 4 carries out renewal of the parameters (step S32), the state estimation unit 5 calculates the above-mentioned state estimated score using the obtained parameters (step S33), and the output unit 3 outputs the calculated state estimated score (step S34).

It will be assumed that the stochastic model having the hidden variables is represented by the finite mixed distribution having any stochastic model $P_k$ in the manner which is described by the expression (1). The state estimation unit 5 calculates and outputs, as the state estimated score $c_k$, a posteriori probability indicative of a probability happening from the stochastic model $P_k$ for each k in accordance with a following expression (31) by using the values of the parameters received from the parameter output unit 24 of probabilistic distribution estimation apparatus 2 or 4:

$$c_k = \frac{\pi_k P_k(y^j | \theta_k)}{\sum_{k'} \pi_{k'} P_{k'}(y^j | \theta_{k'})} \quad (31)$$

The state estimation unit 5 further calculates and outputs certainty where each hidden variable $x_t$ takes the corresponding state for example when the n-dimensional hidden Marcov mode of the expression (3) is used as the stochastic model $P_k$. The state estimation unit 5 may calculate and output certainty where the hidden variables take the corresponding states as regards all of the hidden variables of the stochastic model having the hidden variables.

According to the third embodiment of this invention, inasmuch as the abnormal behavior detection apparatus carries out an adaptive probabilistic distribution estimation using the oblivion-type algorithm with the behavior data serially read and calculates, as the state estimated score, the certainty where the input data has the state corresponding to each hidden variable by using the estimated probabilistic distribution, it is possible to carry out detection of abnormal behavior data by the abnormal behavior detection apparatus using the probabilistic distribution estimation apparatus for estimating the probabilistic distribution in which each data occurs by adaptively learning a large amount of behavior data at robust for noises and at a high speed.

Fourth Embodiment

Figure 7:
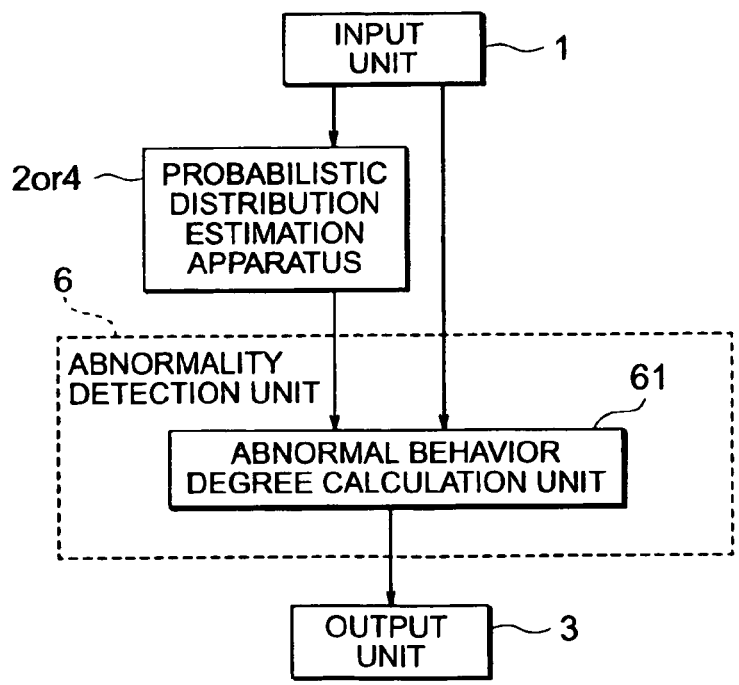
FIG. 7 shows a block diagram of an abnormal behavior detection apparatus according to a fourth embodiment of this invention.

Referring to FIG. 7, the description will proceed to an abnormal behavior detection apparatus according to a fourth embodiment of this invention. The abnormal behavior detection apparatus according to the fourth embodiment comprises the input unit 1 for inputting data, the output unit 3 for outputting an abnormal behavior degree, either the probabilistic distribution estimation apparatus 2 illustrated in FIG. 1 or the probabilistic distribution estimation apparatus 4 illustrated in FIG. 3, and an abnormality detection unit 6 for calculating an abnormal behavior degree of the input data. In other words, the abnormality detection unit 6 calculates an information amount of the new read data by using the parameters of the probabilistic distribution estimated by the probabilistic estimation apparatus to produce the abnormal behavior degree of the new read data.

The abnormality detection unit 6 comprises an abnormal behavior degree calculation unit 61 which calculates and outputs an information amount of data as the abnormal behavior degree using the values of the parameters received from the parameter output unit 24 of the probabilistic distribution estimation apparatus 2 or 4. More specifically, the abnormal behavior degree calculation unit 61 calculates, using parameters $\theta^{(j-1)}$ of the probabilistic distribution estimated from first through (j−1)-th data on current inputted data $y^j$ having a length of $T_j$, a score indicative of the abnormal behavior degree in accordance with a following expression (32) or (33):

$$Score1(y^j) = -\frac{1}{f(y^j)}\log P(y^j \mid \theta^{(j-1)}) \quad (32)$$

$$Score1(y^j) = -\frac{1}{f(y^j)}\log P(y^j \mid \theta^{(j-1)}) - Compress(y^j) \quad (33)$$

The expression (32) or (33) means that the input data $y^j$ is the abnormal behavior data out of the whole of patterns when Score1($y^j$) has a large value. A first term of the expressions (32) and (33) corresponds to a compression rate when the input data $y^j$ is compressed using the stochastic model P. "Compress" in the expression (33) indicates a compression rate when the input data $y^j$ is compressed using a universal code such as the Lemple-Ziv code. Accordingly, a second term of the expression (33) has an effect so as to give high score to the abnormal behavior data having a regular pattern or a peculiar pattern. Estimation parameters used in the expression (32) or (33) are directly generalized to $\theta^{(j-W)}$ or the like, where W represents a positive integer. $f(y^j)$ is a function indicative of a length of the input data $y^j$. When the input data $y^j$ is discrete vector data, for instance, $f(y^j)=T_j$ and a base of a logarithm function in the expressions (32) and (33) may be a total number of output symbols. When the input data $y^j$ is continuous vector data, for instance, $g(y_t)$ is a bit number required in a case where $y_t$ is represented by binary number in a computer and $f(y^j)=\Sigma_t g(y_t)$. In addition, a base of the logarithm function of the expressions (32) and (33) is two.

Figure 8:
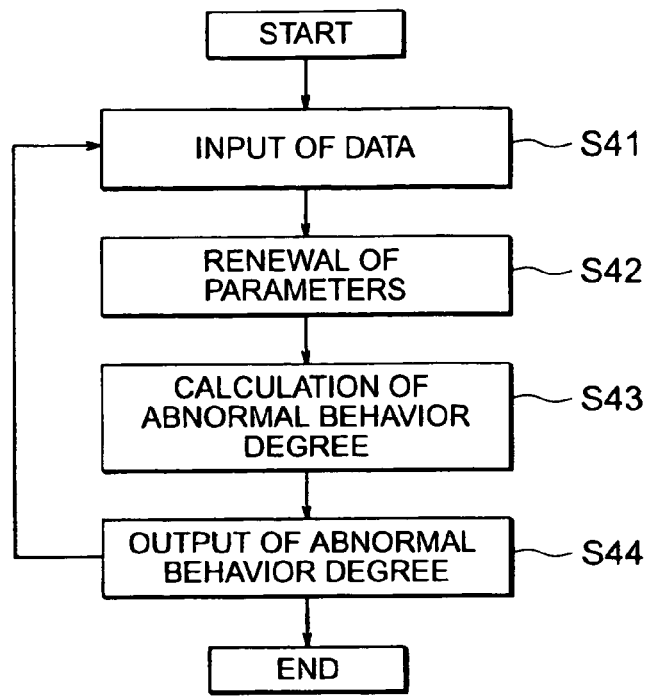
FIG. 8 is a flow chart for use in describing operation of the abnormal behavior detection apparatus illustrated in FIG. 7.

FIG. 8 is a flow chart for use in describing operation of the abnormal behavior detection apparatus according to the fourth embodiment of this invention. In the abnormal behavior detection apparatus according to the fourth embodiment, the input unit 1 inputs data (step S41), the probabilistic distribution estimation apparatus 2 or 4 carries out renewal of the parameters (step S42), the abnormal behavior degree calculation unit 61 of the abnormality detection unit 6 calculates the above-mentioned abnormal behavior degree using the obtained parameters (step S43), and the output unit 3 outputs the calculated abnormal behavior degree (step S44).

According to the fourth embodiment of this invention, inasmuch as the abnormal behavior detection apparatus carries out the adaptive probabilistic distribution estimation using the oblivion-type algorithm with the behavior data serially read and calculates the abnormal behavior degree using the estimated probabilistic distribution as information amount for the probabilistic distribution of the data, it is possible to carry out detection of abnormal behavior data by the abnormal behavior detection apparatus using the probabilistic distribution estimation apparatus for estimating the probabilistic distribution in which each data generates by adaptively learning a large amount of behavior data at robust for noises and at a high speed.

Fifth Embodiment

Figure 9:
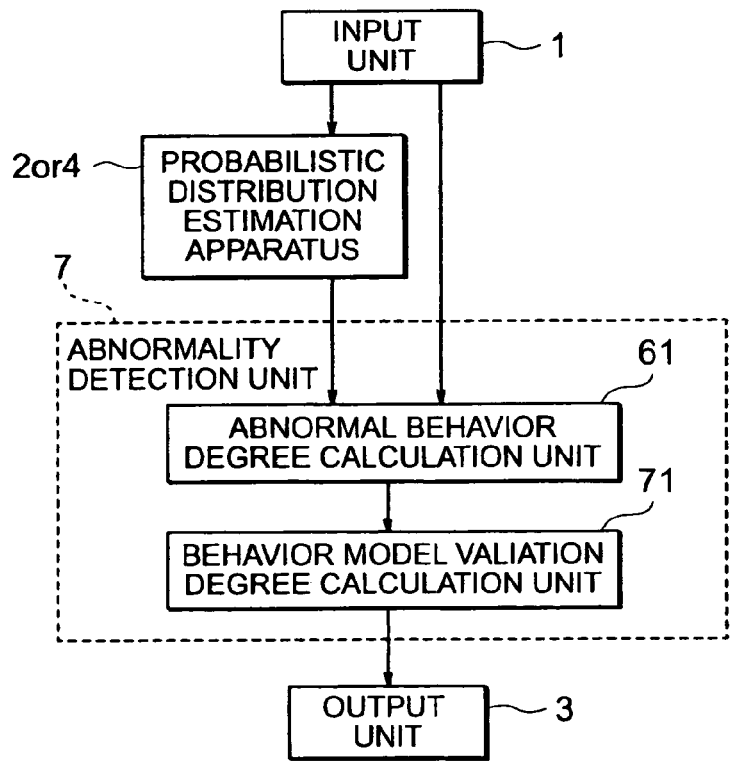
FIG. 9 shows a block diagram of an abnormal behavior detection apparatus according to a fifth embodiment of this invention.

Referring to FIG. 9, the description will proceed to an abnormal behavior detection apparatus according to a fifth embodiment of this invention. The abnormal behavior detection apparatus according to the fifth embodiment of this invention comprises the input unit 1 for inputting data, the output unit 3 for outputting a variation degree of a behavior model, either the probabilistic distribution estimation apparatus 2 illustrated in FIG. 1 or the probabilistic distribution estimation apparatus 4 illustrated in FIG. 3, and an abnormality detection unit 7 for calculating an abnormal behavior degree of the input data to calculate the variation degree of the behavior model using the abnormal behavior degree.

The abnormality detection unit 7 comprises the abnormal behavior degree calculation unit 61 and a behavior model variation degree calculation unit 71. By using the abnormal behavior degree calculated by the abnormal behavior degree calculation unit 61, the behavior model variation degree calculation unit 71 calculates and outputs an average of the abnormal behavior degree as a score indicative of the variation degree of the behavior model. In other words, the behavior model variation degree calculation unit 71 calculates, by using the parameters of the probabilistic distribution estimated by the probabilistic distribution estimation apparatus 2 or 4, a variation degree of a behavior model as a time-average of the abnormal behavior degrees for a predetermined width by reading a plurality of new data. More specifically, it will be assumed that W is a predetermined time interval. The behavior model variation degree calculation unit 71 calculates the score using current inputted data $y^j$, (W–1) data $y^{j-W+1}, \ldots, y^{j-1}$ inputted just before, and a parameter $\theta^{(j-W)}$ of the probabilistic distribution estimated from first thorough (j–W)-th data, for instance, in accordance with a following expression (34). The expression (34) means that yj–W+1, . . . , yj represent burst abnormal behavior data when the score has a large value.

$$Score2(y^j) = \frac{1}{W}\sum_{j'=j-W+1}^{j}\left(-\frac{1}{f(y^{j'})}\log P(y^{j'} \mid \theta^{(j-W)}) - Compress(y^{j'})\right) \quad (34)$$

Figure 10:
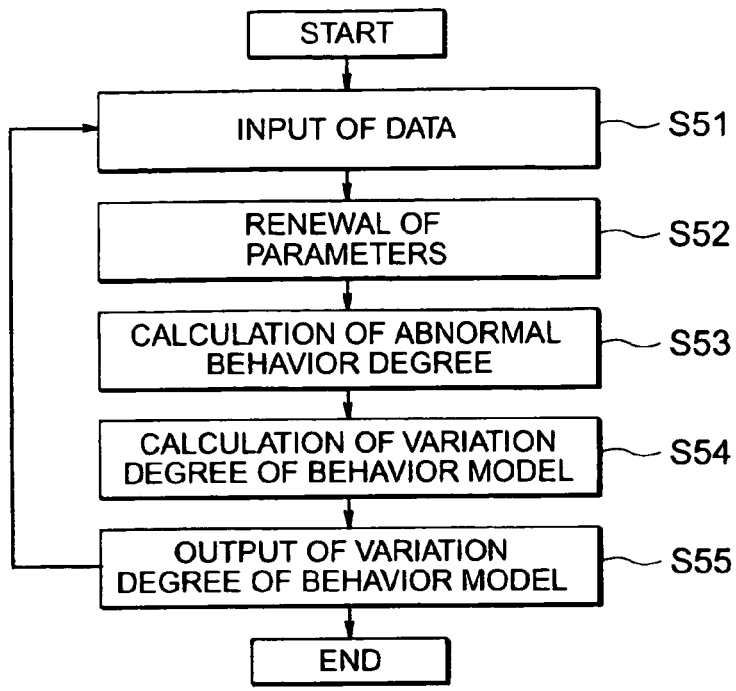
FIG. 10 is a flow chart for use in describing operation of the abnormal behavior detection apparatus illustrated in FIG. 9.

FIG. 10 is a flow chart for use in describing operation of the abnormal behavior detection apparatus according to the fifth embodiment of this invention. In the abnormal behavior detection apparatus according to the fifth embodiment of this invention, the input unit 1 inputs data (step S51), the probabilistic distribution estimation unit 2 or 4 carries out renewal of the parameters (step S52), the abnormal behavior degree calculation unit 61 calculates the abnormal behavior degree using the obtained parameters (step S53), the behavior model variation degree calculation unit 71 calculates the above-mentioned variation degree of the behavior model using the abnormal behavior degree (step S54), the output unit 3 outputs the calculated variation degree of the behavior model (step S55).

According to the fifth embodiment of this invention, inasmuch as the abnormal behavior detection apparatus calculates, as the variation degree of the behavior model, whether or not the abnormal behavior degree indicative of an outlier value from the probabilistic distribution obtained by adaptively learning past data is especially large as an average within a constant interval to detect that the outlier value occurs convergently, it is possible to detect a behavior's variation which means burst abnormal behavior.

Sixth Embodiment

Figure 11:
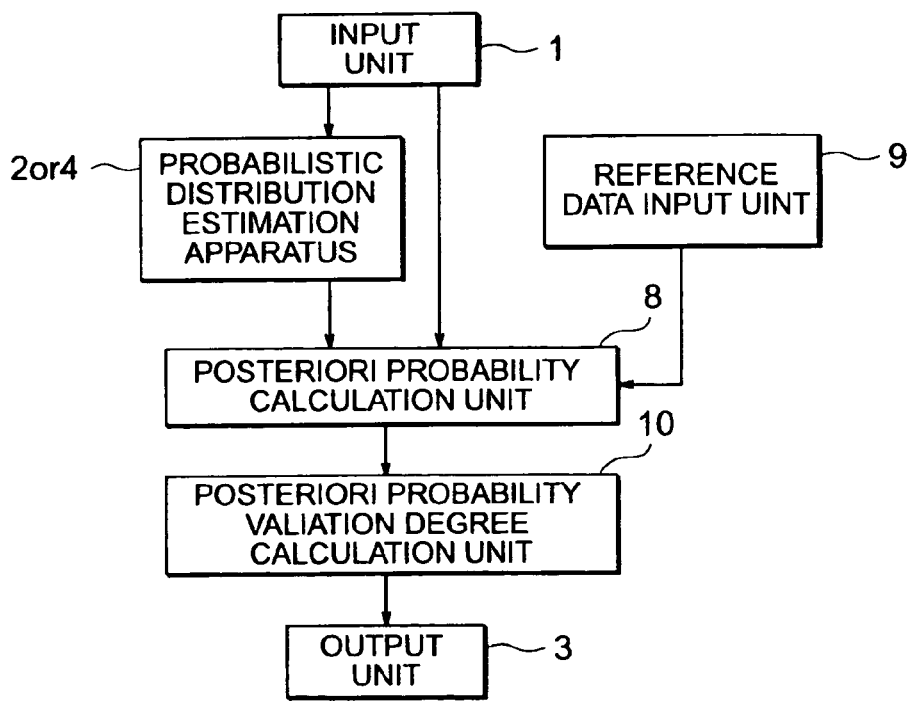
FIG. 11 shows a block diagram of an abnormal behavior detection apparatus according to a sixth embodiment of this invention.

Referring to FIG. 11, the description will proceed to an abnormal behavior detection apparatus according to a sixth embodiment of this invention. The abnormal behavior detection apparatus according to the sixth embodiment of this invention comprises the input unit 1 for inputting data, the output unit 3 for outputting a variation of a posteriori probability, either the probabilistic distribution estimation apparatus 2 illustrated in FIG. 1 or the probabilistic distribution estimation apparatus 4 illustrated in FIG. 3, a reference data input unit 9 for inputting one or more reference data for use in a comparison target for the variation of the posteriori probability, a posteriori probability calculation unit 8 for calculating a posteriori probability of the input data and a posteriori probability of the reference data, and a posteriori probability variation degree calculation unit 10 for calculating the variation of the posteriori probability calculated by the posteriori probability calculation unit 8. That is, the reference data input unit 9 inputs data different from the input data.

The posteriori probability calculation unit 8 calculates, using the parameters of the probabilistic distribution estimated by the probabilistic distribution estimation unit 2 or 4, the posteriori probabilities indicative states corresponding to the hidden variables of the input data and the reference data inputted by the reference data input unit 9. In other word, the posteriori probability calculation unit 8 calculates a posteriori probability of the state corresponding to the hidden variables by using the parameters of the probabilistic distribution estimated by the probabilistic distribution estimation apparatus 2 or 4.

The posteriori probability variation degree calculation unit 10 calculates and outputs, as the variation degree of the posteriori probability, a difference between two posteriori probabilities calculated by the above-mentioned posteriori probability calculation unit 8. In other words, the posteriori probability variation degree calculation unit 10 calculates a variation of the posteriori distribution and outputs it by using the posteriori distribution of the state corresponding to the hidden variables calculated by the posteriori distribution calculation unit 8 on the basis of the data read out of the reference data input unit 9 and by using the posteriori distribution of the state corresponding to the hidden variables calculated by the posteriori distribution calculation unit 8 on the basis of the new read data.

Specifically, it will be assumed that the stochastic model having the hidden variables is represented, for instance, by the finite mixed distribution of a stochastic model $P_k$ as expressed by the expression (1). It will be assumed that the input data is represented by $y^j$, a data set of the reference data is represented by Y, a positive integer is represented by W, and the estimated parameter is represented by $\theta^{(j-W)}$. The posteriori probability calculation unit 8 calculates $P(k|Y,\theta^{(j-W)})$ and $P(k|Y,y^j,\theta^{(j-W)})$ for each k. It is assumed that the reference data is a subset of past input data $y^1, \ldots, y^{j-1}$. In this event, the variation degree of the posteriori probability is calculated by the posteriori probability variation degree calculation unit 10 in accordance with, for instance, a following expression (35) or (36). The expression (35) or (36) means that the input data $y^j$ is abnormal behavior data different from a behavior pattern indicated by the reference data when its value is large.

$$Score3(y^j) = \sum_{k=1}^{K} |P(k|Y, y^j, \theta^{(j-W)}) - P(k|Y, \theta^{(j-W)})| \quad (35)$$

$$Score3(y^j) = \sum_{k=1}^{K} (P(k|Y, y^j, \theta^{(j-W)}) - P(k|Y, \theta^{(j-W)}))^2 \quad (36)$$

Alternatively, when the stochastic model $P_k$ is, for instance, the n-dimensional hidden Marcov model as expressed by the expression (3), the posteriori probability calculation unit 8 calculates the posteriori probabilities where the respective hidden variables $x_t$ take the corresponding states for the input data and for data where the input data and the reference data are combined with each other, respectively. The posteriori probability variation degree calculation unit 10 calculates and outputs a variation thereof. The posteriori probability calculation unit 8 may calculate the posteriori probabilities where the hidden variables of the input data and the hidden variables of the reference data take the corresponding states for all of the hidden variables in the stochastic model having the hidden variables and the posteriori probability variation degree calculation unit 10 may calculate and output a variation thereof.

Figure 12:
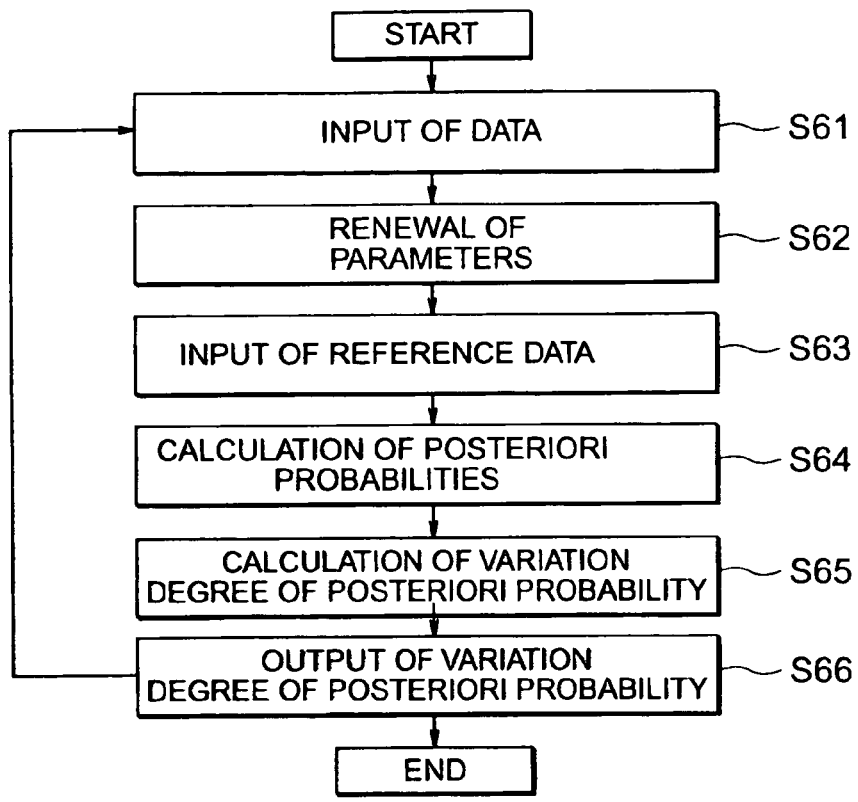
FIG. 12 is a flow chart for use in describing operation of the abnormal behavior detection apparatus illustrated in FIG. 11.

FIG. 12 is a flow chart for use in describing operation of the abnormal behavior detection apparatus according to the sixth embodiment of this invention. In the abnormal behavior detection apparatus according to the sixth embodiment of this invention, the input unit 1 inputs data (step S61), the probabilistic distribution estimation apparatus 2 or 4 carries out renewal of the parameters (step S62), the reference data input data 9 inputs the reference data for use in the comparison target of the posteriori probability (step S63), the posteriori probability calculation unit 8 calculates the above-mentioned two posteriori probabilities using the input data and the reference data (step S64), the posteriori probability variation degree calculation unit 10 calculates the variation degree of the posteriori probability using the two posteriori probabilities (step S65), and the output unit 3 outputs the calculated variation degree of the posteriori probability (step S66).

According to the sixth embodiment of this invention, it is possible to detect, by using the variation degree of the posteriori probability, not only the outlier value from whole of distribution but also the variation in the state corresponding the hidden variable for a program or a user. As a result, it is possible to detect the variation of behavior in each individual in a problem handling the behavior data in a condition where a plurality of programs and data of a plurality of users are mixed. Simultaneously, it is possible to detect the abnormal behavior data in high precision in a case where the behavior data for each individual is few. When the behavior data of the individual is few, by carrying out learning using all data where a plurality of programs and the behavior data of the users are combined with one another, it is possible to reliably carry out learning in comparison with a case of using only single data by using data having a similar behavior pattern. Accordingly, it is possible to realize detection of the abnormal behavior data at a high precision by using the estimated probabilistic distribution and the posteriori probability variation degree calculation unit 10.

Seventh Embodiment

Figure 13:
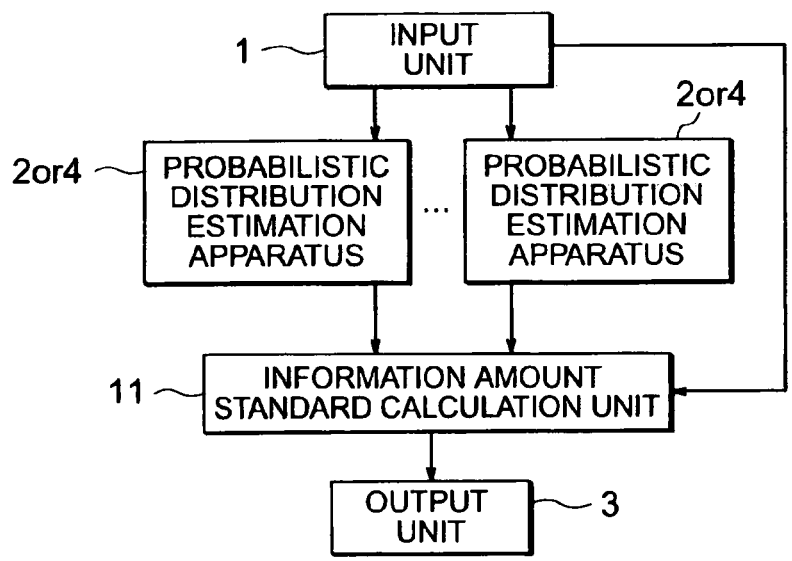
FIG. 13 shows a block diagram of an abnormal behavior detection apparatus according to a seventh embodiment of this invention.

Referring to FIG. 13, the description will proceed to an abnormal behavior detection apparatus according to a seventh embodiment of this invention. The abnormal behavior detection apparatus according to the seventh embodiment of this invention comprises the input unit 1 for inputting data, the output unit 3 for outputting a standard value of information amount, a plurality of probabilistic distribution estimation apparatuses 2 or 4 illustrated in FIGS. 1 or 3 which carry out estimation of the parameters in parallel for the stochastic models having different hidden variables in the states where the hidden variables can take, and an information amount standard calculation unit 11.

By using the plurality of probabilistic distribution estimation apparatuses 2 or 4 illustrated in FIG. 1 or 3, the information amount standard calculation unit 11 calculates standard of information amount using calculated estimated parameters for the stochastic models having different hidden variables which are in number to the states where the hidden variables can take to produce, as an optimum value, the number of the states where the hidden variables can take when the standard value of the information amount is least. In other words, the information amount standard calculation unit 11 calculates, by using, in parallel, the plurality of probabilistic distribution estimation apparatuses 2 or 4 for the stochastic models having different number of the states where the hidden variables can take, standard values of information amounts from the parameters of the probabilistic distributions estimated by the respective probabilistic distribution estimation apparatuses 2 or 4 and the input data to produce, as the optimum value, the number of the states where the hidden variables can take when the standard values of the information amount is the least.

Specifically, it will be assumed that the stochastic model having the hidden variables is represented by the finite mixed distribution of a stochastic model $P_k$, for instance, as expressed by the expression (1). It will be assumed that current input data is represented by $y^j$ and W and Wo represent positive integers. In this event, the information amount standard calculation unit 11 calculates a score for each K in accordance with a following expression (37) or (38). The information amount standard calculation unit 11 produces, as the number of optimum finite mixed distributions, a value of K which is least one of Score4 in the expression (37) or (38). The expression (37) or (38) means that the number of behavior patterns changes due to the input data $y^j$ when the value of K which is least one of them changes. When the above-mentioned value of K becomes large, a new behavior pattern generates. When the value of K becomes small, the existing behavior pattern disappears. For example, it is possible to find a feature pattern of the abnormal behavior data from generation of the new behavior pattern. In addition, it is possible to recognize a temporal change in a tendency of all data from generation and disappearance of the pattern.

$$Score4(y^j) = \sum_{j'=j-W}^{j} -\log P(y^{j'} \mid \theta^{(j'-1)}) \qquad (37)$$

$$Score4(y^j) = \sum_{j'=Wo}^{j} -\log P(y^{j'} \mid \theta^{(j'-1)}) \qquad (38)$$

Alternatively, it will be assumed that the stochastic model $P_k$ is, for instance, the n-dimensional hidden Marcov model expressed by the expression (3). In this event, the plurality of probabilistic distribution estimation apparatuses 2 or 4 illustrated in FIG. 1 or 3 carry out, in parallel, parameter estimation when the number of the states where the respective hidden variables $x_t$ can take changes. The information amount standard calculation unit 11 calculates standard values of the information amount for the finite mixed distributions having different n-dimensional hidden Marcov models which are equal in number to the states to produce, as the optimum value, the number of the states when the standard value of the information amount is least. In addition, it will be assumed that the stochastic model $P_k$ is, for instance, the one-dimensional hidden Marcov model having the autoregressive model corresponding to each state which has the continuous time distribution and the hidden variables. In this event, the plurality of probabilistic distribution estimation apparatuses 2 or 4 illustrated in FIG. 1 or 3 carry out, in parallel, parameter estimation when the number of the states where the respective hidden variables $x_t$ can take and the continuous time when the respective hidden variables $x_t$ take the corresponding states are changed. The information amount standard calculation unit 11 calculates the standard values of the information amount for the finite mixed distributions of the one-dimensional hidden Marcov models which have the respective continuous time distributions and the autoregressive models corresponding to the respective states which the hidden variables take to produce, as the optimum value, the number and the continuous time of the state where the standard value of the information amount is least.

In all of hidden variables of the stochastic model having the hidden variables, the plurality of probabilistic distribution estimation apparatuses 2 or 4 illustrated in FIG. 1 or 3 may carry out, in parallel, the respective parameter estimations for the stochastic model having different hidden variables which are in number to the states which the hidden variables can take and the information amount standard calculation unit 11 may calculate standard of the information amount using the estimated parameters to produce, as the optimum value, the number of the states where the hidden variables can take when the standard value of the information amount is least.

Figure 14:
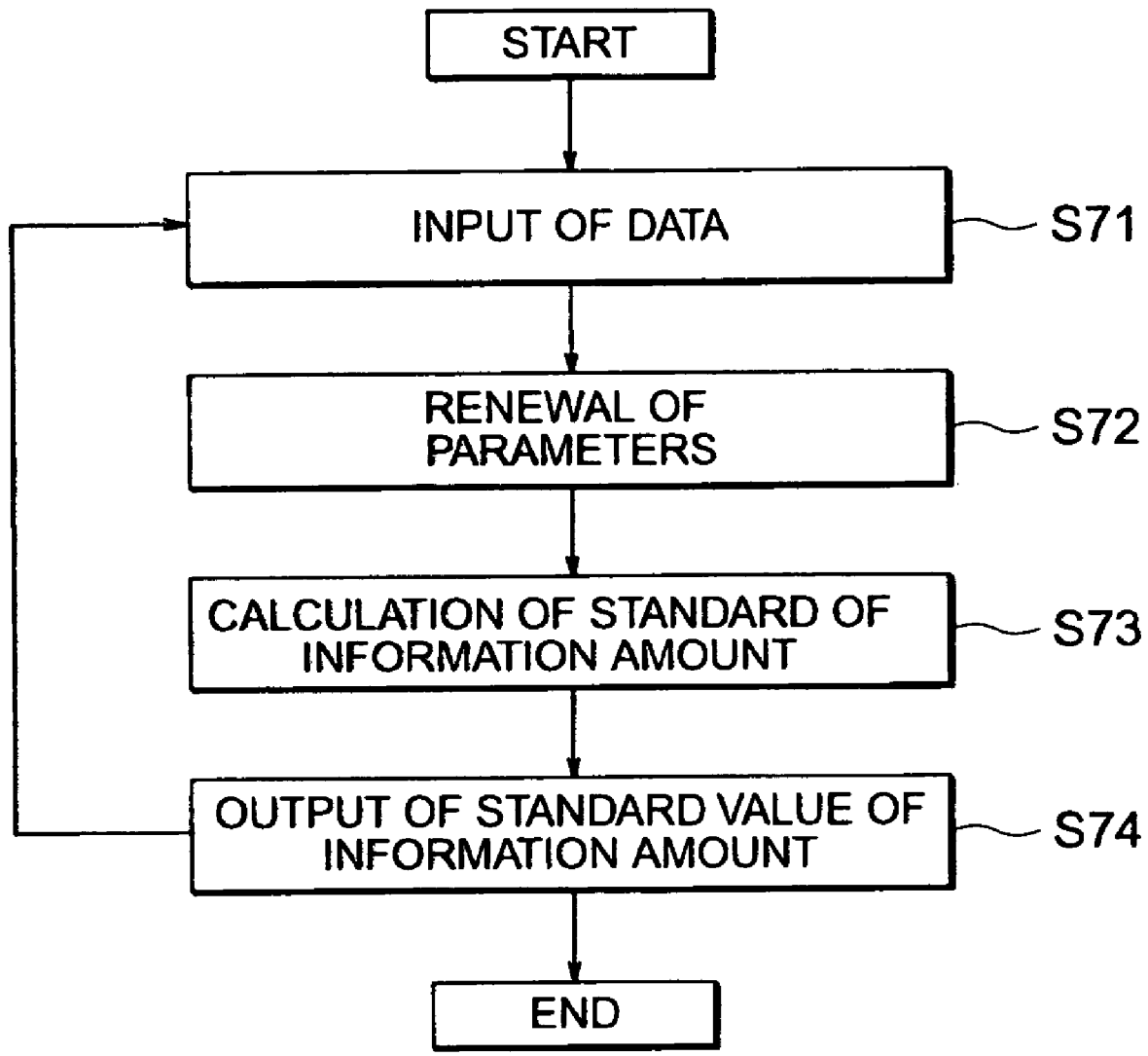
FIG. 14 is a flow chart for use in describing operation of the abnormal behavior detection apparatus illustrated in FIG. 13.

FIG. 14 is a flow chart for use in describing operation of the abnormal behavior detection apparatus according to the seventh embodiment of this invention. In the abnormal behavior detection apparatus according to the seventh embodiment of this invention, the input unit 1 inputs data (step S71), the plurality of probabilistic distribution estimation apparatuses 2 or 4 carry out the parameter estimation on the respective probabilistic distributions which are in number to states where different hidden variables can take (step S72), the information amount standard calculation unit 11 calculates standard of the information amount for the respective probabilistic distributions (step S73), and the output unit 3 outputs the standard value of the information amount (step S74).

Eight Embodiment

Figure 15:
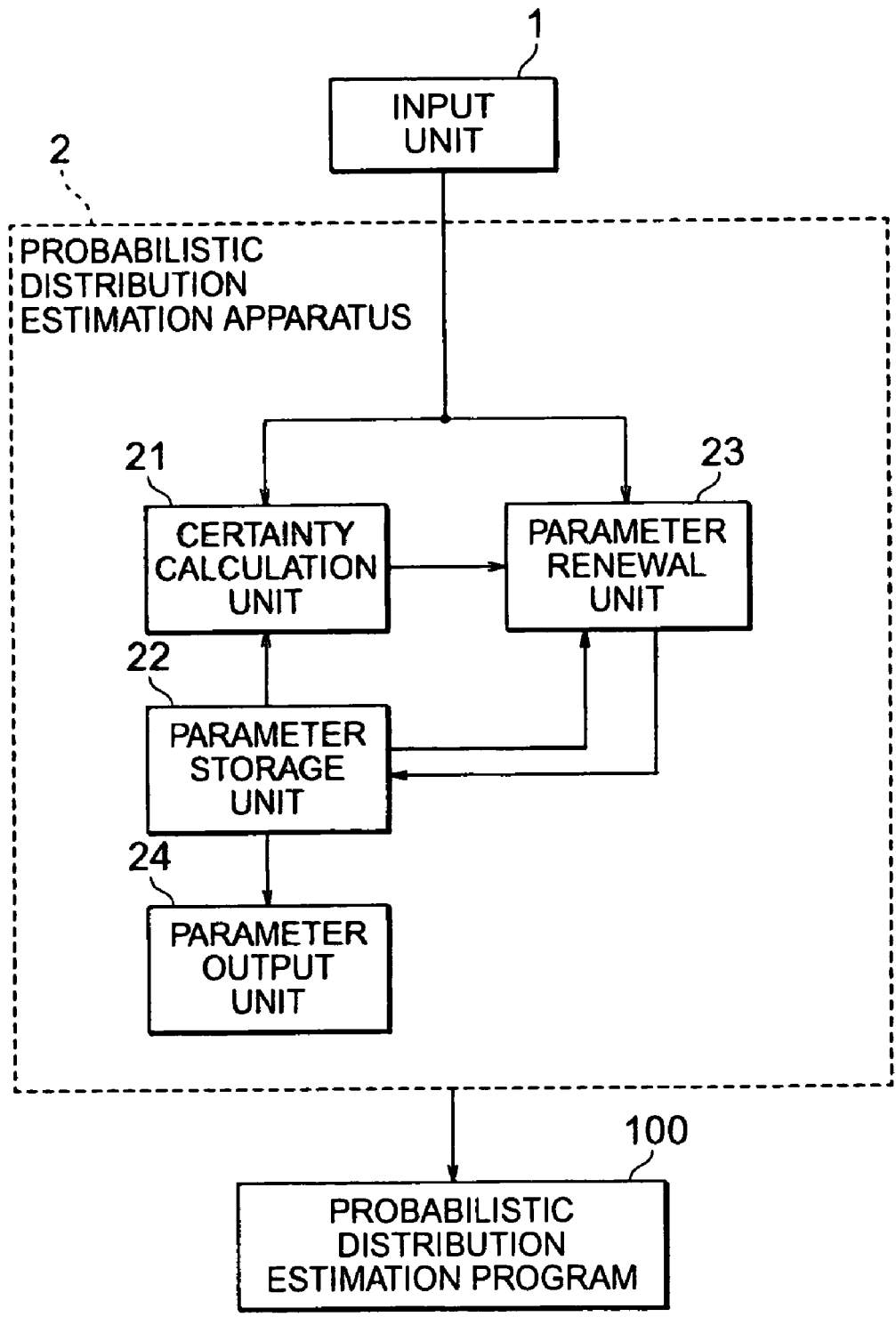
FIG. 15 shows a block diagram of a probabilistic distribution estimation apparatus according to an eighth embodiment of this invention.

Referring to FIG. 15, the description will proceed to a probabilistic distribution estimation apparatus 2 according to an eight embodiment of this invention. The probabilistic distribution estimation apparatus 2 according to the eighth embodiment of this invention is similar in structure and operation to the probabilistic distribution estimation apparatus 2 illustrated in FIG. 1 except that the illustrated probabilistic distribution estimation apparatus 2 further comprises a probabilistic distribution estimation program 100. Therefore, the same reference numerals are attached to similar components and the detailed description thereof is omitted.

Figure 16:
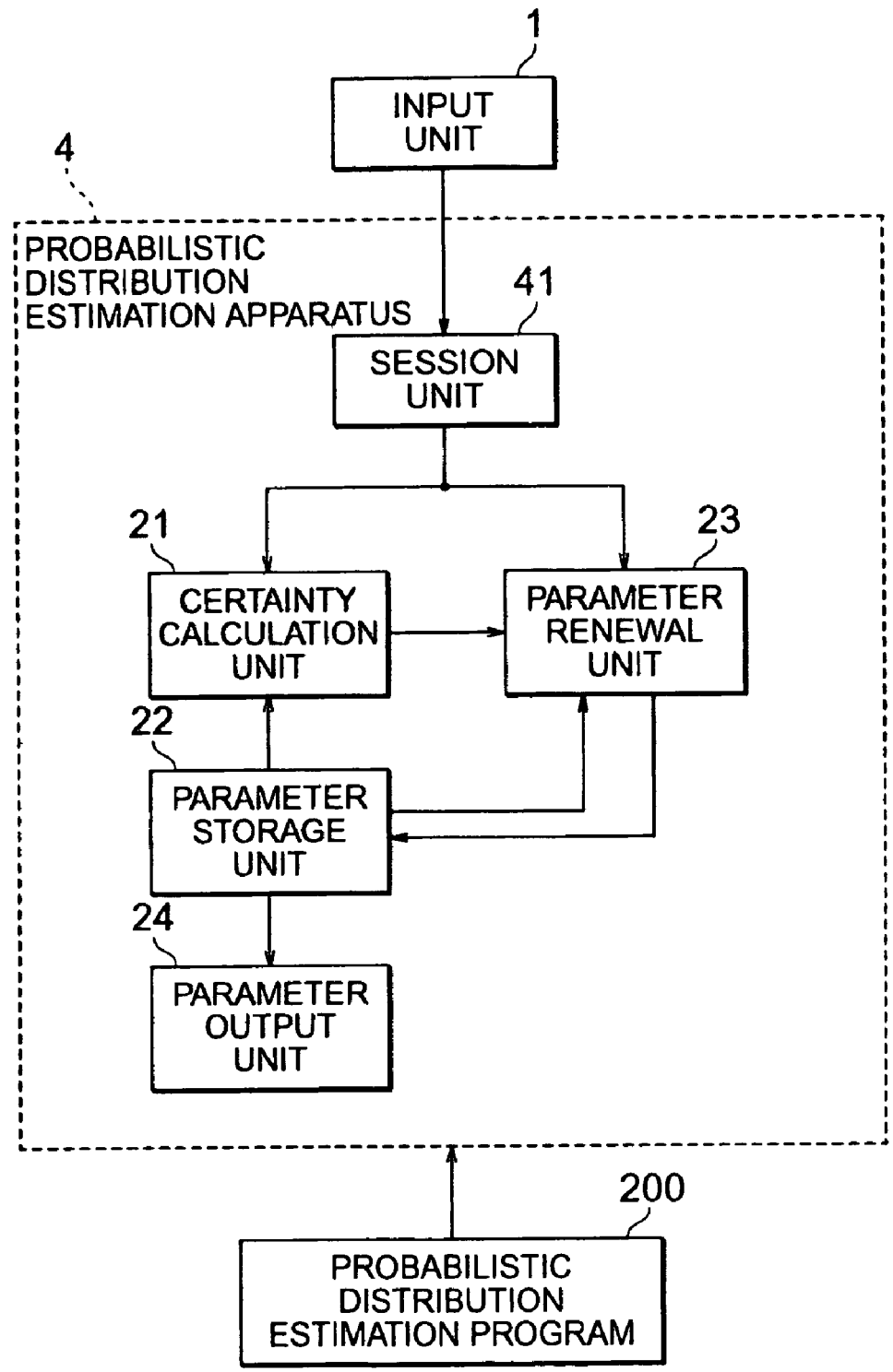
FIG. 16 shows a block diagram of a probabilistic distribution estimation apparatus according to a ninth embodiment of this invention.

The probabilistic distribution estimation program 100 is read or installed in the probabilistic distribution estimation apparatus 2 implemented by a computer and controls operation of the probabilistic distribution estimation apparatus 2 as the certainty calculation unit 21, the parameter storage unit 22, the parameter renewal unit 23, and the parameter output unit 24. Inasmuch as operation of the probabilistic distribution estimation apparatus 2 under the control of the probabilistic distribution estimation program 100 is similar to that of the probabilistic distribution estimation unit 2 according to the first embodiment of this invention, the detailed description thereof will be omitted Ninth Embodiment Referring to FIG. 16, the description will proceed to a probabilistic distribution estimation apparatus 4 according to a ninth embodiment of this invention. The probabilistic distribution estimation apparatus 4 according to the ninth embodiment of this invention is similar in structure and operation to the probabilistic distribution estimation apparatus 3 illustrated in FIG. 3 except that the illustrated probabilistic distribution estimation apparatus 4 further comprises a probabilistic distribution estimation program 200. Therefore, the same reference numerals are attached to similar components and the detailed description thereof is omitted.

The probabilistic distribution estimation program 200 is read or installed in the probabilistic distribution estimation apparatus 4 implemented by a computer and controls operation of the probabilistic distribution estimation apparatus 4 as the certainty calculation unit 21, the parameter storage unit 22, the parameter renewal unit 23, the parameter output unit 24, and the session unit 41. Inasmuch as operation of the probabilistic distribution estimation apparatus 4 under the control of the probabilistic distribution estimation program 200 is similar to that of the probabilistic distribution estimation unit 4 according to the second embodiment of this invention, the detailed description thereof will be omitted.

Tenth Embodiment

Figure 17:
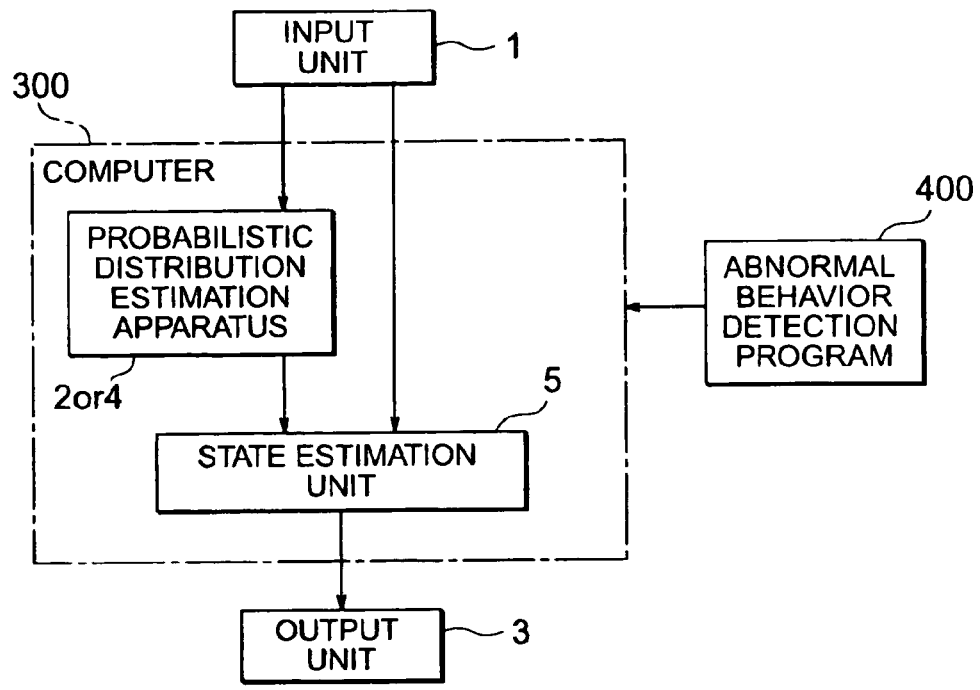
FIG. 17 shows a block diagram of an abnormal behavior detection apparatus according to a tenth embodiment of this invention.

Referring to FIG. 17, the description will proceed to an abnormal behavior detection apparatus according to a tenth embodiment of this invention. The abnormal behavior detection apparatus according to the tenth embodiment of this invention is similar in structure and operation to the abnormal behavior detection apparatus illustrated in FIG. 5 except that an abnormal behavior detection program 400 is added to a computer 300 for realizing the abnormal behavior detection apparatus according to the third embodiment of this invention illustrated in FIG. 5. Therefore, the same reference numerals are attached to similar components and the detailed description thereof is omitted.

The abnormal behavior detection program 400 is read or installed in the abnormal behavior detection apparatus implemented by the computer 300 and controls operation of the abnormal behavior detection apparatus as the probabilistic distribution estimation apparatus 2 or 4 and the state estimation unit 5. Inasmuch as operation of the abnormal behavior detection apparatus under the control of the abnormal behavior detection program 400 is similar to that of the abnormal behavior detection apparatus according to the third embodiment of this invention, the detailed description thereof will be omitted.

Eleventh Embodiment

Figure 18:
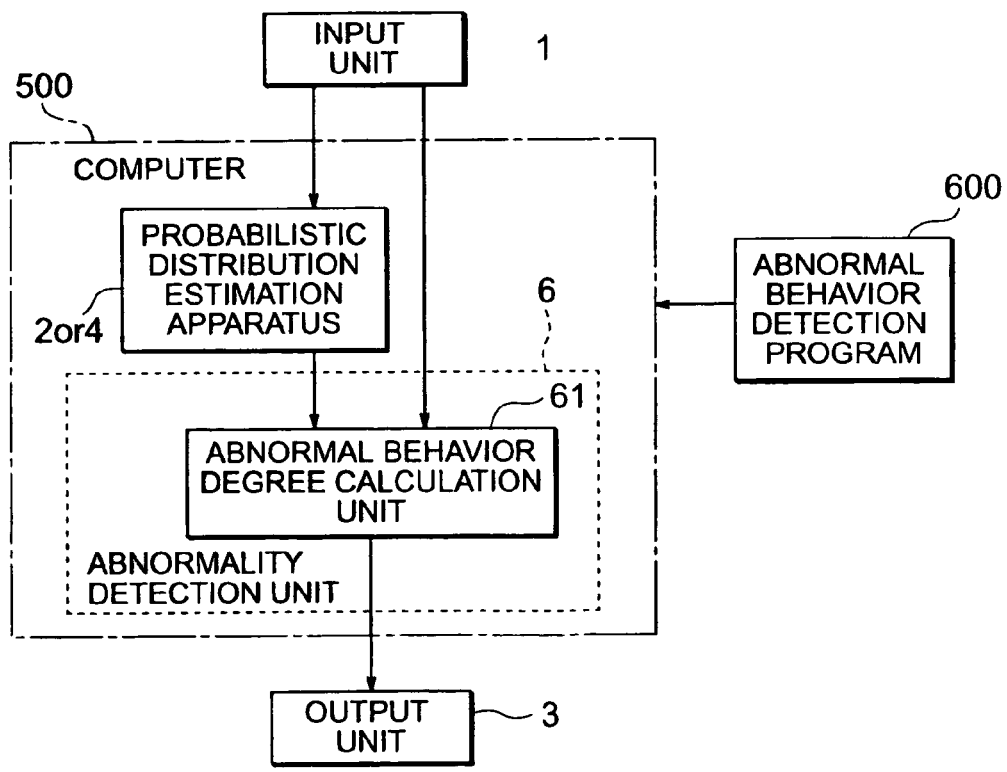
FIG. 18 shows a block diagram of an abnormal behavior detection apparatus according to an eleventh embodiment of this invention.

Referring to FIG. 18, the description will proceed to an abnormal behavior detection apparatus according to an eleventh embodiment of this invention. The abnormal behavior detection apparatus according to the eleventh embodiment of this invention is similar in structure and operation to the abnormal behavior detection apparatus illustrated in FIG. 7 except that an abnormal behavior detection program 600 is added to a computer 500 for realizing the abnormal behavior detection apparatus according to the fourth embodiment of this invention illustrated in FIG. 7. Therefore, the same reference numerals are attached to similar components and the detailed description thereof is omitted.

The abnormal behavior detection program 600 is read or installed in the abnormal behavior detection apparatus implemented by the computer 500 and controls operation of the abnormal behavior detection apparatus as the probabilistic distribution estimation apparatus 2 or 4 and the abnormal detection unit 6 including the abnormal behavior degree calculation unit 61. Inasmuch as operation of the abnormal behavior detection apparatus under the control of the abnormal behavior detection program 600 is similar to that of the abnormal behavior detection apparatus according to the fourth embodiment of this invention, the detailed description thereof will be omitted.

Twelfth Embodiment

Figure 19:
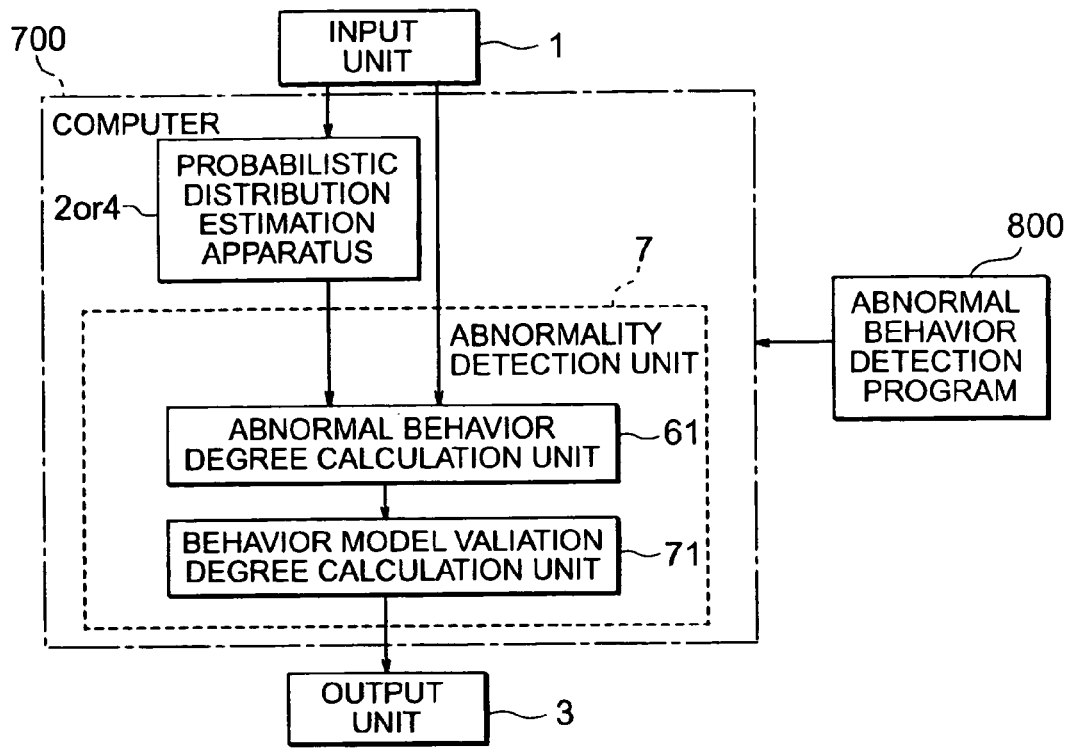
FIG. 19 shows a block diagram of an abnormal behavior detection apparatus according to a twelfth embodiment of this invention.

Referring to FIG. 19, the description will proceed to an abnormal behavior detection apparatus according to a twelfth embodiment of this invention. The abnormal behavior detection apparatus according to the twelfth embodiment of this invention is similar in structure and operation to the abnormal behavior detection apparatus illustrated in FIG. 9 except that an abnormal behavior detection program 800 is added to a computer 700 for realizing the abnormal behavior detection apparatus according to the fifth embodiment of this invention illustrated in FIG. 9. Therefore, the same reference numerals are attached to similar components and the detailed description thereof is omitted.

The abnormal behavior detection program 800 is read or installed in the abnormal behavior detection apparatus implemented by the computer 700 and controls operation of the abnormal behavior detection apparatus as the probabilistic distribution estimation apparatus 2 or 4 and the abnormal detection unit 7 including the abnormal behavior degree calculation unit 61 and the behavior model variation degree calculation unit 71. Inasmuch as operation of the abnormal behavior detection apparatus under the control of the abnormal behavior detection program 800 is similar to that of the abnormal behavior detection apparatus according to the fifth embodiment of this invention, the detailed description thereof will be omitted.

Thirteenth Embodiment

Figure 20:
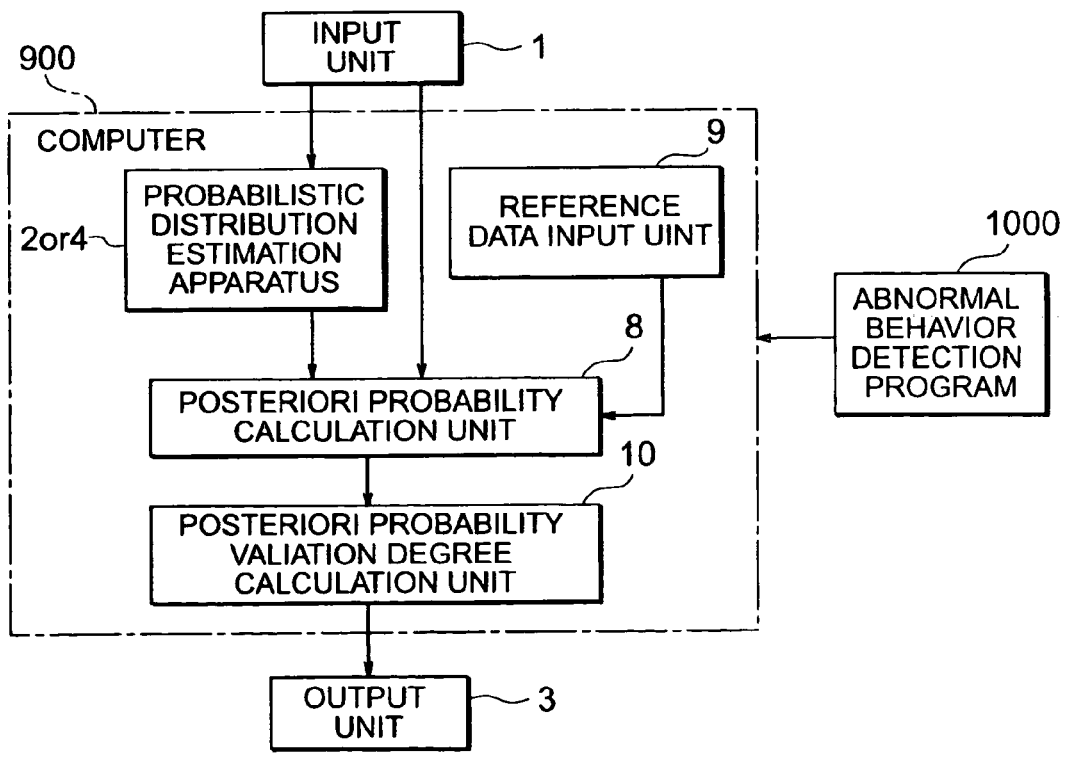
FIG. 20 shows a block diagram of an abnormal behavior detection apparatus according to a thirteenth embodiment of this invention.

Referring to FIG. 20, the description will proceed to an abnormal behavior detection apparatus according to a thirteenth embodiment of this invention. The abnormal behavior detection apparatus according to the thirteenth embodiment of this invention is similar in structure and operation to the abnormal behavior detection apparatus illustrated in FIG. 11 except that an abnormal behavior detection program 1000 is added to a computer 900 for realizing the abnormal behavior detection apparatus according to the sixth embodiment of this invention illustrated in FIG. 11. Therefore, the same reference numerals are attached to similar components and the detailed description thereof is omitted.

The abnormal behavior detection program 1000 is read or installed in the abnormal behavior detection apparatus implemented by the computer 900 and controls operation of the abnormal behavior detection apparatus as the probabilistic distribution estimation apparatus 2 or 4, the posteriori probability calculation unit 8, the reference data input unit 9, and the posteriori probability variation degree calculation unit 10. Inasmuch as operation of the abnormal behavior detection apparatus under the control of the abnormal behavior detection program 1000 is similar to that of the abnormal behavior detection apparatus according to the sixth embodiment of this invention, the detailed description thereof will be omitted.

Fourteenth Embodiment

Figure 21:
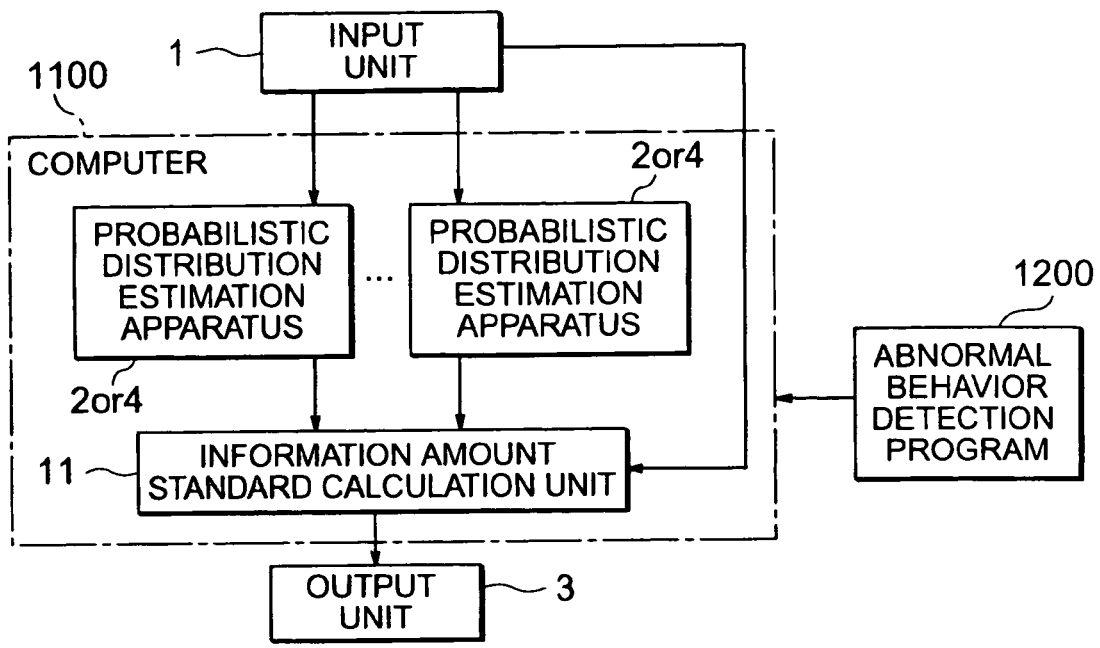
FIG. 21 shows a block diagram of an abnormal behavior detection apparatus according to a fourteenth embodiment of this invention.

Referring to FIG. 21, the description will proceed to an abnormal behavior detection apparatus according to a fourteenth embodiment of this invention. The abnormal behavior detection apparatus according to the fourteenth embodiment of this invention is similar in structure and operation to the abnormal behavior detection apparatus illustrated in FIG. 13 except that an abnormal behavior detection program 1200 is added to a computer 1100 for realizing the abnormal behavior detection apparatus according to the seventh embodiment of this invention illustrated in FIG. 13. Therefore, the same reference numerals are attached to similar components and the detailed description thereof is omitted.

The abnormal behavior detection program 1200 is read or installed in the abnormal behavior detection apparatus implemented by the computer 1100 and controls operation of the abnormal behavior detection apparatus as the plurality of probabilistic distribution estimation apparatuses 2 or 4 and the information amount standard calculation unit 11. Inasmuch as operation of the abnormal behavior detection apparatus under the control of the abnormal behavior detection program 1200 is similar to that of the abnormal behavior detection apparatus according to the seventh embodiment of this invention, the detailed description thereof will be omitted.

EXAMPLES

Now, the description will proceed to an example of the probabilistic distribution estimation apparatus (2 in FIG. 1) and a probabilistic distribution estimation method according to the first embodiment of this invention. In the example, the description will be made in assuming that the data is the discrete vector data and the probabilistic distribution is the finite mixed distribution of the hidden Marcov model. One input data is one where a command history of a user is recorded every predetermined time interval. The input data is obtained from the input unit 1. Each input data may has a different length. In the probabilistic distribution estimation apparatus 2, one input data is, for example, "(cd, ls, cp, . . . )" and "cd", "ls", and so on are symbols $y_1$, $y_2$ of the input data, respectively. In this event, the hidden variable of the hidden Marcov model is a cluster obtained by gathering similar ones from the respective commands. In the parameters of the hidden Marcov model, γ represents the initial probability of the clusters, a represents the transition matrix between the clusters, and b represents a conditional probability of the symbol of the input data in the clusters.

Now, the description will proceed to an example of the probabilistic distribution estimation apparatus (4 in FIG. 3) and a probabilistic distribution estimation method according to the second embodiment of this invention. In the example, it will be assumed that the input data is data where execution time of commands and the commands are recorded such as "13:40:01 cd, 13:40:02 ls, 13:41:21 cp, . . . , 13:45:33 netscape, 13:45:37 netscape, . . . ." In this event, the session unit (41 in FIG. 3) converts the input data into discrete vector data having an input data format by means so as to divide the input data by the predetermined time interval such as "(cd, ls, cp, . . . )", "(netscape, netscape)."

Figure 22:
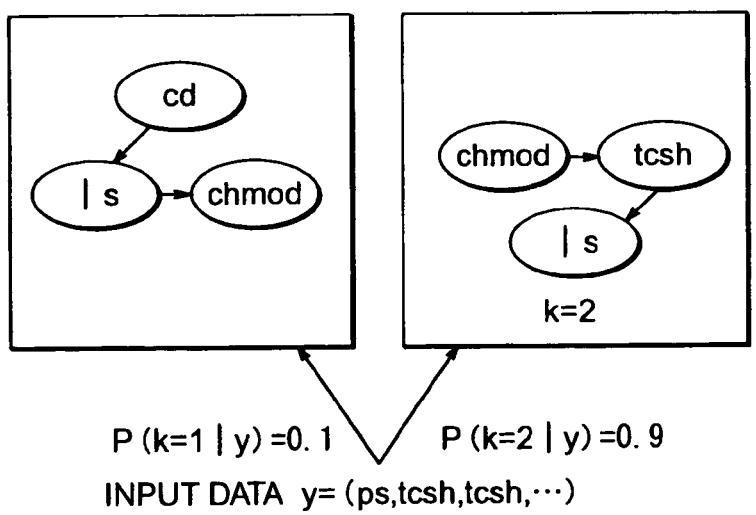
FIG. 22 is a view for use in describing an example of this invention.

Referring new to FIG. 22, the description will proceed to an example of the abnormal behavior detection apparatus (FIG. 5) according to the third embodiment of this invention. In this embodiment, it will be assumed that the probabilistic distribution estimation apparatus (2 in FIG. 1) according to the first embodiment or the probabilistic distribution estimation apparatus (4 in FIG. 4) according to the second embodiment estimates the parameters of the probabilistic distribution from user's past command history data "(cd, ls, cp, . . . ), (netscape, netscape), . . ." and current input data is one input data "(ps, tcsh, tcsh, . . . )" indicative of command history where the user currently executes. In this event, the state estimation unit (5 in FIG. 5) calculates the certainty indicating that the input data generates from the hidden Marcov model having the learned finite mixed distribution to produce the certainty as the state estimated score. It is possible to calculate that current command history generates from the hidden Marcov model among the respective hidden Marcov models indicative of several command patterns where the user executes. Specifically, as shown in FIG. 22, the state estimation unit 5 probabilistically calculates similarity of the pattern indicative of each hidden Marcov model of the finite mixed distribution in the command history or records where the user currently inputs. Each pattern in FIG. 22 is actually represented using the parameters of the hidden Marcov model such as the respective initial probability or the probabilistic transition matrix. By calculating the certainty where the hidden variables of each hidden Marcov model take the corresponding state by the state estimation unit (5 in FIG. 5), it is possible to recognize that individual command where the user executes generates from the state among the respective states indicative of a set of commands. For example, it will be assumed that commands such as mv, cp, mkdir, and so on, which are commands for editing a file or a directory, constitute a set of commands. It is possible by the state estimation unit (5 in FIG. 5) to catch a phenomenon so as to edit the file as well as individual command.

Now, the description will proceed to an example of the abnormal behavior detection apparatus (FIG. 7) according to the fourth embodiment of this invention. In this example, it will be assumed that the probabilistic distribution estimation apparatus (2 in FIG. 2) according to the first embodiment or the probabilistic distribution estimation apparatus (4 in FIG. 4) according to the second embodiment estimates the parameters of the probabilistic distribution from user's past command history data "(cd, ls, cp, . . . ), (netscape, netscape), . . . " and current input data is one input data "(ps, tcsh, tcsh, . . . )" indicative of command history where the user currently executes. In this event, the abnormality detection unit (6 in FIG. 7) produces an abnormal degree of the input data to determine that the input data is abnormal when the abnormal degree is large.

Now, the description will proceed to an example of the abnormal behavior detection apparatus (FIG. 9) according to the fifth embodiment of this invention. In this example, it will be assumed that the probabilistic distribution estimation apparatus (2 in FIG. 2) according to the first embodiment or the probabilistic distribution estimation apparatus (4 in FIG. 4) according to the second embodiment estimates the parameters of the probabilistic distribution from user's past command history data "(cd, ls, cp, . . . ), (netscape, netscape), . . . ", current input data is one input data "(ps, tcsh, tcsh, . . . )" indicative of command history where the user currently executes, and past input data are several input data "(netscape, netscape, . . . ), (tcsh, tcsh, . . . ) indicative of command history where the user executes an interval between the current and nearly past. In this event, the abnormality detection unit (7 in FIG. 9) produces the variation degree of the behavior model that indicates a variation degree of a current user's behavior to determine that the input data is abnormal when the variation degree is large.

Now, the description will proceed to an example of the abnormal behavior detection apparatus (FIG. 11) according to the sixth embodiment of this invention. In this example, it will be assumed that the probabilistic distribution estimation apparatus (2 in FIG. 2) according to the first embodiment or the probabilistic distribution estimation apparatus (4 in FIG. 4) according to the second embodiment estimates the parameters of the probabilistic distribution from user's past command history data "(cd, ls, cp, . . . ), (netscape, netscape), . . . " and current input data is one input data "(ps, tcsh, tcsh, . . . )" indicative of command history where the user currently executes. In this event, the reference data input unit (9 in FIG. 11) inputs several input data indicative of command history where the user executes from the current to nearly past. The posteriori probability calculation unit (8 in FIG. 11) calculates the posteriori probability of the reference data and the posteriori probability of the current input data. The posteriori probability variation degree calculation unit (10 in FIG. 11) calculates a variation between the above-mentioned two posteriori probabilities as the variation degree of the posteriori probability. It is possible to determine whether or not the probabilistic distribution internally changes by observing whether or not a current user's behavior has a state corresponding to the hidden variable different from those in past using the variation degree of the posteriori probability.

The abnormal behavior detection apparatus according to the sixth embodiment of this invention is especially effective in a case of treating a plurality of programs or data in which user data is mixed therewith. New, the description will proceed to an example of the abnormal behavior detection apparatus according to the sixth embodiment of this invention in a case where a plurality of user data are obtained. It will be assumed that there are a plurality of user's past command history data "user 1: (cd, ls, cp, . . . ), user 2: (mail, netscape, netscape, . . . ), user 1: (netscape, netscape), . . . . In this event, the probabilistic distribution estimation apparatus (2 in FIG. 1) according to the first embodiment or the probabilistic distribution estimation apparatus (4 in FIG. 3) according to the second embodiment estimates the parameters of the probabilistic distribution from the plurality of user's past command history data "user 1: (cd, ls, cp, . . . ), user 2: (mail, netscape, netscape, . . . ), user 1: (netscape, netscape), . . . . In addition, it will be assumed that current input data is one input data "(ps, tcsh, tcsh, . . . )" indicative of a command history where the current user 1 executes. In this event, the reference data input unit (9 in FIG. 11) inputs, as the reference data, data where several past data of the user 1 are gathered. The posteriori probability calculation unit (8 in FIG. 11) calculates the posteriori probability of the reference data and the posteriori probability of current data of the user 1. The posteriori probability variation degree calculation unit (10 in FIG. 11) calculates variation of the above-mentioned two posteriori probabilities as the variation degree of the posteriori probability to produce the abnormal degree of the input data using it. It is determined that the input data is abnormal when the variation degree of the posteriori probability is large.

Now, the description will proceed to an example of the abnormal behavior detection apparatus (FIG. 13) according to the seventh embodiment of this invention. In this example, it will be assumed that the plurality of the probabilistic distribution estimation apparatuses (2 in FIG. 2) according to the first embodiment or the probabilistic distribution estimation apparatuses (4 in FIG. 4) according to the second embodiment estimate, in parallel, the parameters of the probabilistic distribution from user's past command history data "(cd, ls, cp, . . . ), (netscape, netscape), . . . ", for instance, in a case where the number of the hidden Marcov models of the finite mixed distribution is changed. By using the parameters of the estimated probabilistic distributions, the information amount standard calculation unit (11 in FIG. 13) calculates standard of the information amount for the respective probabilistic distributions. In this event, the number of the hidden Marcov models where the standard value of the information amount is least is a current optimum cluster number. In addition, it will be assumed that current input data is one input data "(ps, tcsh, tcsh, . . . )" indicative of command history where the user currently executes. This data is supplied to the above-mentioned probabilistic distribution estimation apparatuses 2 or the above-mentioned probabilistic distribution estimation apparatuses 4 and then estimation of the parameters and calculation of the standard of the information amount are carried out in parallel again. In this event, by observing whether or not the optimum cluster number changes, it is possible to catch a structural variation of the model indicative of generation of a new behavior pattern or disappearance of the behavior pattern. When the number of the states where the hidden variables can take changes, it is possible by the information amount standard calculation unit (11 in FIG. 13) to catch not only generation or disappearance of behavior where a chain of commands means but also generation or disappearance of a set of individual commands. Specifically, it is possible to catch, in time series fashion, appearance or disappearance of a set of commends that indicates commands such as mv, cp, mkdir, or the like which are, for instance, commands for editing a file or a directory.

Besides an example of a pretending detection which is described above, there are applications such as an invasion detection using a system call pattern where a program internally executes, a doubtful customer's behavior detection using reading history of Web, a network failure detection using an alarm message, and so on.

It will be assumed that the input data is a series of system calls. In this event, the abnormality detection unit (6 in FIG. 7) detects, as the outlier value, the system call pattern when there is an invasion in the system call pattern in which a normal program executes. That is, application is made about the invasion detection. By using the abnormality detection unit (7 in FIG. 9) for the data in question, it is possible to detect a condition where the system call pattern continuously changes on a large scale due to invasion.

It will be assumed that the input data is data where reading histories of Web in a plurality of users are mixed. In this event, by using the posteriori probability variation degree calculation unit (10 in FIG. 11) with attention to one customer, it is possible to detect an individual behavior variation so that the customer reads in a way different from past although behavior of the customer in question is not abnormal among all of customers. In addition, by using the information amount standard calculation unit (11 in FIG. 13) for this input data, it is possible to detect a new behavior pattern among all of customer's behavior patterns that occurs due to a change in a design of Web page.

Now, the description will be made assuming that the input data is continuous vector data and the probabilistic distribution is the finite mixed distribution of the hidden Marcov model having the continuous time distribution and the autoregressive model corresponding to each state. For example, the input data represents resource used amount in performance evaluation of a computer or performance analysis of a network.

Figure 23:
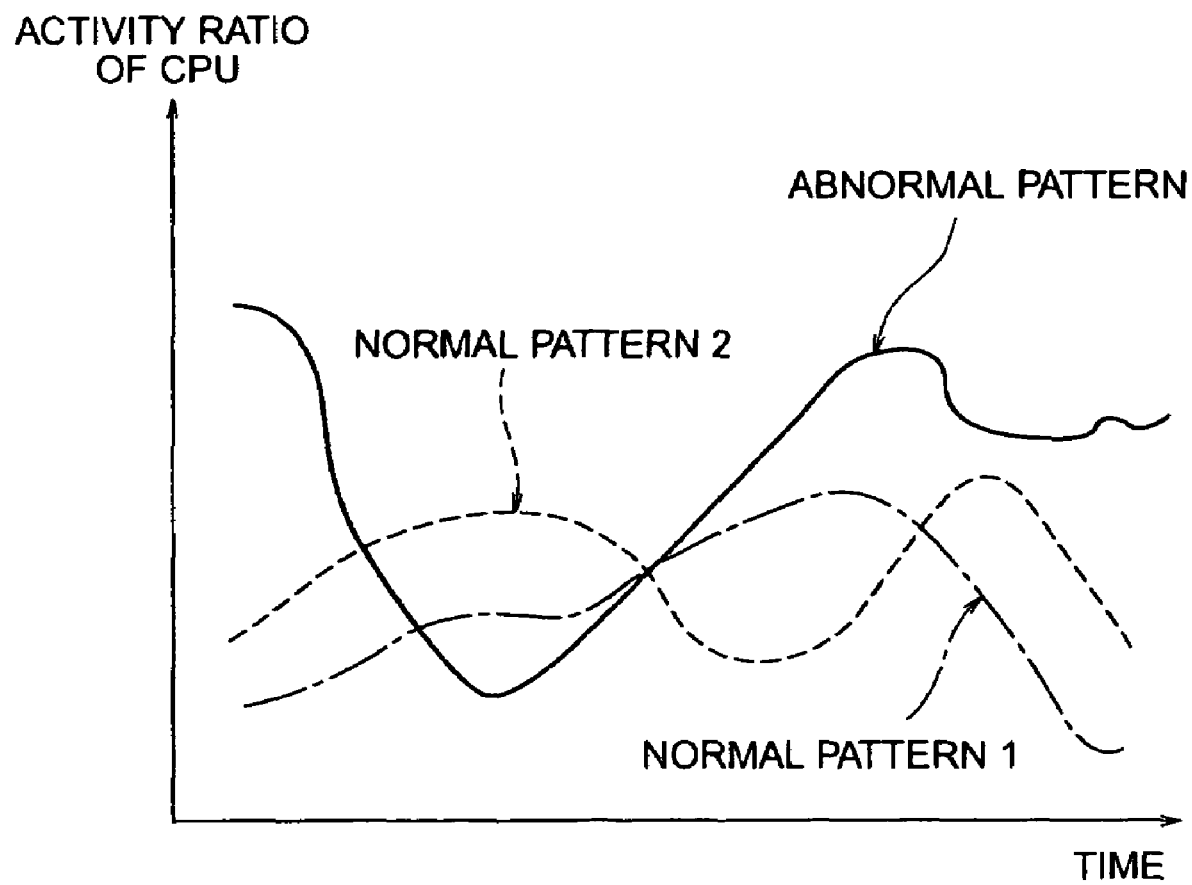
FIG. 23 is a view for use in describing another example of this invention.

It will be assumed that one behavior data is data obtained by dividing numerical data observed time series such as an activity ratio of a CPU, a consumed amount of a memory, or the like by an unit of a predetermined time interval such as a day of week, a time zone, or the like. When the state estimation unit (5 in FIG. 5) calculates the certainty indicating that the input data generates from the hidden Marcov model in the finite mixed distribution, it is possible to know that a current locus applies to a pattern among several types of patterns of the locus. When the state estimation unit (5 in FIG. 5) calculates the certainty indicating that the input data generates from a state corresponding to the hidden variable in each hidden Marcov model, it is possible to know that a particular position of the current locus applies to a pattern. By using the hidden Marcov-model having the continuous time distribution, it is possible to realize robust state estimation with elasticity in a temporal direction tinged By using the abnormality detection unit (6 in FIG. 7), it is possible to detect a locus having an abnormal pattern which is not applied to any of normal patterns of a plurality of loci in the manner as shown in FIG. 23.

By using the abnormality detection unit (7 in FIG. 9), it is possible to detect a condition where a pattern of the activity ratio of the CPU continuously changes on a large scale due to failure in comparison with a past pattern.

In addition, it will be assumed that there is a condition so as to observe the activity ratio of the CPU in a plurality of computers. In this event, by using the posteriori probability variation degree calculation unit (10 in FIG. 11), when attention is directed to a particular computer, it is possible to detect a condition that a locus having a pattern absent in the past is observed in the particular computer although the pattern in question is not abnormal among all of patterns.

When the information amount standard calculation unit (11 in FIG. 13) calculates the optimum distribution number of the finite mixed distributions in time series fashion, it is possible to detect generation of a new locus pattern or disappearance of the locus pattern with its concrete characteristic. Furthermore, when the information amount standard calculation unit (11 in FIG. 13) calculates the optimum continuous time interval and the number of the states where the hidden variables can take, it is possible to grasp, as a part of the locus, generation of a new characteristic pattern or disappearance of the pattern.

Besides the examples of activity ratio of the CPU which is described above, application examples using the continuous data may be applications such as signature authentication, a moving body analysis using a dynamic image of a video image or the like, and so on.

In a case of, for instance, the signature authentication, it is possible, by using the abnormality detection unit (6 in FIG. 7), to judge whether or not the signature is signature by the person in question from numerical data recording operation of a hand on signing.

In a case of, for instance, the moving body analysis using the dynamic image of the video image or the like, it is possible, by the information amount standard calculation unit (11 in FIG. 13), to grasp generation of a new characteristic behavior pattern or disappearance of the behavior pattern from numerical data indicative of behavior.

While this invention has thus far been described in conjunction with several embodiments thereof, it will readily be possible for those skilled in the art to put this invention into practice in various other manners.

What is claimed is:

1. An abnormal behavior detection apparatus for detecting abnormalities in data output from a system, comprising:
    a probabilistic distribution estimation apparatus for responding to, as input data, a string of vector data representing behavior to estimate, using a stochastic model, a probabilistic distribution occurred in each data by successively reading said string of vector data, said probabilistic distribution estimation apparatus comprising a parameter storage unit for storing all of parameters for the stochastic model having hidden variables, certainty calculation means for calculating, in response to said input data, a certainty occurred in said input data and that represents a level of assuredness that said input data is correct and does not contain errors, as the probabilistic distribution, using said stochastic model by reading the parameters of said stochastic model from said parameter storage unit, parameter renewal means for renewing the parameters in said parameter storage unit in accordance with new read data and with past data previously read using the certainty calculated by said certainty calculation means and using each parameter of said stochastic model read from said parameter storage unit, and parameter output means for outputting the parameters for the stochastic model stored in said parameter storage unit, wherein the parameters in said parameter storage unit are renewed based on a parameter renewal rule that unitizes both the certainty and the parameters of said stochastic model, said parameter renewal rule being an oblivious type algorithm for calculating a conditional expected value of a statistical amount weighted with an oblivion coefficient indicative of an accuracy of the past data as time progresses, the oblivious type algorithm be used to treat current data and the past data with appropriate weights in data analysis; and abnormality detection means for receiving the parameters for the stochastic model output from said parameter output means and for calculating a score indicative of an abnormal behavior degree with respect to the new read data by using the parameters of the probabilistic distribution estimated by said probabilistic distribution estimation apparatus to produce the abnormal behavior degree of said new read data, the abnormal behavior degree being a degree where the new read data is out of whole patterns, the abnormal behavior degree being an indicator of a level of abnormalities that exist in the data output from the system.

2. An abnormal behavior detection apparatus as claimed in claim 1, wherein further comprises a behavior model variation degree calculation unit for calculating, by using the parameters of the probabilistic distribution estimated by said probabilistic distribution estimation apparatus, a variation degree of a behavior mode as a time-average of said abnormal behavior degrees for a predetermined width by reading a plurality of new data.

3. An abnormal behavior detection apparatus according to claim 1, further comprising:
    session means for processing the input data into the string of vector data.

4. An abnormal behavior detection apparatus as claimed in claim 3, wherein further comprises a behavior model variation degree calculation unit for calculating, by using the parameters of the probabilistic distribution estimated by said probabilistic distribution estimation apparatus, a variation degree of a behavior mode as a time-average of said abnormal behavior degrees for a predetermined width by reading a plurality of new data.

5. An abnormal behavior detection apparatus according to claim 1, wherein the stochastic model has a continuous time distribution and hidden variables.

6. An abnormal behavior detection apparatus as claimed in claim 5, wherein further comprises a behavior model variation degree calculation unit for calculating, by using the parameters of the probabilistic distribution estimated by said probabilistic distribution estimation apparatus, a variation degree of a behavior mode as a time-average of said abnormal behavior degrees for a predetermined width by reading a plurality of new data.

7. An abnormal behavior detection apparatus according to claim 1, further comprising:
   session means for processing the input data into the string of vector data.

8. An abnormal behavior detection apparatus as claimed in claim 7, wherein further comprises a behavior model variation degree calculation unit for calculating, by using the parameters of the probabilistic distribution estimated by said probabilistic distribution estimation apparatus, a variation degree of a behavior mode as a time-average of said abnormal behavior degrees for a predetermined width by reading a plurality of new data.

9. An abnormal behavior detection apparatus according to claim 1, wherein a finite mixed distribution of hidden Markov models is used to estimate a probabilistic distribution occurred in each data.

10. An abnormal behavior detection apparatus according to claim 9, further comprising:
    session means for processing the input data into the string of vector data.

11. A method of detecting abnormal behavior of data output from a system, comprising the steps of:
    inputting a string of vector data representing behavior as input data;
    calculating, using a model in which each data occurs is input thereto by successively reading the string of vector data, a certainty occurred in the input data and that represents a level of assuredness that said input data is correct and does not contain errors, as a probabilistic distribution, on the basis of parameters of said model;
    renewing, by using the certainty obtained from the calculating step and the parameters of said stochastic model, the parameters in response to new read data and with past data previously read, the renewing being made based on a parameter renewal rule that utilizes both the certainty and the parameters of said model, said parameter renewal rule being an oblivious type algorithm for calculating a conditional excepted value of a statistical amount weighted with an oblivion coefficient indicative of an accuracy of the past data as time progresses, the oblivious type algorithm be used to treat current data and the past data with appropriate weights in data analysis; and
    calculating, by using parameters of an estimated probabilistic distribution, an abnormal behavior degree of new read data using a score indicative of the abnormal behavior degree with respect to the new read data to produce the abnormal behavior degree of said new read data, the abnormal behavior degree being a degree where the new read data is out of whole patterns,
    the abnormal behavior degree being an indicator of a level of abnormalities that exist in the data output from the system.

12. A method as claimed in claim 11, wherein further comprises the step of calculating, by using the parameters of said estimated probabilistic distribution, a variation degree of a behavior model as a time-average of said abnormal behavior degrees for a predetermined width by reading a plurality of data, and wherein the model is a stochastic model having hidden variables as a probabilistic distribution.

13. A method of detecting abnormal behavior to claim 11, further comprising the step of:
    carrying out session for converting the input data into a string of vector data when said input data have no structure of vector data.

14. A method as claimed in claim 13, wherein further comprises the step of calculating, by using the parameters of said estimated probabilistic distribution, a variation degree of a behavior model as a time-average of said abnormal behavior degrees for a predetermined width by reading a plurality of data.

15. A method of detecting abnormal behavior to claim 11, wherein the calculating step comprises the steps of:
    calculating, by using parameters of an estimated probabilistic distribution, a first posteriori probability of a state corresponding to the hidden variables by reading reference data different from the input data;
    calculating, by using the parameters of the estimated probabilistic distribution, a second posteriori probability of a state corresponding to the hidden variables by reading new read data as the input data; and
    calculating, as a variation of a posteriori probability, a difference between the first and the second posteriori probabilities to produce the variation of the posteriori probability.

16. A method of detecting abnormal behavior of data output from a system, comprising the steps of:
    inputting a string of vector data representing behavior as input data;
    calculating, using a time series model having a continuous time distribution and hidden variables as a probabilistic distribution in which each data occurs by successively reading the string of vector data, a certainty occurred in said input data and that represents a level of assuredness that said input data is correct and does not contain errors, as the probabilistic distribution, on the basis of parameters of said time series model;
    renewing, by using said certainty obtained from the calculating step and the parameters of said time series model, the parameters in response to new read data and with past data previously read, the renewing being made based on a parameter renewal rule that utilizes both the certainty and the parameters of said time series model, said parameter renewal rule being an oblivious type algorithm for calculating a conditional expected value of a statistical amount weighted with an oblivion coefficient indicative of accuracy of the past data as time progresses, the oblivious type algorithm be used to treat current data and the past data with appropriate weights in data analysis; and
    calculating, by using parameters of an estimated probabilistic distribution, an abnormal behavior degree of the new read data using a score indicative of the abnormal behavior degree with respect to the new read data to produce the abnormal behavior degree of said new read data, the abnormal behavior degree being a degree where the new read data is out of whole patterns,
    the abnormal behavior degree being an indicator of a level of abnormalities that exist in the data output from the system.

17. A method as claimed in claim 16, wherein further comprises the step of calculating, by using the parameters of said estimated probabilistic distribution, a variation degree of a behavior model as a time-average of said abnormal behavior degrees for a predetermined width by reading a plurality of data.

18. A method of detecting abnormal behavior according to claim 16, further comprising the step of:
    carrying out session for converting the input data into a string of vector data when said input data have no structure of vector data.

19. A method as claimed in claim 18, wherein further comprises the step of calculating, by using the parameters of said estimated probabilistic distribution, a variation degree of a behavior model as a time-average of said abnormal behavior degrees for a predetermined width by reading a plurality of data.

20. A method of detecting abnormal behavior according to claim 16, wherein the calculating step comprises the steps of:
   calculating, by using parameters of an estimated probabilistic distribution, a first posteriori probability of a state corresponding to the hidden variables by reading reference data different from the input data;
   calculating, by using the parameters of the estimated probabilistic distribution, a second posteriori probability of a state corresponding to the hidden variables by reading new read data as the input data; and
   calculating, as a variation of a posteriori probability, a difference between the first and the second posteriori probabilities to produce the variation of the posteriori probability.

21. A computer readable medium storing an abnormal behavior detection program for execution by a computer for determining an abnormality behavior of data output from a system, wherein, when executing the behavior detection program, the computer performs the steps of:
   performing a probabilistic distribution estimation for responding to, as input data, a string of vector data representing behavior to estimate, using a stochastic model, a probabilistic distribution occurred in each data by successively reading said string of vector data, said probabilistic distribution estimation step comprising a parameter storage step for storing all of parameters for the stochastic model having hidden variables, a certainty calculation step for calculating, in response to said input data, a certainty occurred in said input data and that represents a level of assuredness that said input data is correct and does not contain errors, as the probabilistic distribution, using said stochastic model by reading the parameters of said stochastic model from said parameter storage step, and a parameter renewal step for renewing the parameters in said parameter storage step in accordance with new read data and with past data previously read using the certainty calculated by said certainty calculation step and using each parameter of said stochastic model read from said parameter storage step, the renewing being made based on a parameter renewal rule that utilizes both the certainty and the parameters of said stochastic model, said parameter renewal rule being an oblivious type algorithm for calculating a conditional expected value of a statistical amount weighted with an oblivion coefficient indicative of accuracy of the past data as time progresses, the oblivious type algorithm be used to treat current data and the past data with appropriate weights in data analysis; and
   performing an abnormality detection for calculating a score indicative of an abnormal behavior degree with respect to the new read data by using the parameters of the probabilistic distribution estimated by said probabilistic distribution estimation step to produce the abnormal behavior degree of said new read data, the abnormal behavior degree being a degree where the new read data is out of whole patters,
   the abnormal behavior degree being an indicator of a level of abnormalities that exist in the data output from the system.

22. A computer readable medium as claimed in claim 21, wherein said abnormal behavior detection program further makes said computer operate as a behavior model variation degree calculation unit for calculating, by using the parameters of the probabilistic distribution estimated by said probabilistic distribution estimation step, a variation degree of a behavior mode as a time-average of said abnormal behavior degrees for a predetermined width by reading a plurality of new data.

23. A computer readable medium according to claim 21, wherein said probabilistic distribution estimation step further comprises a session step for processing the input data into the string of vector data.

24. A computer readable medium as claimed in claim 23, wherein said abnormal behavior detection program further makes said computer operate as a behavior model variation degree calculation unit for calculating, by using the parameters of the probabilistic distribution estimated by said probabilistic distribution estimation step, a variation degree of a behavior mode as a time-average of said abnormal behavior degrees for a predetermined width by reading a plurality of new data.

25. An abnormal behavior detection apparatus according to claim 1, wherein the abnormal behavior degree is utilized to detect a network failure, and wherein an alarm message is outputted when the network failure is detected.

26. An abnormal behavior detection apparatus according to claim 1, wherein the abnormal behavior degree corresponds to a customer's behavior that is obtained by reading history of Internet usage made by the customer.

27. An abnormal behavior detection apparatus according to claim 1, wherein the abnormal behavior degree is utilized to detect an invasion of resources of a computer using a system call pattern where a program internally executes within the computer.

28. A method according to claim 11, wherein the abnormal behavior degree is utilized to detect a network failure, and wherein an alarm message is outputted when the network failure is detected.

29. A method according to claim 11, wherein the abnormal behavior degree corresponds to a customer's behavior that is obtained by reading history of Internet usage made by the customer.

30. A method according to claim 11, wherein the abnormal behavior degree is utilized to detect an invasion of resources of a computer using a system call pattern where a program internally executes within the computer.

31. A computer readable medium according to claim 21, wherein the abnormal behavior degree is utilized to detect a network failure, and wherein an alarm message is outputted when the network failure is detected.

32. A computer readable medium according to claim 21, wherein the abnormal behavior degree corresponds to a customer's behavior that is obtained by reading history of Internet usage made by the customer.

33. A computer readable medium according to claim 21, wherein the abnormal behavior degree is utilized to detect an invasion of resources of a computer using a system call pattern where a program internally executes within the computer.

* * * * *

UNITED STATES PATENT AND TRADEMARK OFFICE
CERTIFICATE OF CORRECTION

| | | |
|---|---|---|
| PATENT NO. | : 7,561,991 B2 | Page 1 of 1 |
| APPLICATION NO. | : 10/778178 | |
| DATED | : July 14, 2009 | |
| INVENTOR(S) | : Matsunaga et al. | |

It is certified that error appears in the above-identified patent and that said Letters Patent is hereby corrected as shown below:

On the title page,

[*] Notice:   Subject to any disclaimer, the term of this patent is extended or adjusted under 35 USC 154(b) by 523 days.

Delete the phrase "by 523 days" and insert -- by 1,024 days --

Signed and Sealed this

Thirteenth Day of April, 2010

David J. Kappos
*Director of the United States Patent and Trademark Office*